US011003218B2

(12) United States Patent
Hong et al.

(10) Patent No.: US 11,003,218 B2
(45) Date of Patent: *May 11, 2021

(54) IMAGE DISPLAY APPARATUS

(71) Applicant: LG ELECTRONICS INC., Seoul (KR)

(72) Inventors: Sukhyun Hong, Seoul (KR); Ilho Seo, Seoul (KR); Kwangsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/808,785

(22) Filed: Mar. 4, 2020

(65) Prior Publication Data

US 2020/0201395 A1    Jun. 25, 2020

Related U.S. Application Data

(63) Continuation of application No. 16/111,595, filed on Aug. 24, 2018, now Pat. No. 10,613,587.

(30) Foreign Application Priority Data

Aug. 25, 2017    (KR) .......................... 10-2017-0108093

(51) Int. Cl.
| | | |
|---|---|---|
| *H04N 21/422* | (2011.01) | |
| *G09G 5/12* | (2006.01) | |
| *G06F 1/16* | (2006.01) | |
| *G06F 3/0482* | (2013.01) | |
| *G06F 3/16* | (2006.01) | |
| *H04N 21/41* | (2011.01) | |
| *G08C 17/02* | (2006.01) | |
| *G06F 3/14* | (2006.01) | |

(52) U.S. Cl.
CPC .......... *G06F 1/1652* (2013.01); *G06F 3/0482* (2013.01); *G06F 3/1454* (2013.01); *G06F 3/165* (2013.01); *G08C 17/02* (2013.01); *G09G 5/12* (2013.01); *H04N 21/4126* (2013.01); *H04N 21/4222* (2013.01); *H04N 21/42204* (2013.01); *H04N 21/42208* (2013.01); *G08C 2201/30* (2013.01); *G09G 2330/026* (2013.01); *G09G 2380/02* (2013.01)

(58) Field of Classification Search
CPC ...... G06F 1/1652; G09G 5/15; H04N 5/4403; H04N 2005/4408–441; H04N 21/4126; H04N 21/42204; H04N 21/42208; H04N 21/422

See application file for complete search history.

(56) References Cited

U.S. PATENT DOCUMENTS

| | | |
|---|---|---|
| 9,684,340 B2 | 6/2017 | Han et al. |
| 2011/0234604 A1 | 9/2011 | Hsieh et al. |
| | (Continued) | |

FOREIGN PATENT DOCUMENTS

| | | |
|---|---|---|
| EP | 3098702 A1 | 11/2016 |
| EP | 3115989 A1 | 1/2017 |

*Primary Examiner* — Michael Pervan
(74) *Attorney, Agent, or Firm* — Birch, Stewart, Kolasch & Birch, LLP

(57) ABSTRACT

An image display apparatus includes an audio output unit; a rollable display; a driving unit configured to change a size of the rollable display; an interface configured to receive a signal from a mobile terminal; and a controller configured to control the driving unit to unroll the rollable display in response to connecting with the mobile terminal.

18 Claims, 45 Drawing Sheets

(56) References Cited

U.S. PATENT DOCUMENTS

| | | |
|---|---|---|
| 2012/0242601 A1 | 9/2012 | Agerholm |
| 2013/0203469 A1 | 8/2013 | Cho et al. |
| 2016/0112667 A1 | 4/2016 | Park et al. |
| 2016/0306534 A1 | 10/2016 | Woo et al. |
| 2017/0103735 A1 | 4/2017 | Oh et al. |
| 2018/0374452 A1 | 12/2018 | Choi et al. |

IMAGE DISPLAY APPARATUS

CROSS-REFERENCE TO RELATED APPLICATIONS

This Application is a Continuation of co-pending U.S. patent application Ser. No. 16/111,595 filed on Aug. 24, 2018, which claims the priority benefit under 35 U.S.C. § 119(a) to Korean Patent Application No. 10-2017-0108093 filed in the Republic of Korea on Aug. 25, 2017, all of which are hereby expressly incorporated by reference into the present application.

BACKGROUND OF THE INVENTION

1. Field of the Invention

The present invention relates to an image display apparatus, and more particularly, to an image display apparatus which can display a video in advance on a remote controller while a rollable display is unrolled upward.

2. Discussion of the Related Art

An image display apparatus can output images by using various methods, including a method of outputting images using a display panel or a method of externally projecting images using visible light. As the image display apparatus becomes larger in size and high quality, a display is also increased in size.

However, as the display size becomes larger, power consumption is increased, and when the image display apparatus is not used, the large size of the display is undesirable from an aesthetic point of view. Thus, there is research on an image display apparatus in which the size of the display is variable.

SUMMARY OF THE INVENTION

It is an object of the present invention to provide an image display apparatus which can display a video in advance on a remote controller while a rollable display is unrolled upward.

In accordance with an aspect of the present invention, the above and other objects can be accomplished by the provision of an image display apparatus including a rollable display, a driving unit to change a size of the rollable display, an interface to receive a signal from a remote controller, and a controller to control the rollable display, wherein based on an image display input, the controller controls the driving unit to unroll the rollable display, and during the unrolling, the controller controls a first video, corresponding to a video to be displayed on the rollable display, to be displayed on a display of the remote controller.

In accordance with another aspect of the present invention, the above and other objects can be accomplished by the provision of an image display apparatus including a rollable display, a driving unit to change a size of the rollable display, an interface to receive a signal from a remote controller, and a controller to control the rollable display, wherein based on an image display input, the controller controls the driving unit to unroll the rollable display, and during the unrolling, the controller controls a video not to be displayed on the display, and controls a first video, corresponding to a video to be displayed on the display, to be displayed on the display of the remote controller.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1A:
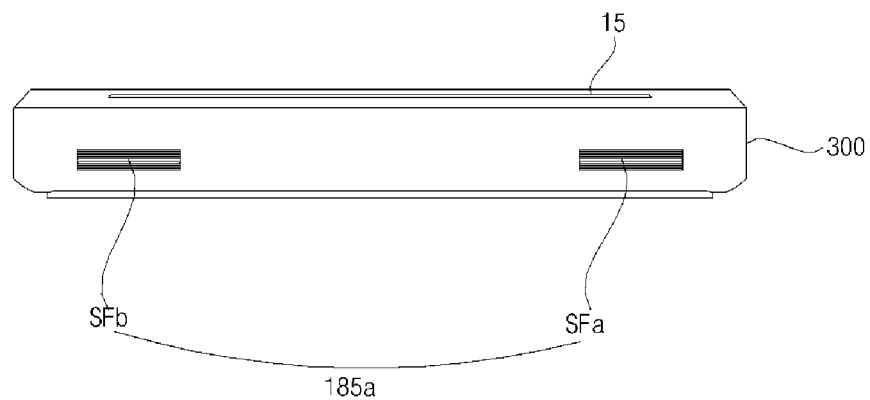
FIGS. 1A to 1D are diagrams illustrating an image display apparatus including a rollable display according to an embodiment of the present invention.

Hereinafter, the present invention will be described in further detail with reference to the accompanying drawings. In the following description of the present invention, the suffixes "module" and "unit" that are mentioned in the elements used to describe the present invention are merely used for the purpose of simplifying the description of the present invention, and thus the suffix itself is not assigned a particularly significant meaning or function. Therefore, the suffixes "module" and "unit" may also be alternately used to refer to a specific element of the present invention.

FIGS. 1A to 1D are diagrams illustrating an image display apparatus including a rollable display according to an embodiment of the present invention. Referring to FIGS. 1A to 1D, the image display apparatus 100 according to the embodiment of the present invention includes a display 180 and a signal processor 300.

The signal processor 300 includes an opening 15, through which the rollable display 180 can be unrolled upward to display a video. Thus, the signal processor 300 may include a driving unit (175 in FIG. 2) which drives the rollable display 180. The driving unit 175 may include a roller, on which the rollable display 180 is rolled, and a motor which rotates the roller.

In addition, FIG. 1A illustrates an example where the rollable display 180 is rolled into the signal processor 300 so as not to be exposed to the outside of the opening 15. In this instance, the signal processor 300 is in a standby mode, such that only some of the units operate, and power may not be supplied to the display 180.

Figure 1B:
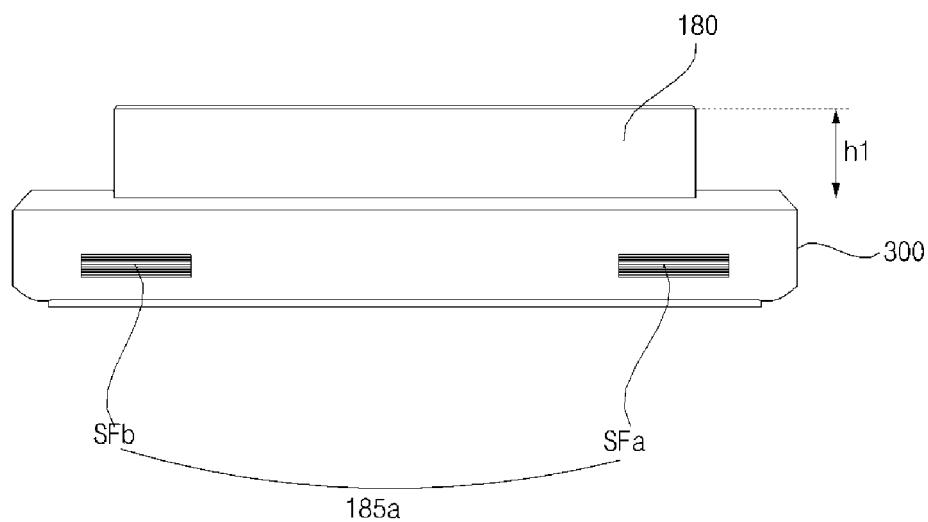

FIG. 1B illustrates an example where the rollable display 180 is unrolled upward by the operation of the driving unit

Figure 1C:
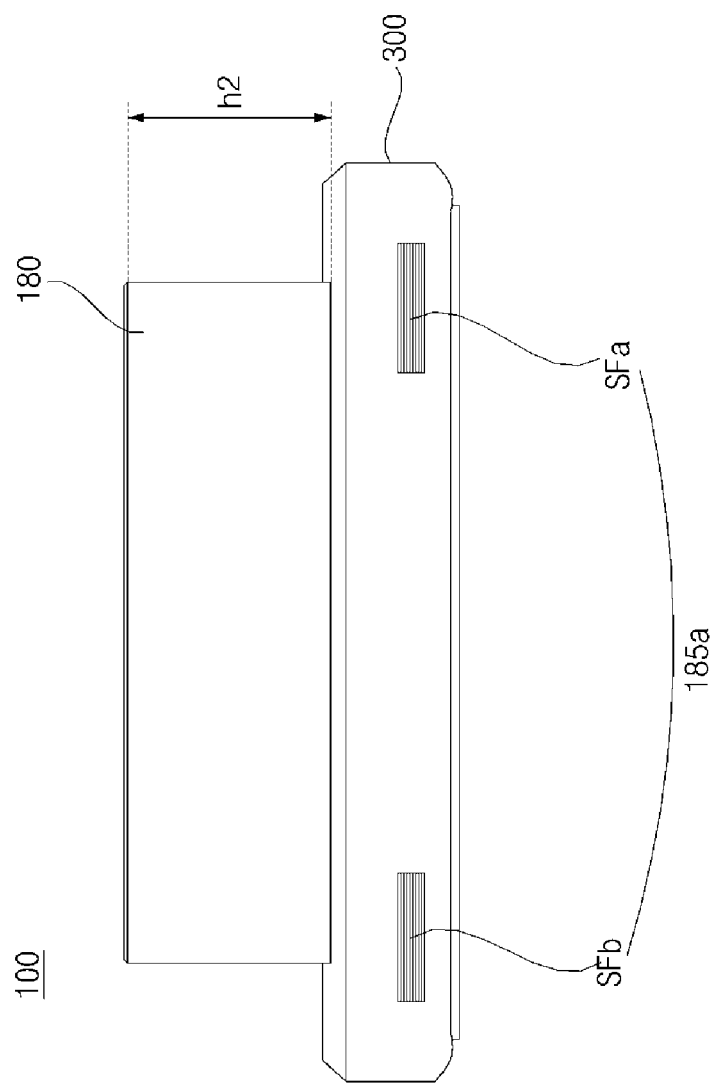
Figure 1D:
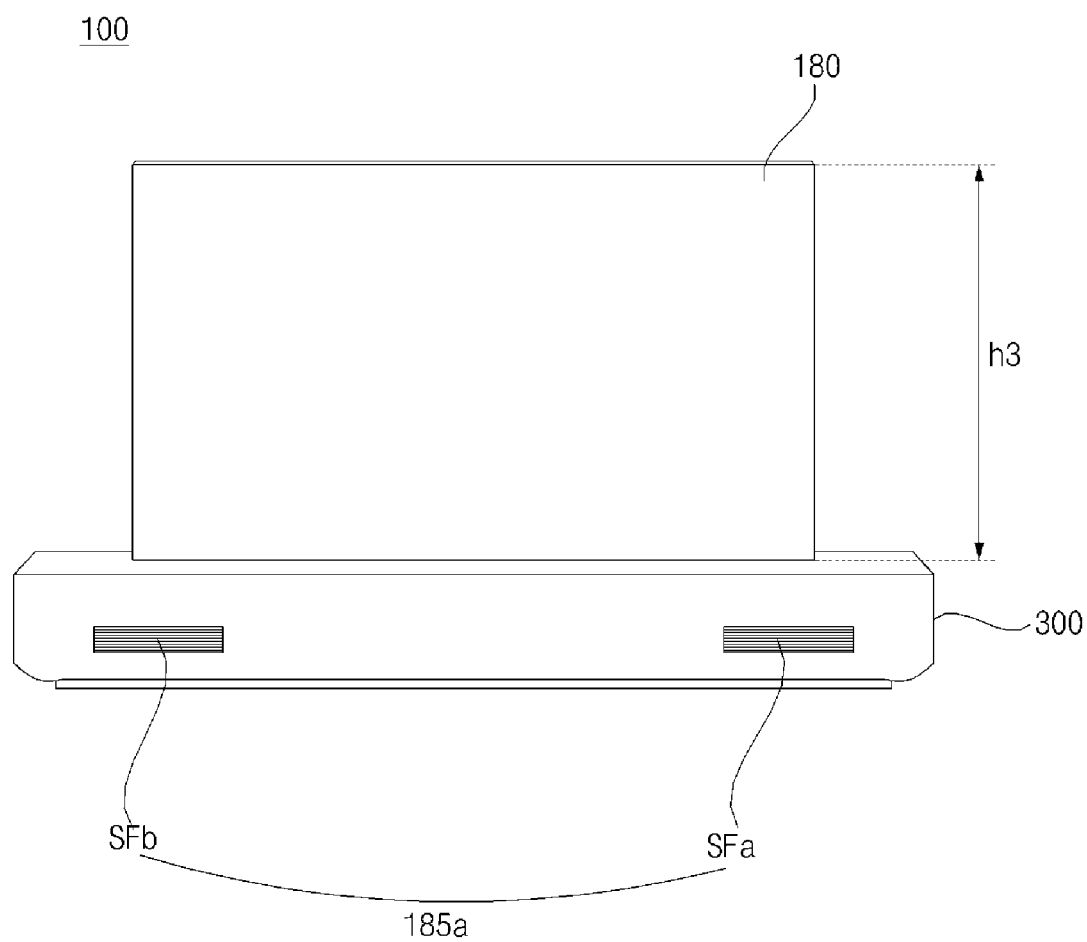

175, such that the rollable display 180 has a height of h1, and is exposed to the outside of the opening 15. Also, FIG. 1C illustrates an example where the rollable display 180 is unrolled upward by the operation of the driving unit 175, such that the rollable display 180 has a height of h2. FIG. 1D illustrates an example where the rollable display 180 is unrolled upward by the operation of the driving unit 175, such that the rollable display 180 has a height of h3.

The image display apparatus 100 according to an embodiment of the present invention includes a rollable display 180, a driving unit 175 which changes the size of the rollable display 180, a user input interface 150 which receives a signal from a remote controller 200, and a controller 170 which controls the rollable display 180.

Further, the controller 170 controls the driving unit 175 to unroll the rollable display 180 upward based on an image display input, and controls a first video, corresponding to a video to be displayed on the rollable display 180, to be displayed on a display 280 of the remote controller 200 during the upward unrolling. Accordingly, the video can be displayed in advance on the remote controller 200 while the rollable display 180 is unrolled upward.

Once the rollable display 180 is fully unrolled, such that the rollable display 180 is at the first height, a video to be displayed is displayed on the rollable display 180, thereby enabling a user to view the image seamlessly through the rollable display 180.

The image display apparatus 100 according to another embodiment of the present invention includes a rollable display 180, a driving unit 175 which changes the size of the rollable display 180, a user input interface 150 which receives a signal from a remote controller 200, and a controller 170 which controls the rollable display 180. The controller 170 controls the driving unit 175 to unroll the rollable display 180 upward based on an image display input, and during the upward unrolling, controls a video not to be displayed on the rollable display 180, and a first video, corresponding to a video to be displayed on the rollable display 180, to be displayed on a display 280 of the remote controller 200. Thus, a video can be displayed in advance on the remote controller 200 while the rollable display 180 is unrolled upward.

In addition, the rollable display 180 is a flexible display, and may include an organic light-emitting diode (OLED) panel. The OLED panel includes a plurality of scan lines and a plurality of data lines, and pixels each including sub-pixels may be defined at crossing regions of the scan lines and the data lines.

A pixel circuit of the OLED panel includes a switching transistor SW1, a storage capacitor Cst, a driving transistor SW2, and an OLED. The switching transistor SW1 is turned on in response to a scan signal Vdscan input from the scan line connected to a gate terminal. When being turned on, the switching transistor SW1 transmits an input data signal Vdata is to a gate terminal of the driving transistor SW2, or to one end of the storage capacitor Cst.

The storage capacitor Cst is provided between the gate terminal and the source terminal of the driving transistor SW2, and stores a predetermined difference between a level of a data signal, which is transmitted to one end of the storage capacitor Cst, and a level of direct current power (VDD) which is transmitted to the other end of the storage capacitor Cst. For example, when data signals have different levels by a pulse amplitude modulation (PAM) method, a power level stored in the storage capacitor Cst changes according to a level difference of the data signals (Vdata). In another example, when data signals have different pulse widths by a pulse width modulation (PWM) method, a power level stored in the storage capacitor Cst changes according to a pulse width difference of the data signals (Vdata).

The driving transistor SW2 is turned on according to the power level stored in the storage capacitor Cst. When the driving transistor SW2 is turned on, a driving current IOLED, which is proportional to the stored power level, flows to the OLED layer, thereby enabling the OLED layer to perform a light-emitting operation.

The OLED layer includes an RGBW light-emitting layer (EML) corresponding to sub-pixels, and may include at least one of a hole injection layer (HIL), a hole transport layer (HTL), an electronic transport layer (ETL), and an electronic injection layer (EIL). In addition to these layers, the OLED layer may further include a hole blocking layer and the like.

All the sub-pixels output white light in the OLED layer, but in the case of green, red, and blue sub-pixels, a color filter is provided separately to display colors. That is, each of the green, red, and blue sub-pixels may further include a color filter, whereas the white sub-pixels, which output white light, do not require any color filter.

The signal processor 300 may include a speaker unit 185a which can output sound forward. In the drawings, each of speakers SFa and SFb included in the speaker unit 185a is disposed on a front portion of the signal processor 300. Accordingly, the sound output from the speaker unit 185a is output toward a user and may reach the user.

Figure 2:
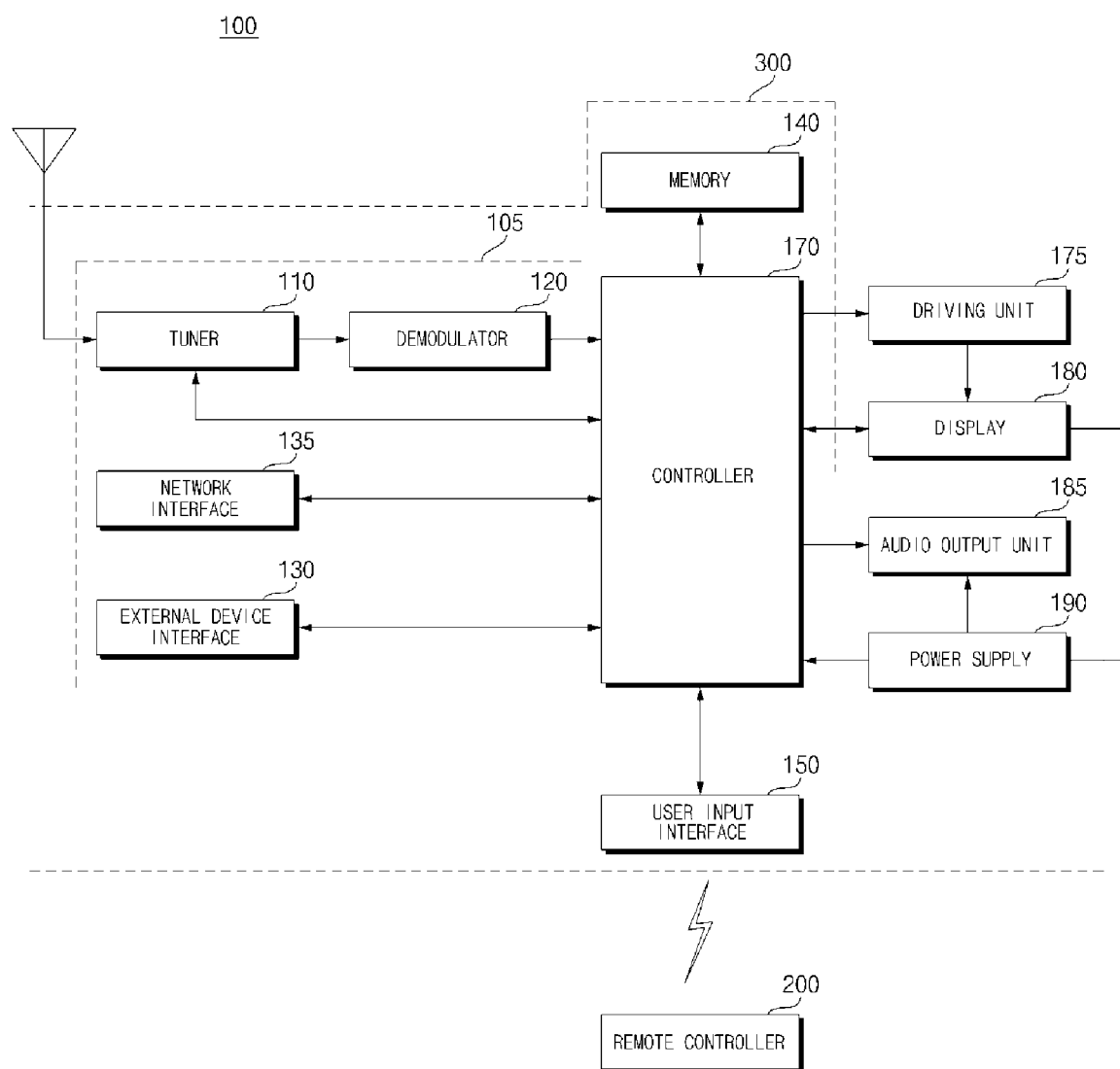
FIG. 2 is an internal block diagram of the image display apparatus of FIGS. 1A to 1D.

The image display apparatus 100 of FIGS. 1A to 1D may be a monitor, a TV, a tablet PC, a mobile terminal, and the like. FIG. 2 is an internal block diagram of the image display apparatus of FIGS. 1A to 1D. Referring to FIG. 2, the image display apparatus 100 according to an embodiment of the present invention includes a display 180 and a signal processor 300.

The signal processor 300 includes a tuner 110, a demodulator 120, an external device interface 130, a network interface 135, a memory 140, a user input interface 150, a sensor unit, a controller 170, an audio output unit 185, and a driving unit 175. Although FIG. 2 illustrates an example where the tuner 110, the demodulator 120, the external device interface 130, and the network interface 135 are included in a broadcast receiver 105, various modifications thereof may be made.

The tuner 110 can also tune a Radio Frequency (RF) broadcast signal corresponding to a channel selected by a user or all the previously stored channels, among RF broadcast signals received via an antenna 50. Further, the tuned RF broadcast signal is converted into an intermediate frequency signal or a baseband image, or an audio signal.

For example, if the selected RF broadcast signal is a digital broadcast signal, the tuner 110 converts the digital broadcast signal into a digital IF signal (DIF), and if the selected RF broadcast signal is an analog broadcast signal, the tuner 110 converts the analog broadcast signal into a baseband image or a voice signal (CVBS/SIF). That is, the tuner 110 can process the digital broadcast signal or the analog broadcast signal. The analog baseband image or the voice signal (CVBS/SIF), which is output from the tuner 110, may be directly input to the controller 170.

The tuner 110 can also sequentially tune an RF broadcast signal of all the broadcast channels stored using a channel memory function among the RF broadcast signals received via the antenna 50, and can convert the RF broadcast signal into an intermediate frequency signal or a baseband video or audio signal. The tuner 110 may also include a plurality of tuners to receive broadcast signals of a plurality of channels.

Alternatively, the tuner 110 may be a single turner which receives broadcast signals of a plurality of channels simultaneously.

In addition, the demodulator 120 can receive the digital IF (DIF) signal converted by the tuner 110, and demodulate the digital IF signal. The demodulator 120 can output a stream signal (TS) after demodulation and channel decoding. Here, the stream signal TS may be a signal in which a video signal, an audio signal, and a data signal are multiplexed.

The stream signal output by the demodulator 120 can also be input to the controller 170. The controller 170 can perform demultiplexing, A/V signal processing, and the like, can output video to the display 180, and output audio to the audio output unit 185. Further, the external device interface 130 may be connected to an external device 190 to transmit or receive data. Thus, the external device interface 130 may include an A/V input/output unit or a wireless communication unit.

The external device interface 130 may also be connected, wirelessly or by wire, to an external device, such as a digital versatile disk (DVD), a Blu-ray, a game console, a camera, a camcorder, a computer (laptop computer), a set-top box, and the like, and can perform an input/output operation with respect to the external device. The A/V input/output unit can receive input of image and audio signals of the external device. Further, a wireless communication unit can perform short-range wireless communication with other electronic devices.

The network interface 135 serves as an interface for connecting the image display apparatus 100 and a wired or wireless network such as the Internet. For example, the network interface 135 can receive contents or data from the Internet, a content provider, or a network operator over a network.

The memory 140 may store programs for processing and controlling of each signal by the controller 170, or may store processed video, audio, or data signals. In addition, the memory 140 may temporarily store video, audio, or data signals input via the external device interface 130. Further, the memory 130 may store information related to a predetermined broadcast channel using a channel memory function of a channel map and the like.

FIG. 2 illustrates an example where the memory 140 is provided separately from the controller 170, but the present invention is not limited thereto, and the memory 140 may be included in the controller 170. Further, the user input interface 150 can transmit a signal input by a user to the controller 170 or can transmit a signal from the controller 170 to the user.

For example, the user input interface 150 can transmit/receive a user input signal, such as a power on/off, a channel selection, a screen setting, and the like, from the remote controller 200, transfer a user input signal, which is input from a local key, such as a power key, a channel key, a volume key, or a setting key, to the controller 170, transfer a user input signal, which is input from a sensor unit for sensing a user's gesture, to the controller 170, or transmit a signal from the controller 170 to the sensor unit.

The controller 170 can also demultiplex stream, which is input via the tuner 110, the demodulator 120, or the external interface unit 130, or process the demultiplexed signals, to generate and output signals for outputting video or audio. In addition, the video signal processed by the controller 170 may be input to the display 180 to be output as a video corresponding to the video signal. Further, the video signal processed by the controller 170 may be input to an external output device via the external device interface 130.

The audio signal processed by the controller 170 can be output to the audio output unit 185, and the audio signal processed by the controller 170 can be input to the external output device through the external device interface 130. Further, the controller 170 may include a demultiplexer, a video processor, and the like, which will be illustrated with reference to FIG. 3.

In addition, the controller 170 can control the overall operation of the image display apparatus 100. For example, the controller 170 can control the tuner 110 to tune to an RF broadcast corresponding to a user-selected channel or a pre-stored channel. Further, the controller 170 can control the image display apparatus 100 by a user command input via the user input interface 150 or an internal program. For example, the controller 170 can control the display 180 to display an image such as a still image or a video, or a 2D or 3D image.

The controller 170 can control a predetermined 2D object in the image displayed on the display 180 to be generated and displayed as a 3D object. For example, the object may be at least one of an accessed web screen (newspaper, journal, etc.), an Electronic Program Guide (EPG), various menus, a widget, an icon, a still image, a video, and text.

The controller 170 can recognize a user's location based on an image captured by a capturing unit. For example, the controller 170 can recognize a distance (z-axial coordinates) between the user and the image display apparatus 100. Also, the controller 170 can recognize x-axial coordinates and y-axial coordinates in the display 180 corresponding to the user's location.

In addition, the image display apparatus 100 may further include a channel browsing processor which generates a thumbnail image corresponding to a channel signal or an external input signal. The channel browsing processor can receive a stream signal (TS) output from the demodulator 120 or a stream signal output from the external device interface 130, extract an image from the input stream signal, and generate a thumbnail image. The generated thumbnail image can be decoded into a stream form to be input to the controller 170 together with the decoded image. The controller 170 can display, on the rollable display 180, a thumbnail list including a plurality of thumbnail images using the input thumbnail images.

The thumbnail list can be displayed in a brief viewing manner in which the list is displayed in a portion of a display area while a predetermined image is displayed on the display 180, or in a full viewing manner in which the list is displayed in a full area. The thumbnail images in the thumbnail list may also be updated sequentially.

Further, the driving unit 175 may include a roller, on which the rollable display 180 is rolled, and a motor which rotates the roller. The rollable display 180 may be unrolled upward or may be rolled downward by the driving unit 175. The display 180 can also generate a driving signal by converting a video signal, a data signal, an OSD signal, and a control signal processed by the controller, or a video signal, a data signal, and a control signal received via the external device interface 130.

In addition, the display 180 includes an OLED panel which may be flexible or rollable. The display 180 may also be implemented as a touch screen to be used as an input device as well as an output device. Further, the audio output unit 185 can output sound by receiving an audio signal processed by the controller 170 and may include a speaker unit 185*a* as described above.

The capturing unit captures a user's image. The capturing unit may be implemented with a single camera, but is not limited thereto, and may be implemented with a plurality of cameras. The capturing unit may also be embedded in the image display apparatus 100 at the upper side of the display 180, or may be provided separately. The image information captured by the capturing unit can also be input to the controller 170.

Further, the controller 170 can also sense a user's gesture based on the image captured by the capturing unit, a signal sensed by the sensor unit, or a combination thereof. Also, the power supply 190 can supply power throughout the image display apparatus 100. Particularly, the power supply 190 can supply power to the controller 170 which may be implemented in a form of a system on chip (SOC), the display 180 to display an image, and the audio output unit 185 to output an audio. Specifically, the power supply 190 may include a converter which converts an alternating current into a direct current, and a dc/dc converter which converts the level of the direct current.

In addition, the remote controller 200 transmits a user input to the user input interface 150. Thus, the remote controller 200 may use various communication techniques, such as Bluetooth, RF communication, IR communication, Ultra Wideband (UWB), ZigBee, and the like. Further, the remote controller 200 can receive a video, audio, or data signal output from the user input interface 150, to display the signal on the remote controller 200 or output the signal thereon in the form of sound. The above-described image display apparatus 100 may also be a fixed or mobile digital broadcast receiver capable of receiving digital broadcast.

Further, the block diagram of the image display apparatus 100 illustrated in FIG. 2 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Unlike FIG. 2, the image display apparatus 100 may not include the tuner 110 and the demodulator 120 illustrated in FIG. 2, and may receive broadcast content via the network interface 135 or the external device interface 130, and play back the broadcast content. The image display apparatus 100 is also an example of an image signal processor which processes signals of an image stored in the apparatus or an input image. Another example of the image signal processor includes a set-top box, from which the display 180 and the audio output unit 185 are excluded, a DVD player, a Blu-ray player, a game console, a computer, and the like as described above.

Figure 3:
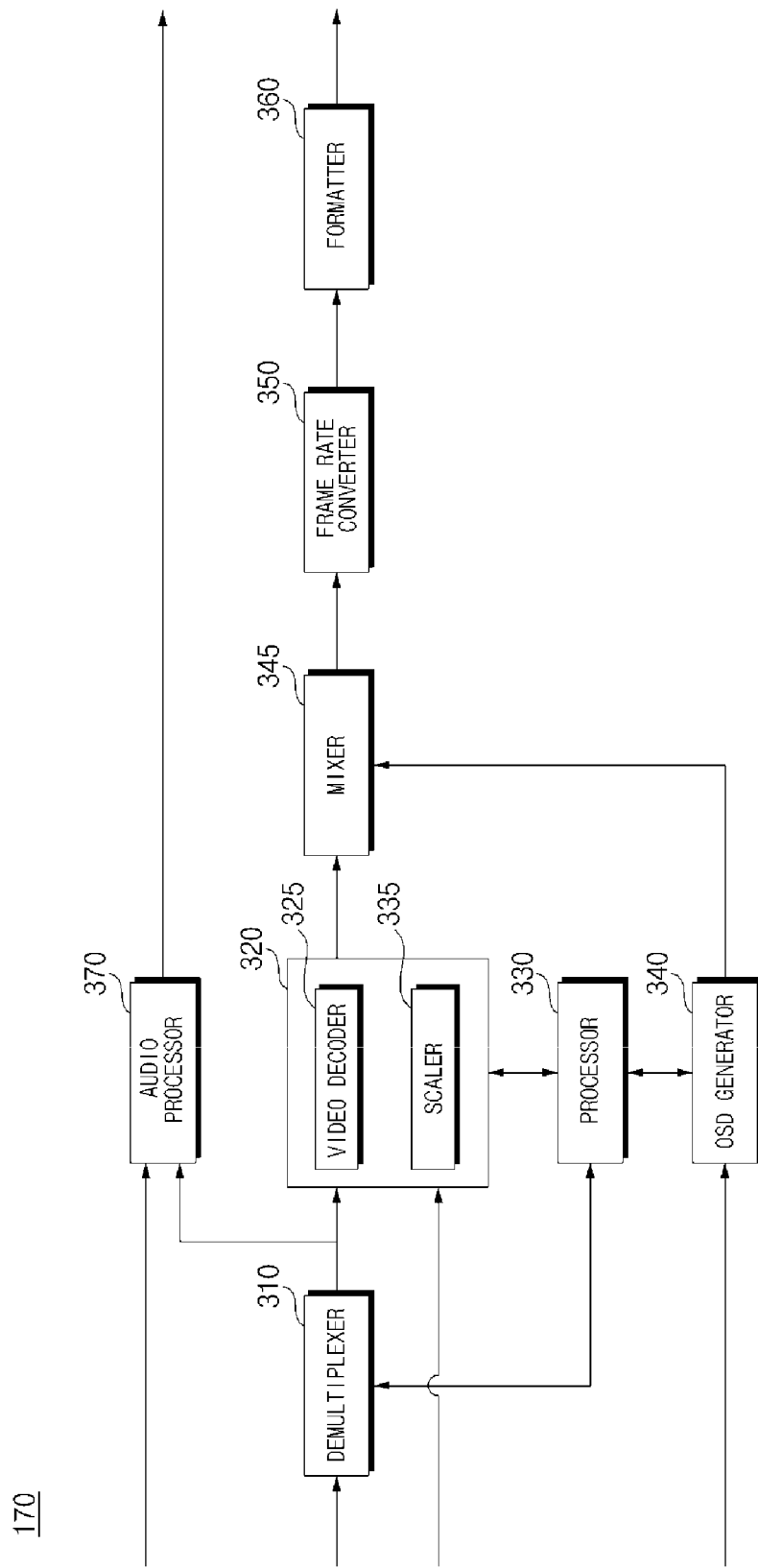
FIG. 3 is an internal block diagram of a controller of FIG. 2.

Next, FIG. 3 is an internal block diagram of the controller 170 of FIG. 2. Referring to FIG. 3, the controller 170 according to an embodiment of the present invention includes a demultiplexer 310, a video processor 320, a processor 330, an OSD generator 340, a mixer 345, a frame rate converter 350, a formatter 360, and an audio processor 370. In addition, the processor 170 may further include an audio processor 370 and a data processor.

The demultiplexer 310 demultiplexes an input stream. For example, the demultiplexer 310 can demultiplex an MPEG-2 TS into a video signal, an audio signal, and a data signal. The stream signal input to the demultiplexer 310 may be a stream signal output from the tuner 110, the demodulator 120, or the external device interface 130.

The video processor 320 can process the demultiplexed video signal. Thus, the video processor 320 may include a video decoder 225 and a scaler 235. The video processor 225 decodes the demultiplexed video signal, and the scaler 235 scales resolution of the decoded video signal so that the video signal can be displayed on the display 180. The video decoder 225 may also include decoders of various standards.

Further, the processor 330 can control the overall operation of the image display apparatus 100 or the controller 170. For example, the processor 330 controls the tuner 110 to tune to an RF signal corresponding to a channel selected by the user or a previously stored channel. The processor 330 can control the image display apparatus 100 by a user command input through the user input interface 150 or an internal program.

Further, the processor 330 can control data transmission of the network interface 135 or the external device interface 130. In addition, the processor 330 can control the operation of the demultiplexer 310, the video processor 320, the OSD generator 340 of the controller 170.

The OSD generator 340 generates an OSD signal autonomously or according to user input. For example, the OSD generator 340 can generate signals by which various types of information are displayed as graphics or text on the display 180 according to a user input signal. The generated OSD signal may include various data such as a User Interface (UI), various menus, widgets, icons, etc.

The OSD generator 340 can generate a pointer which can be displayed on the display according to a pointing signal received from the remote controller 200. Particularly, such pointer may be generated by a pointing signal processor and the OSD generator 340 may include such pointing signal processor. Alternatively, the pointing signal processor may be provided separately from the OSD generator 340 without being included therein.

In addition, the mixer 345 can mix the OSD signal generated by the OSD generator 340 and the decoded video signal processed by the video processor 320. The frame rate converter (FRC) 350 can convert a frame rate of an input video and output the input video as it is without converting the frame rate.

The formatter 360 can convert the format of an input video signal into a video signal suitable for the display 180. For example, the formatter 360 can convert the format into the low voltage differential signaling (LVDS) or mini-LVDS. In addition, the audio processor 370 in the controller 170 can process the demultiplexed audio signal, or an audio signal of a predetermined content. Thus, the audio processor 370 may include various decoders. Further, the audio processor 370 may also adjust the bass, treble, or volume of the audio signal.

A data processor in the controller 170 can process the demultiplexed data signal. For example, when the demultiplexed data signal is encoded, the data processor can decode the encoded demultiplexed data signal. Here, the encoded data signal may be Electronic Program Guide (EPG) information including broadcast information such as the start time and end time of a broadcast program which is broadcast through each channel.

The block diagram of the controller 170 illustrated in FIG. 3 is by example. The components of the block diagrams may be integrated or omitted, or a new component may be added according to the specifications of the controller 170. Particularly, the frame rate converter 350 and the formatter 360 may not be included in the controller 170 but may be provided individually, or may be provided separately as one module.

Figure 4:
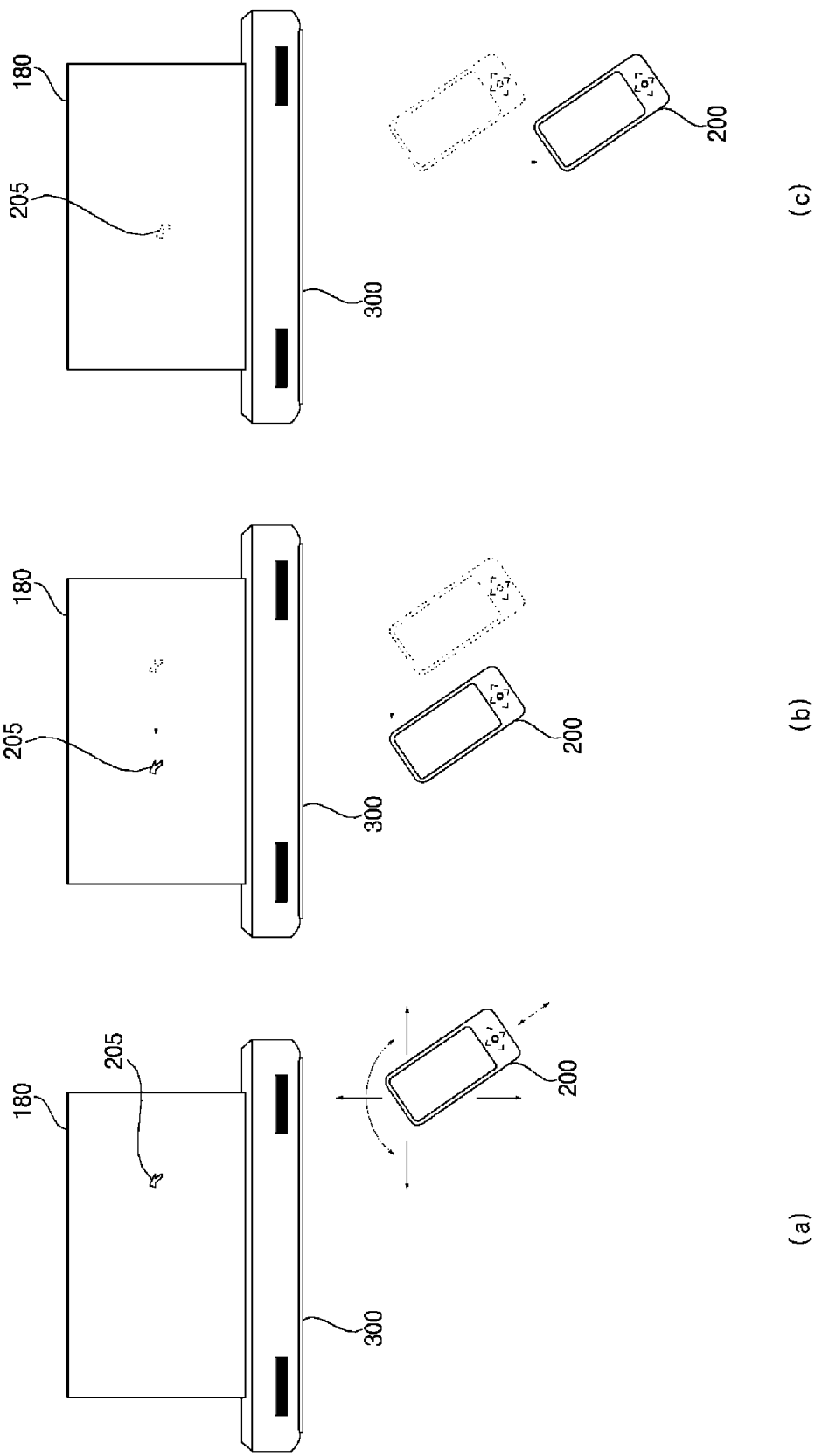
FIG. 4 is a diagram illustrating a method of controlling a remote controller of FIG. 2.

Next, FIG. 4 is a diagram illustrating a method of controlling the remote controller 200 of FIG. 2. As illustrated in (a) of FIG. 4, a pointer 205 corresponding to the remote controller 200 is displayed on the display 180. A user can move or turn the remote controller 200 vertically and horizontally ((b) of FIG. 4), and back and forth ((c) of FIG. 4). As shown, the pointer 205 displayed on the display 180 of the image display apparatus moves corresponding to the motion of the remote controller 200. As illustrated in FIG. 4, since the pointer 205 moves according to the motion of the remote controller 200 in a 3D space, the remote controller 200 may be referred to as a space remote controller or 3D pointing device.

As illustrated in (b) of FIG. 4, when a user moves the remote controller 200 to the left, the pointer 205 displayed in the display 180 of the image display apparatus also moves to the left corresponding to the movement. Information on the motion of the remote controller 200, which is sensed by a sensor thereof, is transmitted to the image display apparatus. The image display apparatus can calculate coordinates of the pointer 205 based on the information on the motion of the remote controller 200. The image display apparatus can display the pointer 205 to correspond to the calculated coordinates thereof.

As illustrated in (c) of FIG. 4, while pressing a specific button of the remote controller 200, a user can move the remote controller 200 away from the display 180. In this manner, a selected area of the display 180 corresponding to the pointer 205 is zoomed in and enlarged. By contrast, when the user moves the remote controller 200 toward the display 180, the selected area of the display 180 corresponding to the pointer 205 is zoomed out and reduced in size. Further, when the remote controller 200 moves away from the display 180, the selected area may be zoomed out, whereas when the remote controller 200 moves toward the display 180, the selected area may be zoomed in.

Alternatively, while a specific button of the remote controller 200 is pressed, the horizontal and vertical movement of the remote controller 200 may not be recognized. That is, when the remote controller 200 moves away or toward the display 180, the vertical or horizontal movement is not recognized, and only the back and forth movement is recognized. When the specific button of the remote controller 200 is not pressed, only the pointer 205 is moved according to the up and down and left and right movement of the remote controller 200. The moving speed or moving direction of the pointer 205 may correspond to the moving speed or moving direction of the remote controller 200.

Figure 5:
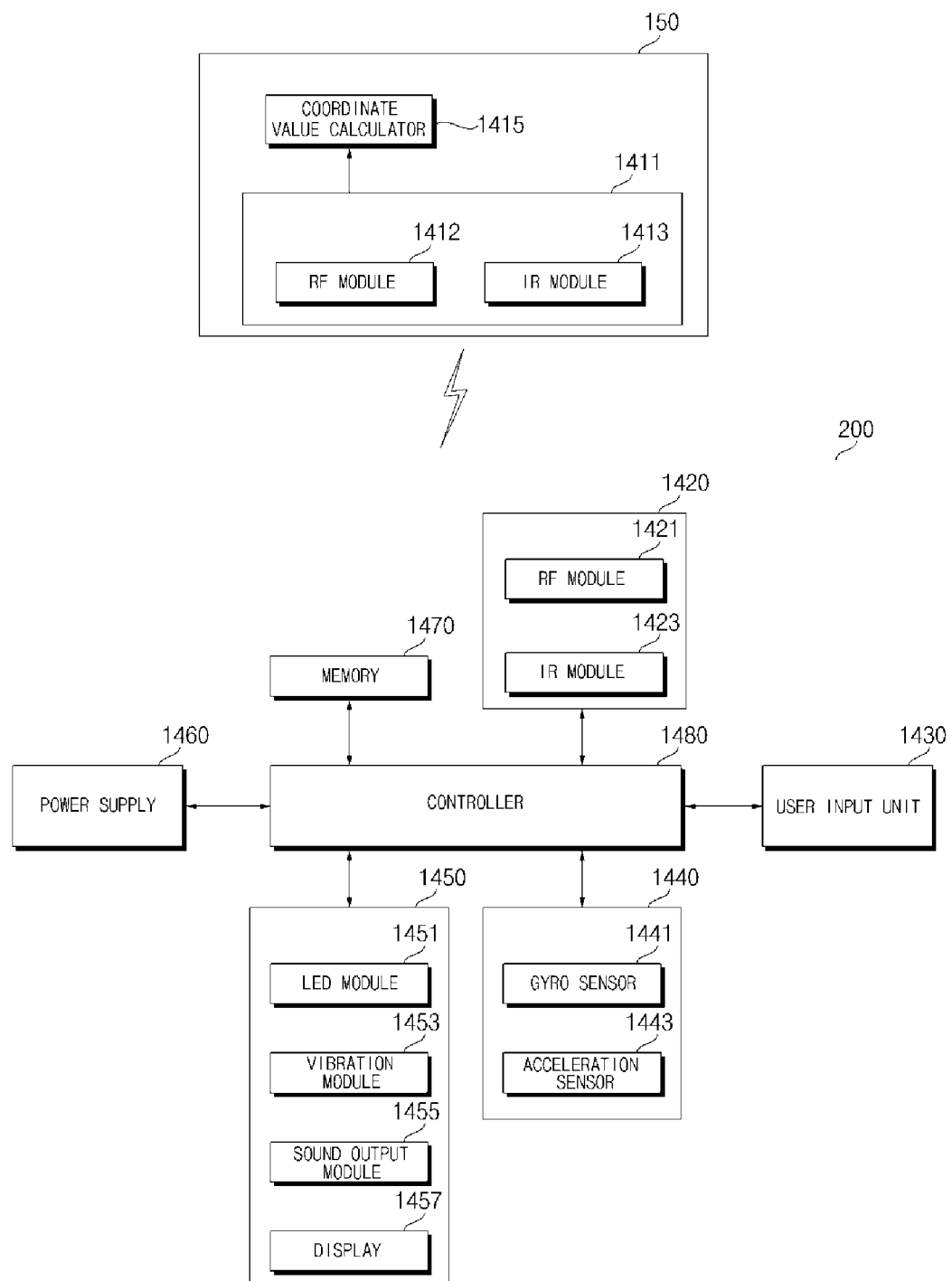
FIG. 5 is an internal block diagram of a remote controller of FIG. 2.

Next, FIG. 5 is an internal block diagram of a remote controller of FIG. 2. Referring to FIG. 5, the remote controller 200 includes a wireless communication unit 1425, a user input unit 1435, a sensor unit 1440, an output unit 1450, a power supply 1460, a memory 1470, and a controller 1480. The wireless communication unit 1425 transmits and receives signals to and from any one of the image display apparatuses according to the above-described embodiments of the present invention. Description below will be made based on any one of the image display apparatuses 100 according to the embodiments of the present invention.

In the embodiment, the remote controller 200 may include an RF module 1421 for transmitting and receiving signals to and from the image display apparatus 100 according to the RF communication standards. Further, the remote controller 200 may include an IF module 1423 for transmitting and receiving signals to and from the image display apparatus 100 according to the IR communication standards.

In the embodiment, the remote controller 200 can transmit signals, including information on movement and the like of the remote controller 200, to the image display apparatus 100 through the RF module 1421. Further, the remote controller 200 can receive signals, transmitted by the image display apparatus 100, through the RF module 1421. Also, if necessary, the remote controller 200 can transmit commands, including power on/off, channel change, volume change, and the like, to the image display apparatus 100 through the IR module 1423.

The user input unit 1435 may be composed of a keypad, a button, a touch pad, a touch screen, and the like. A user can operate the user input unit 1435 to input commands related to the image display apparatus 100 to the remote control apparatus 200. When the user input unit 1435 includes a hard key button, a user can input commands related to the image display apparatus 100 to the remote controller 200 by pushing the hard key button. When the user input unit 1435 includes a touch screen, the user can input commands related to the image display apparatus 100 to the remote control apparatus 200 by touching a soft key of the touch screen. Further, the user input unit 1435 may include various types of input units, such as a scroll key, a jog key, and the like, which may be manipulated by a user, but the present invention is not limited to this embodiment.

In addition, the sensor unit 1440 may include a gyro sensor 1441 or an acceleration sensor 1443. The gyro sensor 1441 can sense information on movement of the remote controller 200. For example, the gyro sensor 1441 can sense information on the operation of the remote control apparatus 200 based on x, y, and z axes. The acceleration sensor 1443 can sense information on a moving speed and the like of the remote controller 200. Moreover, the sensor unit 1440 may further include a distance measurement sensor to sense a distance with respect to the display 180.

Further, the output unit 1450 can output video or audio signals corresponding to the manipulation of the user input unit 1435 or to signals transmitted by the image display apparatus 100. A user can recognize, through the output unit 1450, whether the user input unit 1435 is manipulated or the image display apparatus 100 is controlled.

For example, in order to indicate when the user input unit 1435 is manipulated or a signal is transmitted and received with the image display apparatus 100 through the wireless communication unit 1425, the output unit 1450 may include an LED module 1451 which flashes, a vibration module 1453 which generates vibration, a sound output module 1455 which outputs sound, or a display 280 which outputs an image.

Also, the power supply 1460 supplies power to the remote controller 200. When the remote controller 200 does not move for a predetermined period of time, the power supply 1460 stops supplying power to reduce waste of power. The power supply 1460 may resume power supply when a predetermined key provided for the remote controller 200 is manipulated.

In addition, the memory 1470 may store various types of programs, application data, and the like, which are necessary to control or operate the remote control apparatus 200. When the remote control apparatus 200 transmits and receives signals wirelessly through the image display apparatus 100 and the RF module 1421, the remote controller 20 and the image display apparatus 100 transmit and receive signals through a predetermined frequency band. The controller 1480 of the remote controller 200 can store information related to a frequency band and the like in the memory 1470 for wirelessly transmitting and receiving signals with the image display apparatus 100 which is paired with the remote controller 200, and may refer to the stored information.

The controller 1480 controls the general operation related to the control of the remote controller 200. The controller 1480 can also transmit a signal corresponding to a predetermined key manipulation of the user input unit 1435, or a signal corresponding to movement of the remote controller 200 which is sensed by the sensor unit 1440, to the image display apparatus 100 through the wireless communication unit 1425.

In addition, the user input interface unit 150 of the image display apparatus 100 may include a wireless communication unit 151 which can wirelessly transmit and receive signals with the remote controller 200, and a coordinate value calculator 1415 which can calculate coordinates of a pointer corresponding to the operation of the remote controller 200. The user input interface 150 can also wirelessly transmit and receive signals with the remote controller 200 through the RF module 1421. Further, the remote controller 200 can receive signals, transmitted through the IR communication standards, through the IR module 1413.

The coordinate value calculator 1415 can calculate coordinate values (x and y) of the pointer 205 to be displayed on the display 180 by correcting hand trembling or an error based on a signal corresponding to the motion of the remote controller 200 which is received through the wireless communication unit 151. A signal, which is transmitted from the remote controller 200 and is input to the image display apparatus 100, is transmitted to the controller 170 of the image display apparatus 100 through the user input interface 150. Based on the signal transmitted from the remote controller 200, the controller 170 identifies information on the motion and key manipulation of the remote controller 200, and can control the image display apparatus 100 based on the information.

In another example, the remote controller 200 can calculate coordinate values of the pointer corresponding to the motion, and can output the calculated coordinate values to the user input interface 150 of the image display apparatus 100. In this instance, the user input interface 150 of the image display apparatus 100 can transmit information on the received coordinate values of the pointer to the controller 170 without separately correcting hand trembling or an error. Further, in yet another example, unlike FIG. 5, the coordinate value calculator 1415 may be included in the controller 170, rather than in the user input interface 150.

Figure 6:
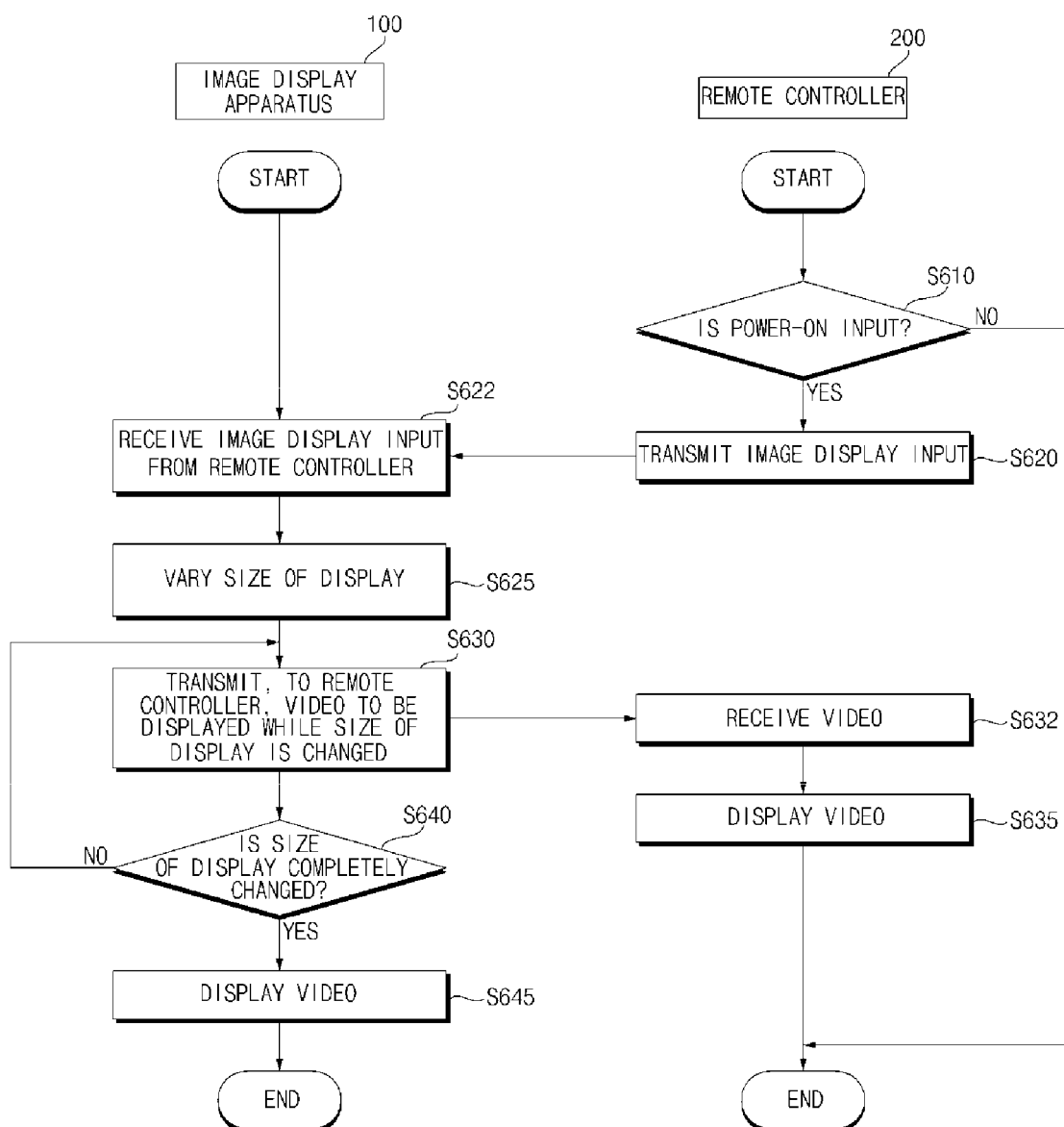
FIG. 6 is a flowchart illustrating a method of operating an image display apparatus including a rollable display according to an embodiment of the present invention.

Next, FIG. 6 is a flowchart illustrating a method of operating an image display apparatus including a rollable display according to an embodiment of the present invention, and FIGS. 7A to 15C are diagrams referred to in explaining the operation method of FIG. 6. Referring to FIG. 6, when a power key and the like of the remote controller 200 operate in S610, the remote controller 200 can transmit a power-on input to the image display apparatus 100.

When the power key and the like of the remote controller 200 operate, such that the remote controller 200 receives the power-on input (Yes in S610), an image display input is transmitted to the image display apparatus 100 in S620. Then, the controller 170 of the image display apparatus 100 receives the image display input through the user input interface 150 in S622.

In addition, the controller 170 of the image display apparatus 100 can change the size of a display in S625 according to the image display input. Specifically, the controller 170 of the image display apparatus 100 can control the driving unit 175 to unroll the display 180 upward.

The controller 170 of the image display apparatus 100 can also control video information, which is to be displayed while changing the size of the display 180, to be transmitted to the remote controller 200 in S630. Then, the remote controller 200 can receive the video information to be displayed in S632.

Subsequently, based on the received video information, the controller 1480 of the remote controller 200 can control a first video, corresponding to the video to be displayed on the display of the image display apparatus 100, to be displayed on a display 280 in S635. Thus, the image can be displayed in advance on the remote controller 200 while the display 180 is unrolled upward.

Next, once the size of the display 180 is completely changed in S640, the controller 170 of the image display apparatus 100 can control the video to be displayed on the display 180 in S645, which is fully unrolled. Then, the controller 170 of the image display apparatus 100 can control the video information to be displayed not to be transmitted to the remote controller 200 any longer. Thus, a user can view a seamless image through the display 180.

According to the power-on input described above, the image display apparatus 100 and the remote controller 200 can be paired by transmitting and receiving a pairing signal and a pairing response signal. After pairing is complete, the controller 170 of the image display apparatus 100 can receive the image display input, or can transmit information of a video to be displayed.

In response to receiving the image display input after the pairing is complete, the control unit 170 of the image display apparatus 100 process a video signal of the video to be displayed, and can control information on the signal-processed video to be transmitted to the remote controller 200 by mirroring while the size of the display is changed, particularly while the display 180 is unrolled upward.

The controller 170 of the image display apparatus 100 can also terminate mirroring when the display 180 is fully unrolled. Accordingly, the controller 170 of the image display apparatus 100 can control the information of the video to be displayed not to be transmitted to the remote controller 200 any more after the display 180 is fully unrolled.

Figure 7A:
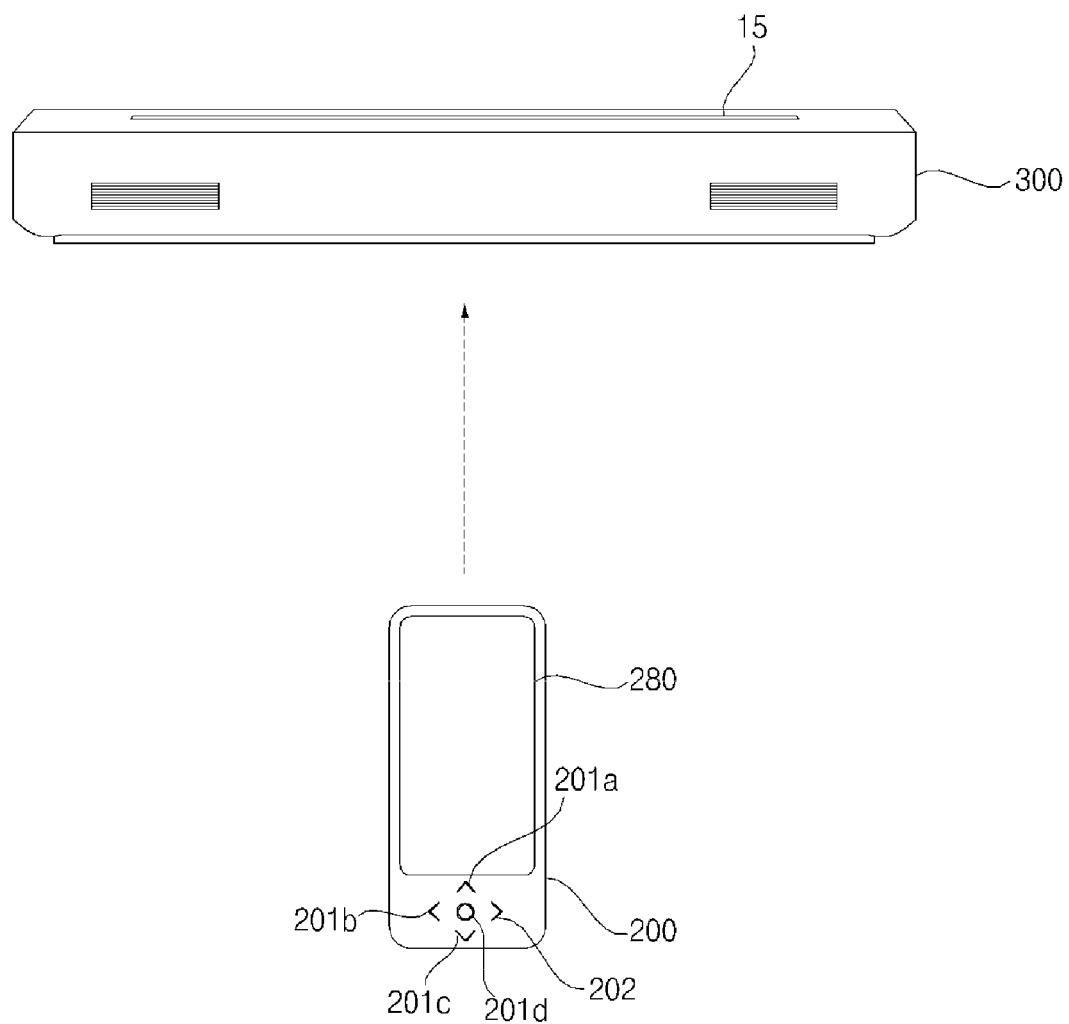
FIGS. 7A to 15C are diagrams referred to in explaining the operation method of FIG. 6.

FIG. 7A illustrates an example where an image display input is transmitted from the remote controller 200 to the image display apparatus 100 by an operation of a predetermined key and the like of the remote controller 200. Further, FIG. 7A illustrates an example where the rollable display 180 is rolled into the signal processor 300 so as not to be exposed to the outside of the opening 15.

Once the remote controller 200 transmits the image display input, the control unit 170 of the image display apparatus 100 can receive the image display input through the user input interface 150. The predetermined key for the image display input may correspond to a power key, an external input key, and the like.

For example, when the power key of the remote controller 200 operates, a power-on input can be transmitted to the image display apparatus 100. The controller 170 of the image display apparatus 100 can control a broadcast video to be displayed according to the power-on input. That is, the power-on input by the operation of the power key may correspond to a broadcast video display input. In another example, when an external input key of the remote controller 200 operates, an external input display input can be transmitted to the image display apparatus 100. The controller 170 of the image display apparatus 100 can then control the external input video to be displayed according to the external input display input.

Figure 7B:
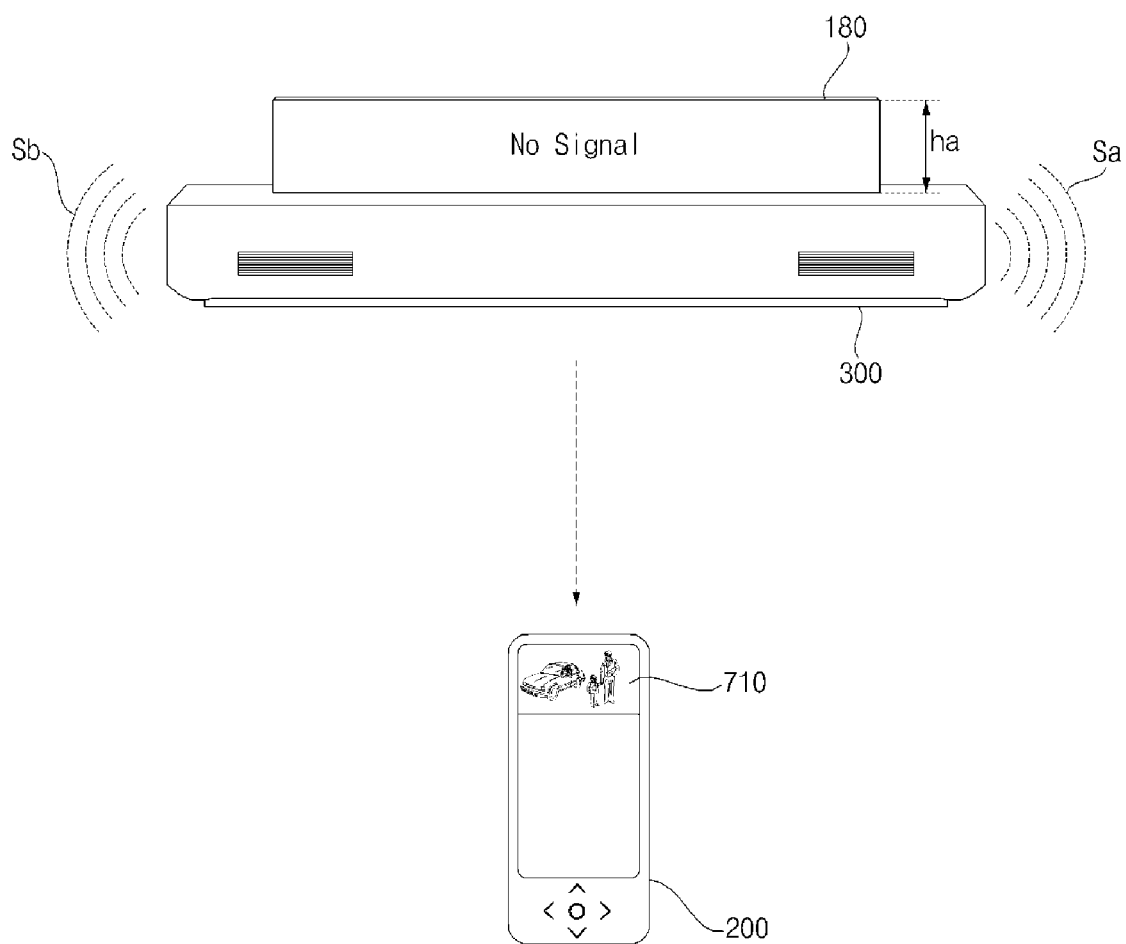

Next, FIG. 7B illustrates an example where the rollable display 180 is unrolled upward according to the image display input. In particular, the controller 170 of the image display apparatus 100 can control the rollable display 180 to be unrolled upward according to the received image display input as illustrated in FIG. 7B, in which the rollable display 180 is at a height ha.

In addition, the controller 170 of the image display apparatus 100 can control any image not to be displayed on the rollable display 180 while the rollable display 180 is unrolled upward. Further, the controller 170 of the image display apparatus 100 can display a first video, corresponding to the video to be displayed on the display 180, to be displayed on the display 280 of the remote controller 200.

That is, once the rollable display 180 is fully unrolled, the controller 170 of the image display apparatus 100 can control video information, corresponding to the video to be displayed, to be transmitted through the user input interface 150 as illustrated in FIG. 7B, so that the first video, corresponding to the video to be displayed, can be displayed on the display 280 of the remote controller 200.

The remote controller 200 can receive video information through the communication unit 1420, and can display the first video 710 on the display 280 corresponding to the received video information. Thus, the image can be displayed in advance on the remote controller 200 while the rollable display 180 is unrolled upward, and a user can conveniently check a video to be viewed through the remote controller 200.

Further, the controller 170 of the image display apparatus 100 can output sounds Sa and Sb for the first video 710 through the audio output unit 185. Specifically, the sounds Sa and Sb for the first video 710 can be output through the speaker unit 185a of the signal processor 300. The controller 170 of the image display apparatus 100 can also control the playback sync information to be transmitted to the remote controller 200, so that display of the first video 710 and output of the sound for the first video 710 is synchronized and performed at the display 380 of the remote controller 200 and the speaker unit 185a of the signal processor 300 respectively.

Accordingly, the display 280 of the remote controller 200 and the speaker unit 185a of the signal processor 300 can synchronize the first video 710 and the sounds Sa and Sb for the first video 710 based on the playback sync information, and can output the synchronized image and sounds.

Figure 7C:
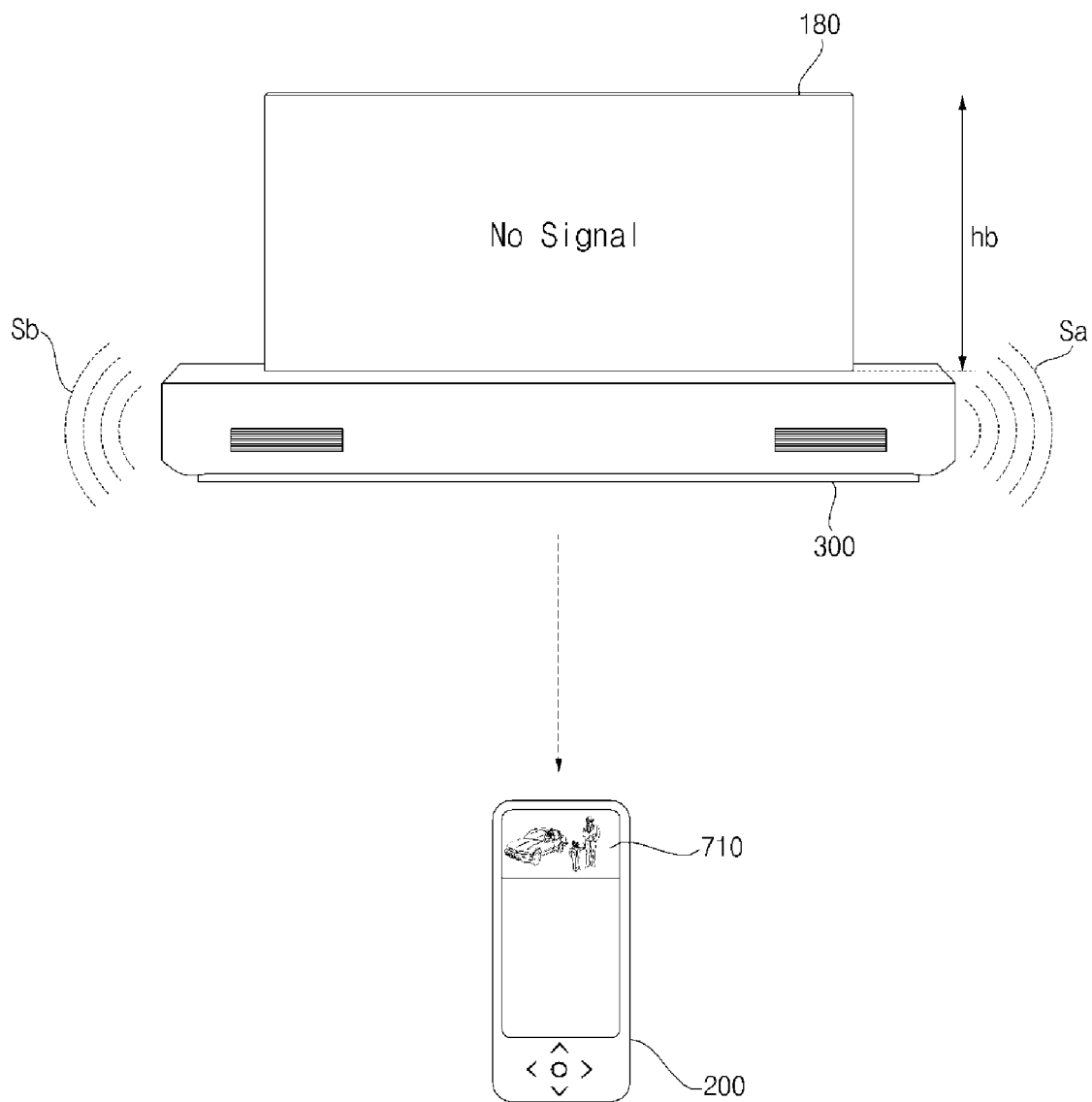

FIG. 7C is similar to FIG. 7B, except that the rollable display 180 is at a height hb which is higher than the height ha. Referring to FIG. 7C, the controller 170 of the image display apparatus 100 can control any image not be displayed on the rollable display 180 since the rollable display 180 is being unrolled upward, control the first video 710 to be displayed on the display 280 of the remote controller 200, and control the sounds Sa and Sb for the first video 710 to be output through the audio output unit 185.

Figure 7D:
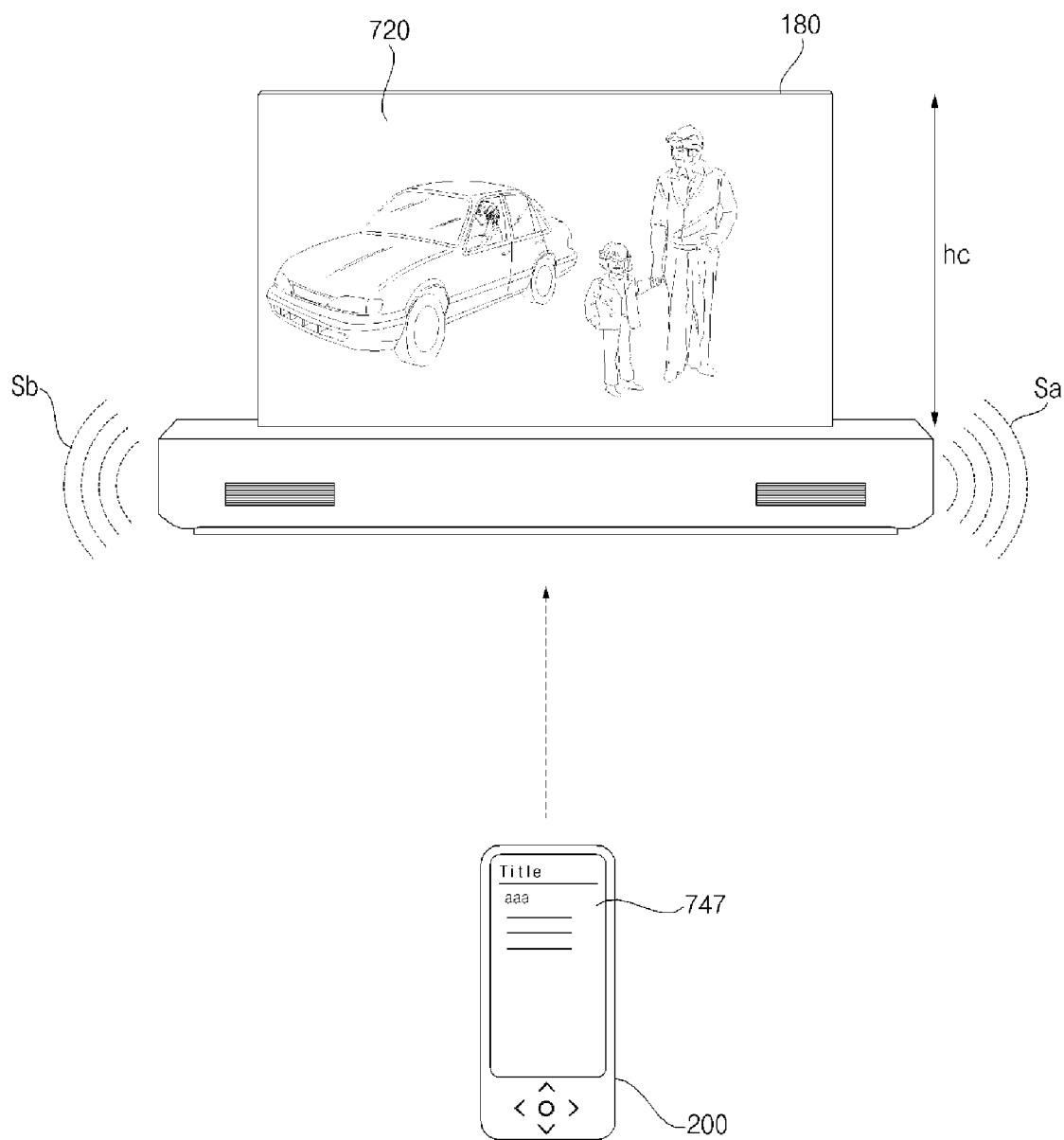

FIG. 7D illustrates an example where the rollable display 180 is fully unrolled, and the display 180 is at a height hc which is a first height. When the rollable display 180 is fully unrolled, such that the height of the display 180 is the first height hc, the controller 170 of the image display apparatus 100 can control the display 180 to display a video 720 to be displayed.

Thus, once the display 180 is fully unrolled, and the height of the display 180 is the first height hc, the video to be displayed is displayed on the display 180, thereby enabling a user to seamlessly view the video 720 on the display 180 following the first video 710 displayed on the display 280 of the remote controller 200, which increases user's convenience.

Once the rollable display 180 is fully unrolled, the controller 170 of the image display apparatus 100 can control the first video not to be displayed on the display 280 of the remote controller 200. That is, the controller 170 of the image display apparatus 100 can control the video information not to be transmitted to the remote controller 200 any longer.

Once the rollable display 180 is fully unrolled, the control unit 170 of the image display apparatus 100 can control information related to the video displayed on the display 180 to be transmitted to the remote controller 200. Thus, the remote controller 200 can display information 747 related to the video displayed on the display 180 as illustrated in FIG. 7D. Here, the information 747 related to the video displayed on the display 180 may correspond to title information, content information, and the like.

Figure 8A:
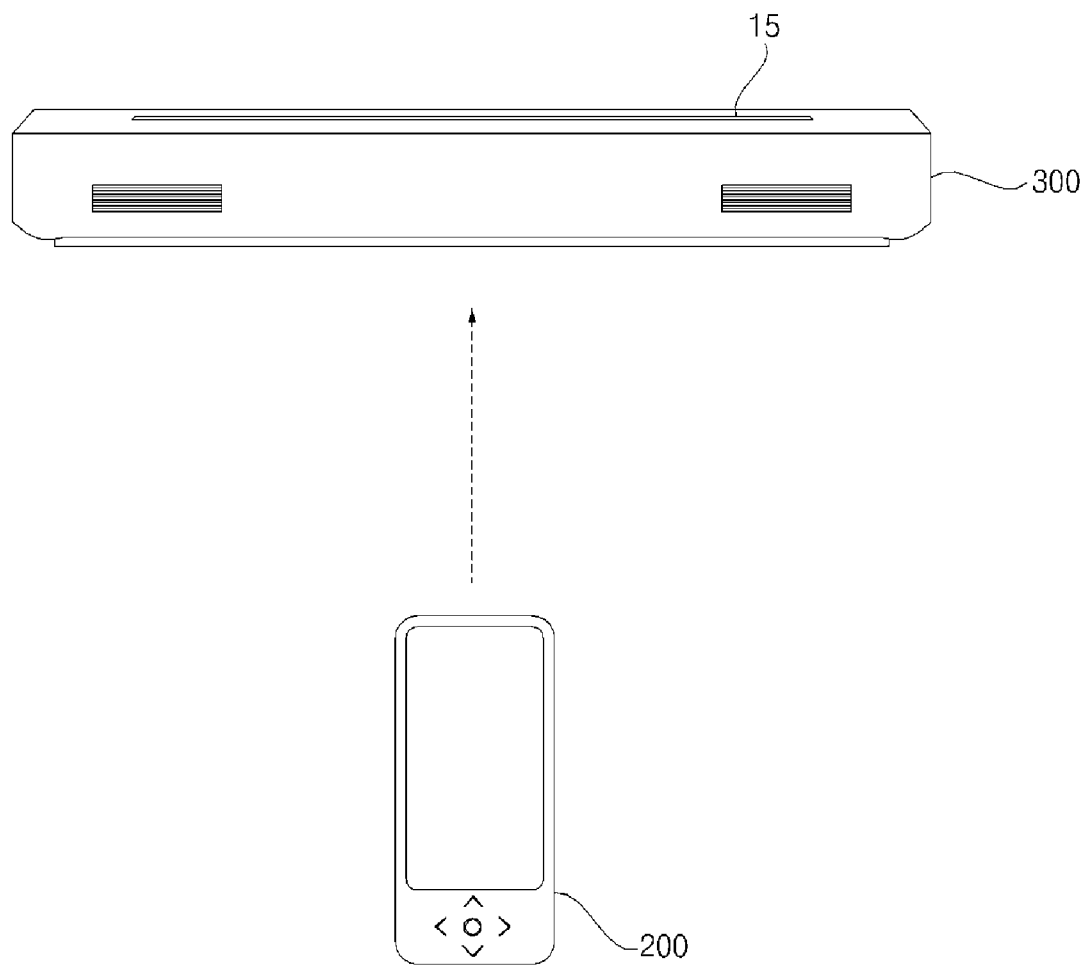

FIGS. 8A to 8D are similar to FIGS. 7A to 7D, except that while the display 180 is unrolled upward, the first video is displayed on the display 280 of the remote controller 200, and a sound corresponding to the first video is output through the sound output module 1455 of the remote controller 200. FIG. 8A illustrates an example where an image display input is transmitted from the remote controller 200 to the signal processor 300 of the image display apparatus 100, which is the same as FIG. 7A.

Figure 8B:
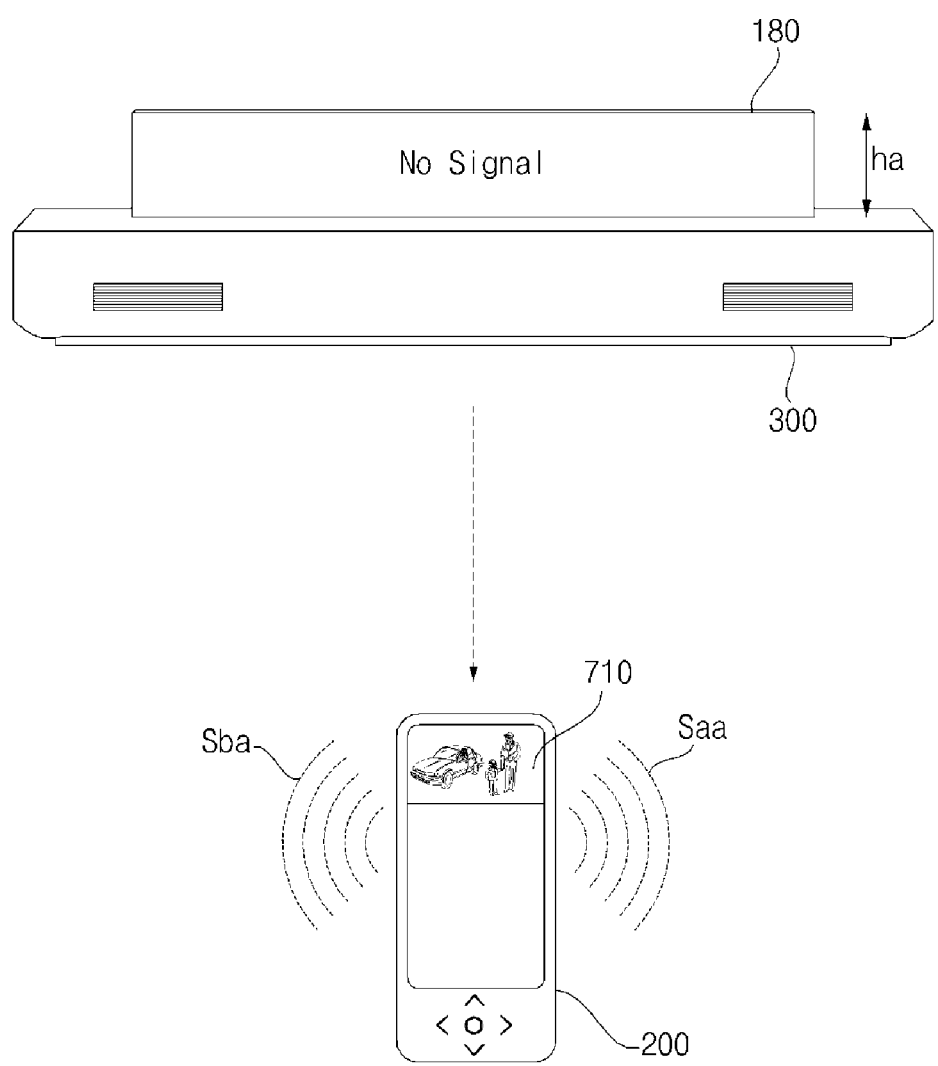

Similarly to FIG. 7B, FIG. 8B illustrates an example where the rollable display 180 is unrolled upward according to the image display input. As shown, the controller 170 of the image display apparatus 100 can control any image not to be displayed on the rollable display 180 while the rollable display 180 is unrolled upward.

While the rollable display 180 is unrolled upward, the controller 170 of the image display apparatus 100 can control a first video, corresponding to the video to be displayed on the display 180, to be displayed on the display 280 of the remote controller 200. Further, while the rollable display 180 is unrolled upward, the controller 170 of the image display apparatus 100 can control sounds Saa and Sba for the first video 710 to be output through the sound output module 1455.

Thus, the controller 170 of the image display apparatus 100 can control video information and audio information to be transmitted to the remote controller 200. Thus, the remote controller 200 can display the first video 710 on the display 280 while outputting the sounds Saa and Sba for the first video 710 through the sound output module 1455.

Figure 8C:
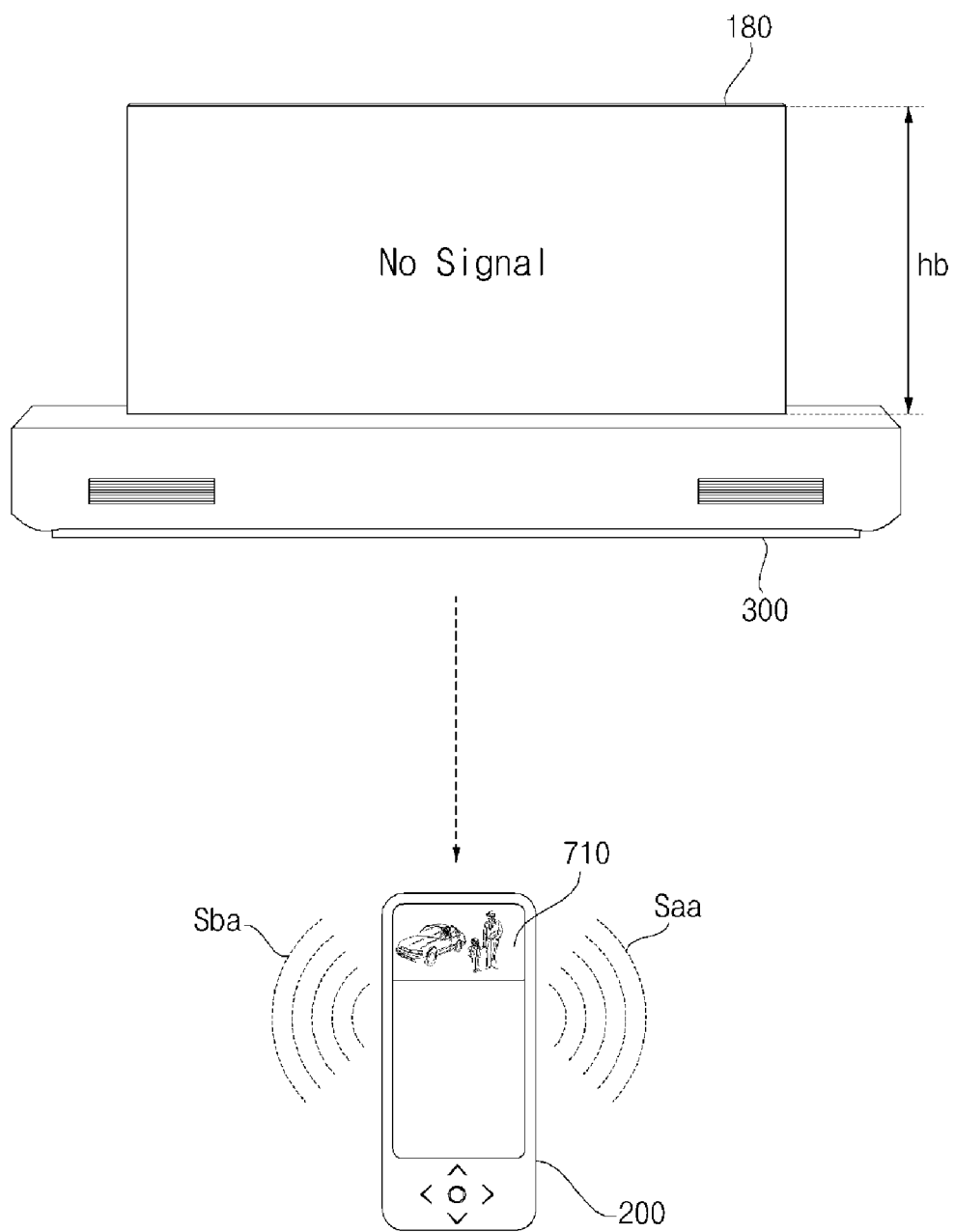
Figure 8D:
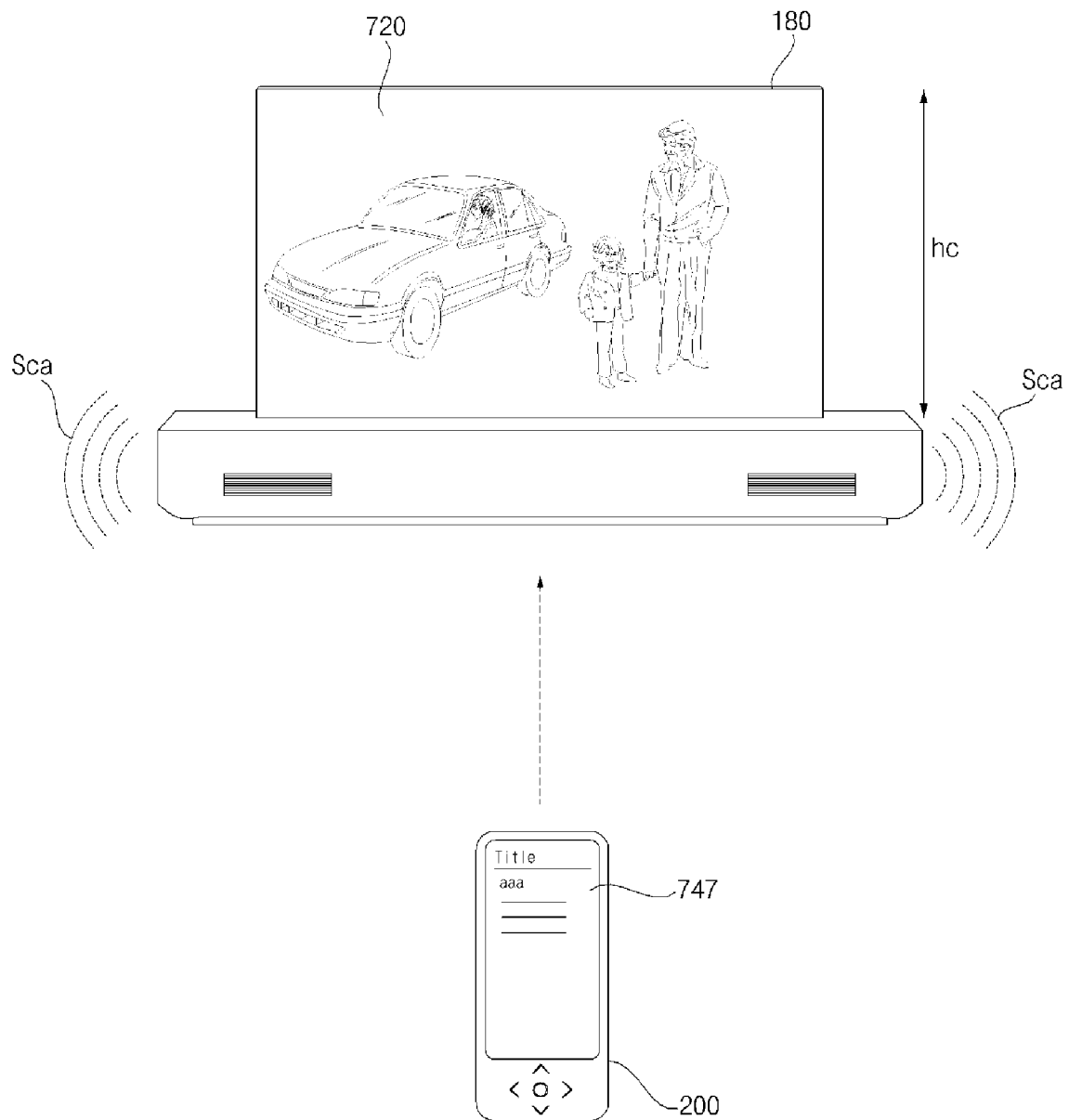

FIG. 8C illustrates an example where the rollable display 180 is at a height hb which is higher than the height ha. Also, FIG. 8D illustrates an example where the rollable display 180 is fully unrolled, and the height of the display 180 is the height hc which is the first height. Once the display 180 is fully unrolled, and the height of the display 180 is the first height hc, the controller 170 of the image display apparatus 100 can control the video 720 to be displayed to be displayed on the display 180, and can output a sound Sca for the video to be output through the audio output unit 185.

Thus, once the display 180 is fully unrolled, and the height of the display 180 is the first height hc, the video to be displayed is displayed on the display 180, and the sound Sca is output through the audio output unit 185, thereby enabling a user to seamlessly view the video 720 on the display 180 and hear the sound Sca, which increases user convenience.

Once the rollable display 180 is fully unrolled, the controller 170 of the image display apparatus 100 can control the first video not to be displayed on the display 280 of the remote controller 200, and can control the sound for the video not to be output. That is, the controller 170 of the image display apparatus 100 can control the video information and the audio information not to be transmitted to the remote controller 200 any longer.

While the display 180 is unrolled upward, the controller 170 of the image display apparatus 100 can control the first video and a channel list to be displayed on the display 280 of the remote controller 200, which will be described with reference to FIGS. 9A to 9D.

Figure 9A:
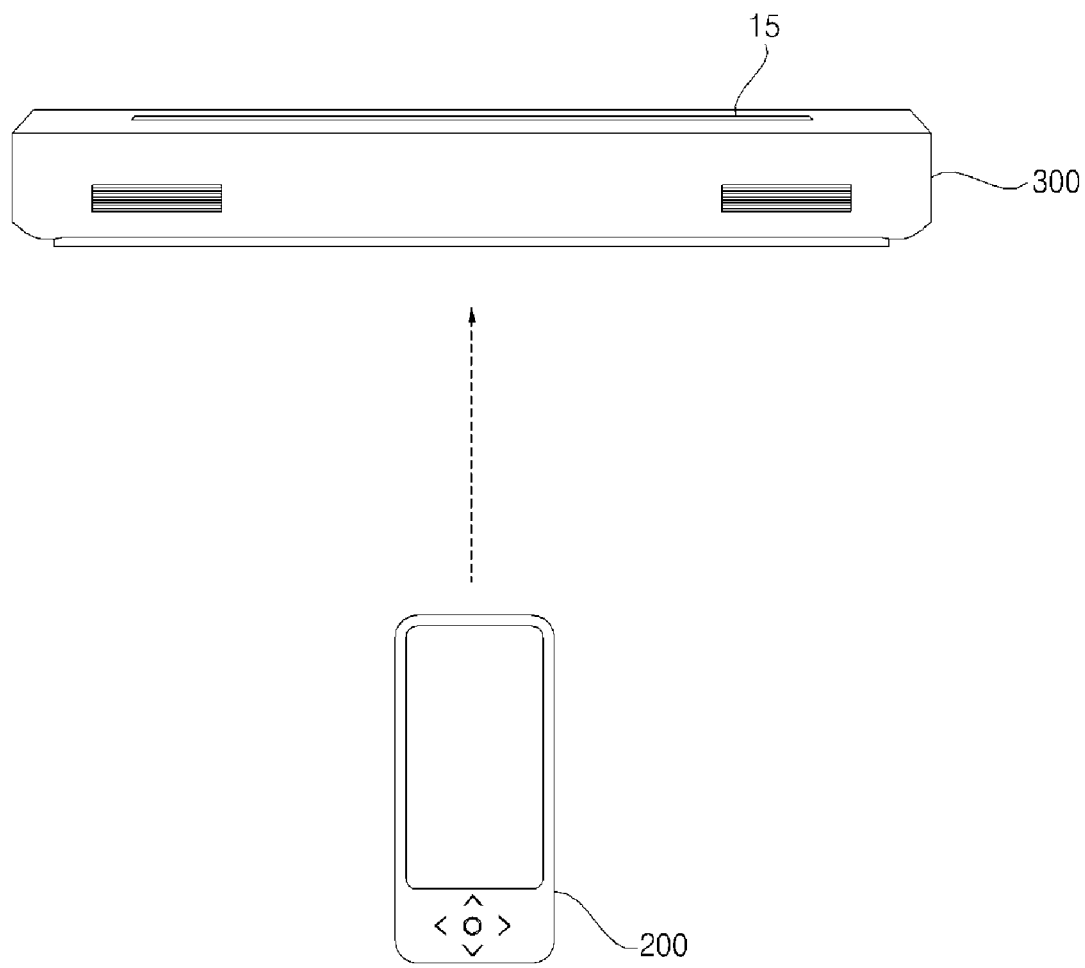

In particular, FIGS. 9A to 9D are similar to FIGS. 7A and 7D, such that description below will be made based on differences therebetween. FIG. 9A illustrates an example where an image display input is transmitted from the remote controller 200 to the signal processor 300 of the image display apparatus 100, which is the same as FIG. 7A.

Figure 9B:
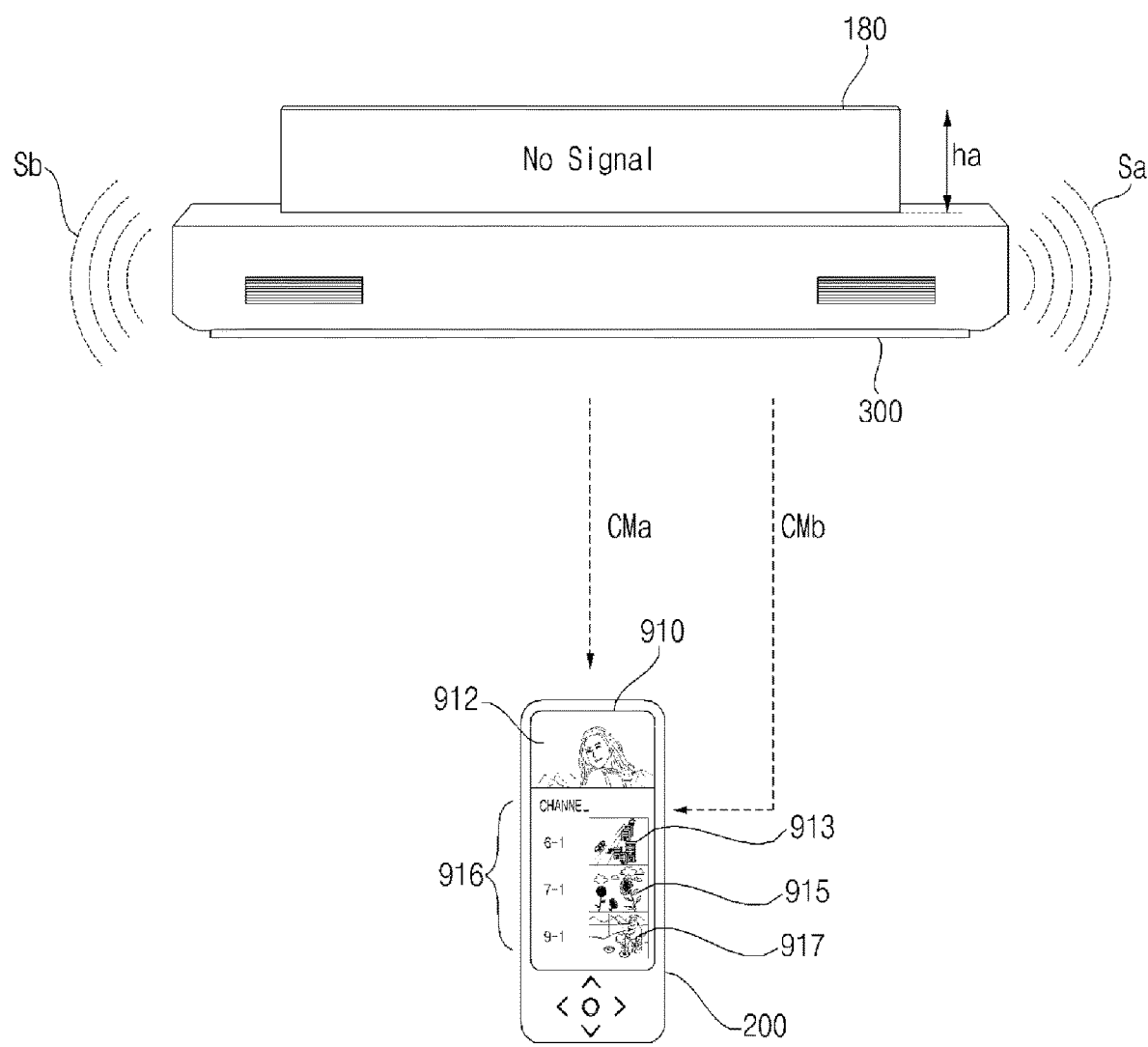

Similarly to FIG. 7B, FIG. 9B illustrates an example where the rollable display 180 is unrolled upward according to the image display input. While the rollable display 180 is unrolled upward, the controller 170 of the image display apparatus 100 can control any image not to be displayed on the rollable display 180.

While the rollable display 180 is unrolled upward, the controller 170 of the image display apparatus 100 can control a first video 912, corresponding to the video to be displayed on the display 180, and a thumbnail list 916 including a plurality of thumbnail images 913, 915, and 917, to be displayed on the display 280 of the remote controller 200.

Thus, the controller 170 of the image display apparatus 100 can control video information CMa on the first video, and information CMb on the thumbnail list 916 to be transmitted to the remote controller 200. Accordingly, the remote controller 200 can display the first video 912, and the thumbnail list 916 including the plurality of thumbnail images 913, 915, and 917 on the display 280.

While the rollable display 180 is unrolled upward, the controller 170 of the image display apparatus 100 can control the video information CMa on the first video, corresponding to the video to be displayed on the display 180, to be transmitted to the remote controller 200 by using a first communication method, and information CMb on the thumbnail list 916 to be transmitted to the remote controller 200 by using a second communication method.

For example, the first communication method may be a Miracast communication scheme, and the second communication method may be a Bluetooth or Wi-Fi communication scheme. Thus, by transmitting the video information CMa on the first video and the information CMb on the thumbnail list 916 by using different communication schemes, each information can be transmitted in a stable manner. Particularly, the video information CMa on the first video, which is a large amount of information, can be transmitted stably to the remote controller 200.

Unlike the drawings, the video information CMa on the first video may also be transmitted from the image display apparatus 100 to the remote controller 200 by mirroring, and the information CMb on the thumbnail list 916 may also be received through an external server and the like, instead of the image display apparatus 100. In this instance, the remote controller 200 can stably receive the video information CMa on the first video, which is a large amount of information.

Figure 9C:
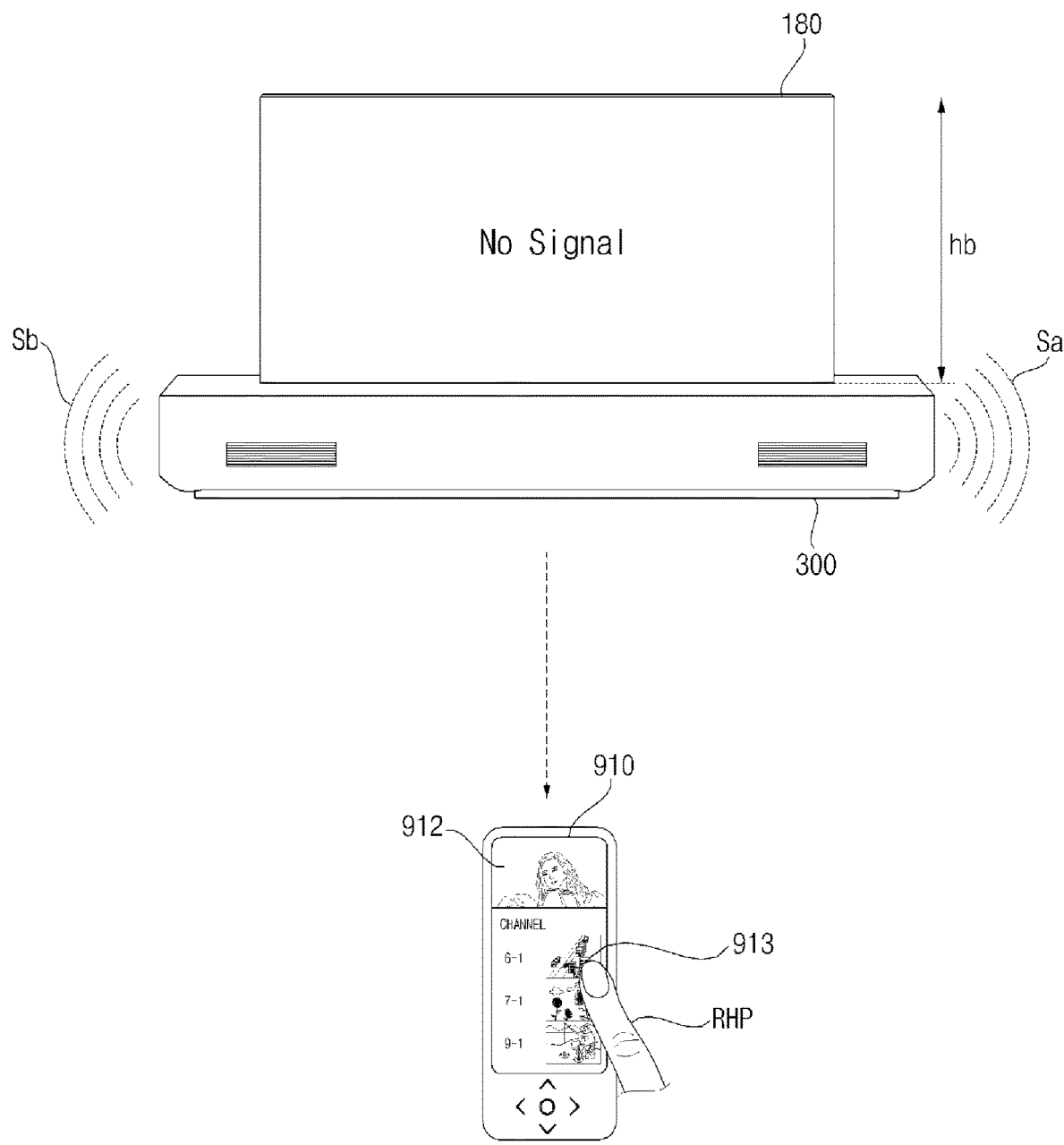

FIG. 9C illustrates an example where the rollable display 180 is at the height hb which is higher than the height ha. When the first thumbnail image 913 is selected from among the plurality of thumbnail images 913, 915, and 917, the remote controller 200 can transmit information on the first thumbnail image 913 to the image display apparatus 100.

Figure 9D:
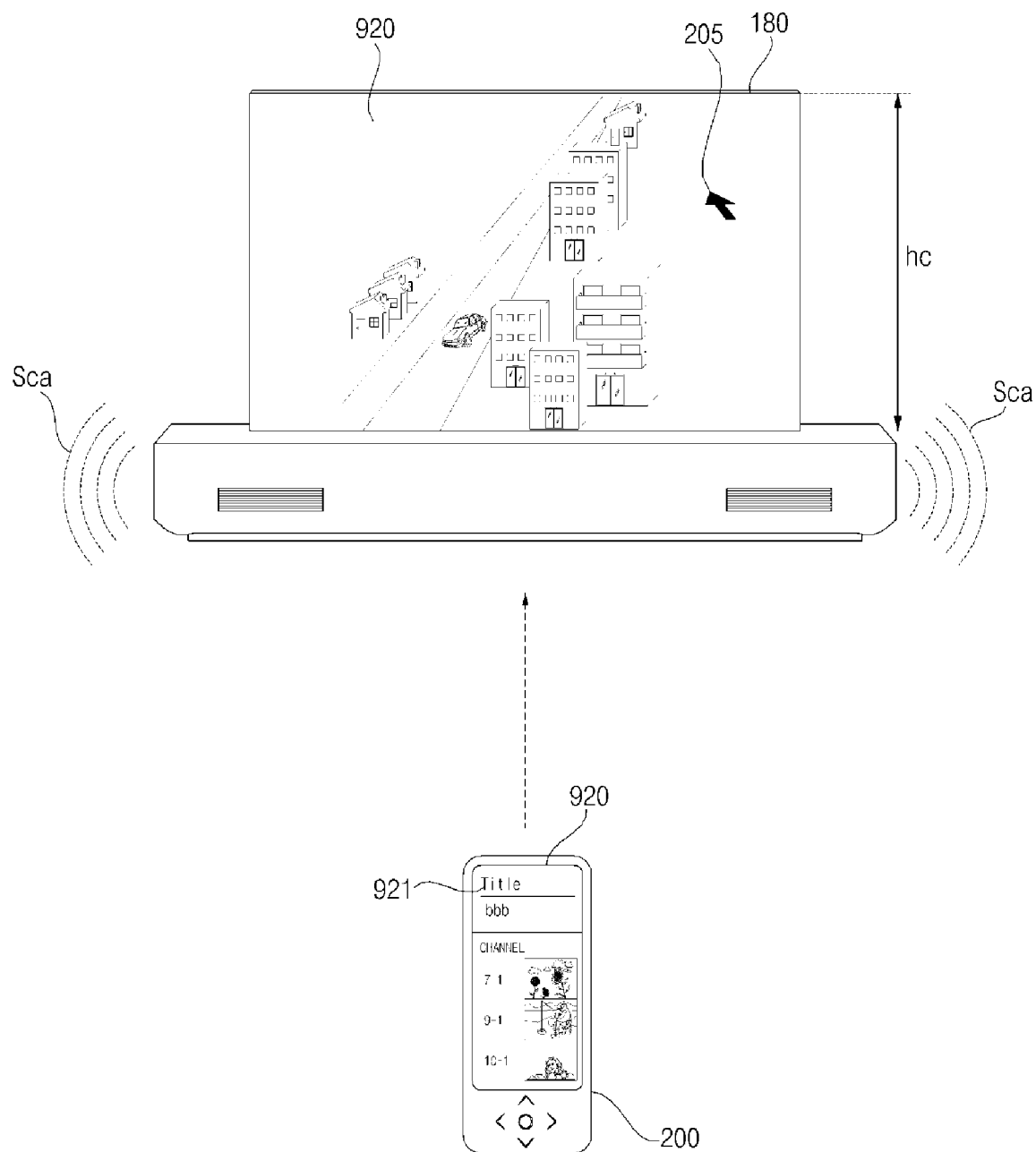

Accordingly, the controller 170 of the image display apparatus 100 can receive information on the first thumbnail image 913, and when the display 180 is unrolled upward to reach the first height hc, the controller 170 of the image display apparatus 100 can control the first video 912 not to be displayed on the display 180, and the video 920 corresponding to the first thumbnail image 913 to be displayed on the display 180 as illustrated in FIG. 9D. The thumbnail list described with reference to FIGS. 9A to 9D may be a broadcast channel list.

As illustrated in FIG. 9B, while the rollable display 180 is unrolled upward, the control unit 170 of the image display apparatus 100 can control the first video 912, corresponding to the video to be displayed on the display 180, and a channel list to be displayed on the display 280 of the remote controller 200.

When any one channel is selected from the channel list as illustrated in FIG. 9C, the controller 170 of the image display apparatus 100 can control a video, corresponding to the first video 912, not to be displayed on the display 180, and a broadcast video 920, corresponding to the selected channel, to be displayed on the display 180 as illustrated FIG. 9D. Thus, while the rollable display is unrolled upward, a channel desired by a user can be selected, and when the display is fully unrolled, and a broadcast video corresponding to the selected channel can be displayed, thereby increasing user convenience.

As illustrated in FIG. 9D, when the rollable display 180 is fully unrolled, the controller 170 of the image display apparatus 100 can control the pointer 205 to be displayed based on a pointing signal received from the remote controller 200. As illustrated in FIG. 9D, when the rollable display 180 is fully unrolled, the controller 170 of the image display apparatus 100 can control the first video not to be displayed on the display 280 of the remote controller 200, and can transmit video related information to the remote controller 200, so that the information on the image 920, which is displayed on the display 180 instead, can be displayed. Thus, the remote controller 200 can display the video related information 921 and the channel list together on the display 280 as illustrated in FIG. 9D.

Figure 9E:
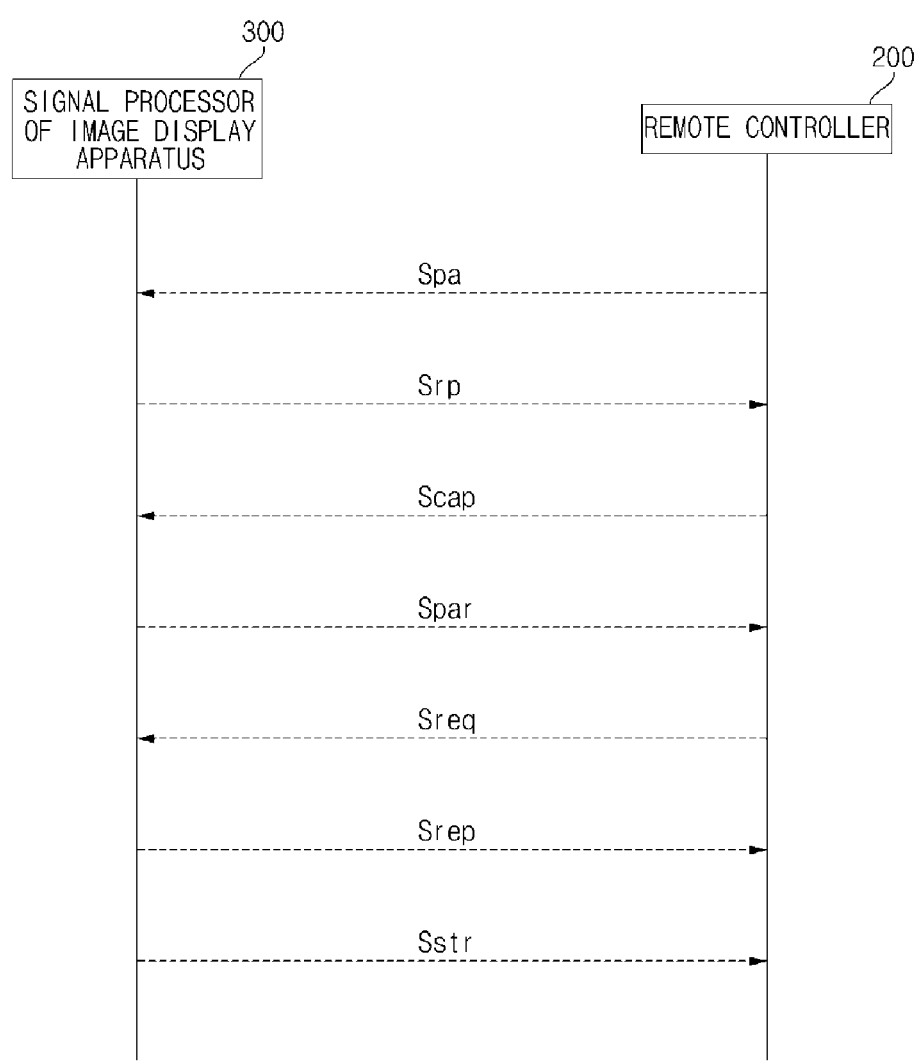

FIG. 9E is a diagram illustrating a signal flow for transmission of video information CMa on the first video between the signal processor 300 and the remote controller 200. First, by operating a predetermined key of the remote controller 200, the remote controller 200 can transmit a pairing signal Spa to the signal processor 300 of the image display apparatus 100. Thus, the signal processor 200 of the image display apparatus 100 can transmit a pairing response signal Srp to the remote controller 200, thereby completing pairing for mirroring.

Then, the remote controller 200 can transmit, to the signal processor 300 of the image display apparatus 100, information on an area where the first video is to be displayed, information Scap on resolution that can be displayed, and the like. Based on the information on an area where the first video is to be displayed, and the information Scap on resolution that can be displayed, the signal processor 300 of the image display apparatus 100 can process a signal, such as resolution of the first video to be transmitted, and the like.

Further, the signal processor 300 of the image display apparatus 100 can transmit, to the remote controller 200, parameter information or setup information on the first video to be transmitted. Then, the signal processor 300 of the image processing apparatus 100 can transmit, to the remote controller 200, information on the first video to be displayed by a Miracast communication scheme using a streaming method such as real-time streaming protocol (RTSP). Accordingly, the remote controller 200 can display the first video at a determined position of the display 280 with a determined resolution.

Further, while the display 180 is unrolled upward, the controller 170 of the image display apparatus 100 can control an application list, including a plurality of application items, to be displayed on the display 280 of the remote controller 200, which will be described with reference to FIGS. 10A to 10D.

Figure 10A:
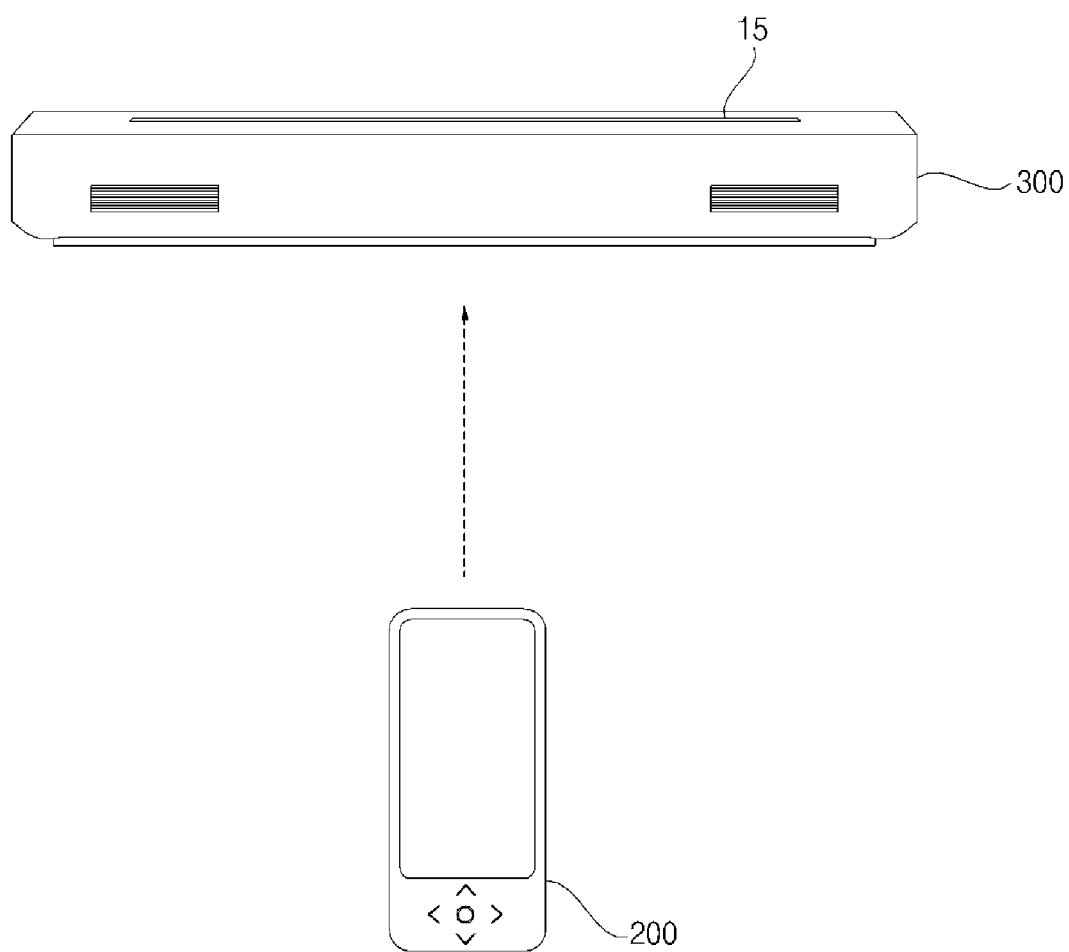

FIGS. 10A to 10D are similar to FIGS. 7A to 7D, such that description below will be made based on differences therebetween. In particular, FIG. 10A illustrates an example where an image display input is transmitted from the remote controller 200 to the signal processor 300 of the image display apparatus 100, which is the same as FIG. 7A. For example, the image display input may be a home screen display input. The home screen may include a broadcast video and an application list including a plurality of application items.

Figure 10B:
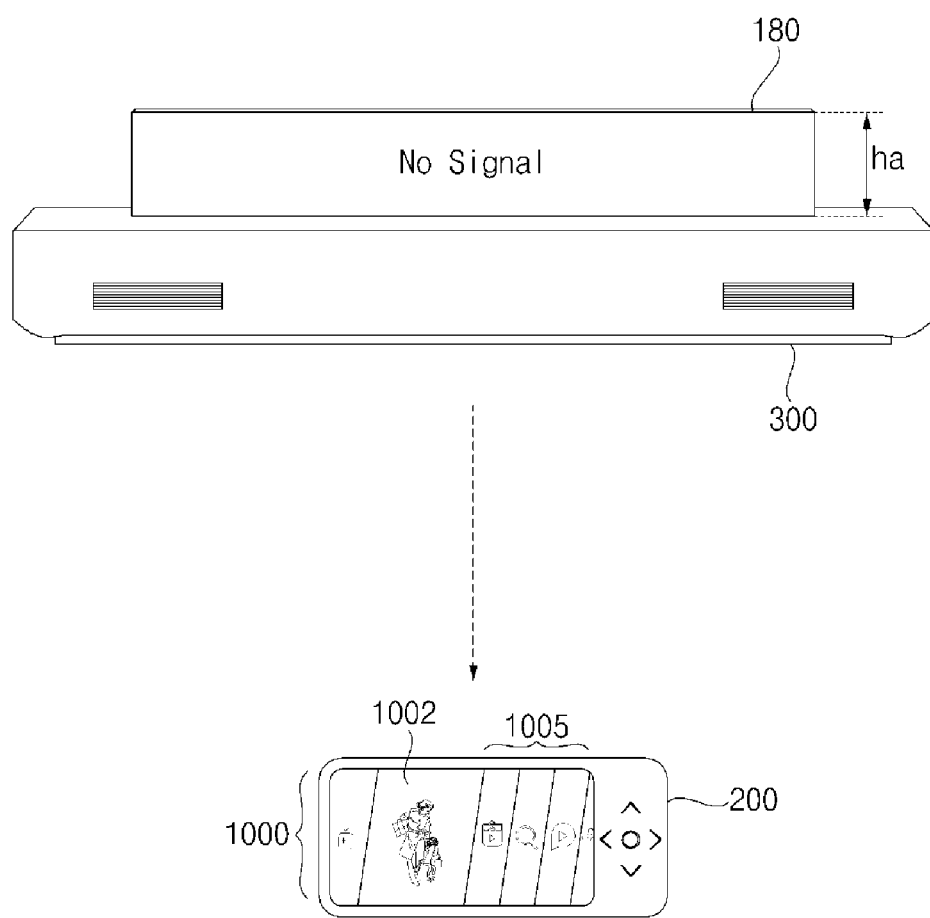

Similarly to FIG. 7B, FIG. 10B illustrates an example where the rollable display 180 is unrolled upward according to the image display input. While the rollable display 180 is unrolled upward, the controller 170 of the image display apparatus 100 can control any image not to be displayed on the rollable display 180. Further, while the rollable display 180 is unrolled upward, the controller 170 of the image display apparatus 100 can control the application list 1000 including the plurality of application items 1005 to be displayed on the display 280 of the remote controller 200.

Thus, the controller 170 of the image display apparatus 100 can transmit information on the application list, including the plurality of application items, to the remote controller 200. Thus, the remote controller 200 can display the application list 1000, including the plurality of application items 1005, to be displayed on the display 280. In addition to the plurality of application items 1005, the application list 1000 may further include a first video 1002 corresponding to a video to be displayed.

Figure 10C:
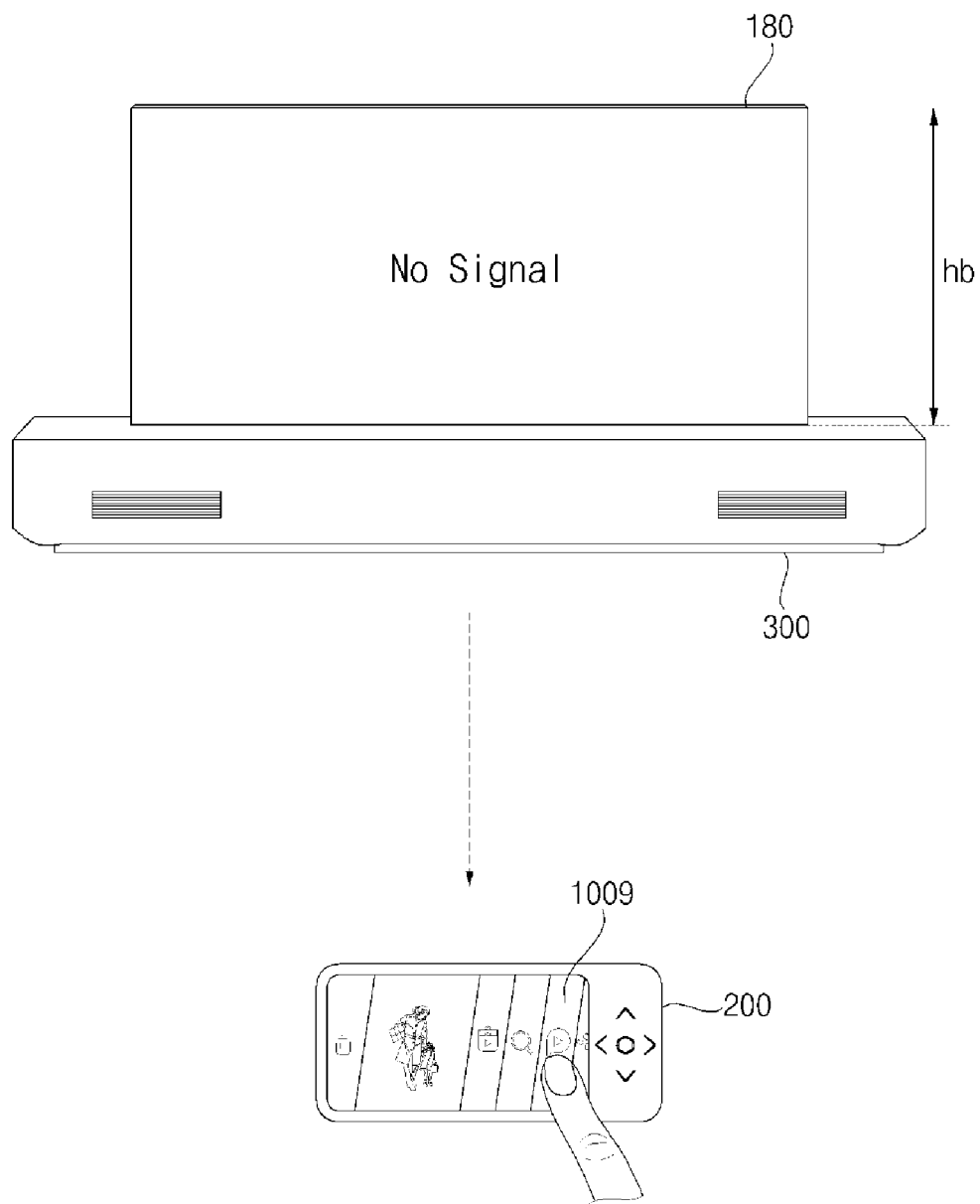

FIG. 10B illustrates an example where the application list 1000, including the plurality of application items 1005 and the first video 1002, is displayed on the display 280 of the remote controller 200. In addition, FIG. 10C illustrates an example where the rollable display 180 is at the height hb which is higher than the height ha.

Figure 10D:
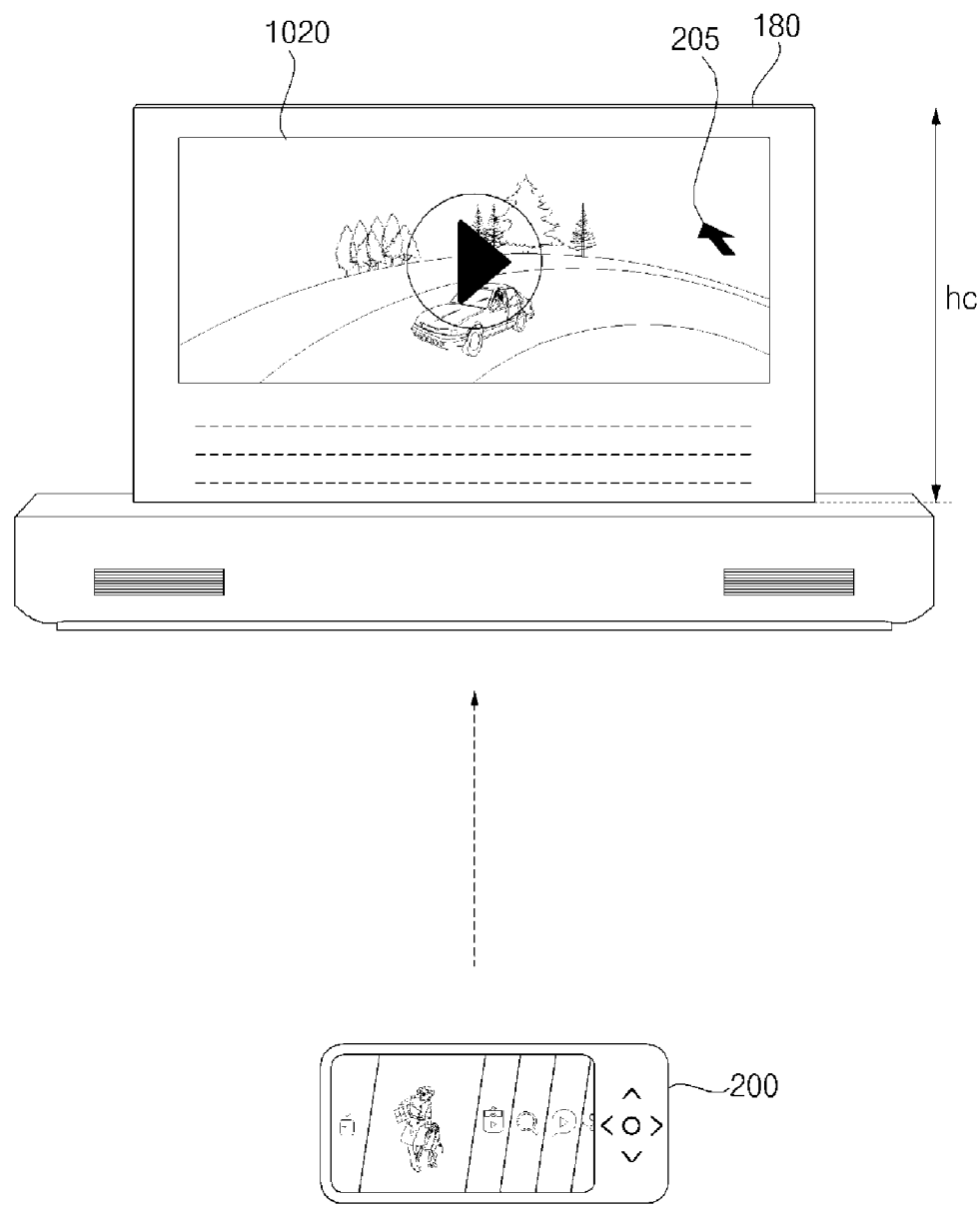

When a first application item 1009 in the application list 1000 is selected, the remote controller 200 can transmit information on the first application item 1009 to the image display apparatus 100. Thus, the controller 170 of the image display apparatus 100 receives information on the first application item 1009, and when the display 180 is unrolled upward to reach the first height hc, the controller 170 of the image display apparatus 100 can control the first video 1002 not to be displayed on the display 180, and an application screen 1020 corresponding to the first application item 1009 to be displayed thereon as illustrated in FIG. 10D.

Thus, while the rollable display is unrolled upward, an application item desired by a user can be selected, and when the rollable display is fully unrolled, the application screen 1020 corresponding to the application item can be displayed, thus improving user convenience. While the display 180 is unrolled upward, the controller 170 of the image display apparatus 100 can control a broadcast video to be displayed on the display 280 of the remote controller 200, and can control the application list including the plurality of application items to be displayed on the display 180, which will be described with reference to FIGS. 11A to 11D.

Figure 11A:
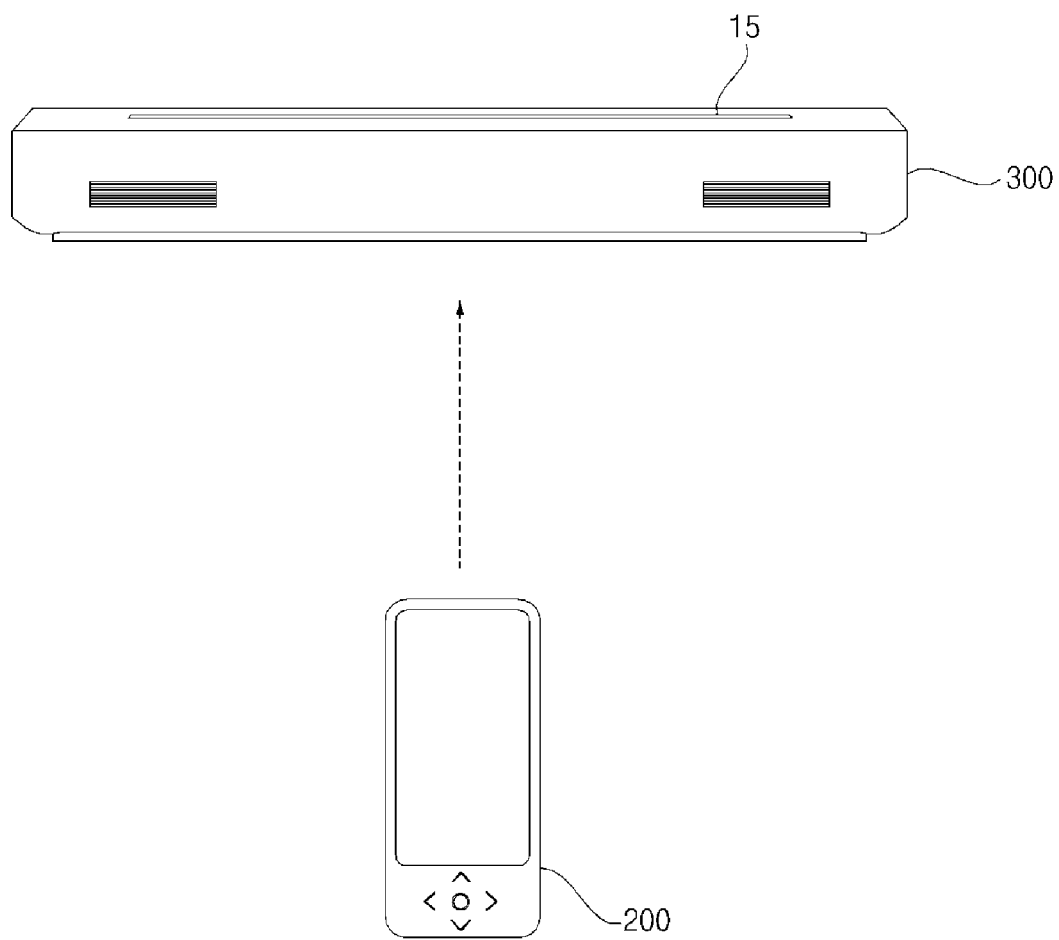

Next, FIGS. 11A to 11D are similar to FIGS. 7A to 7D, such that description below will be made based on differences therebetween. In particular, FIG. 11A illustrates an example where an image display input is transmitted from the remote controller 200 to the signal processor 300 of the image display apparatus 100, which is the same as FIG. 7A.

Figure 11B:
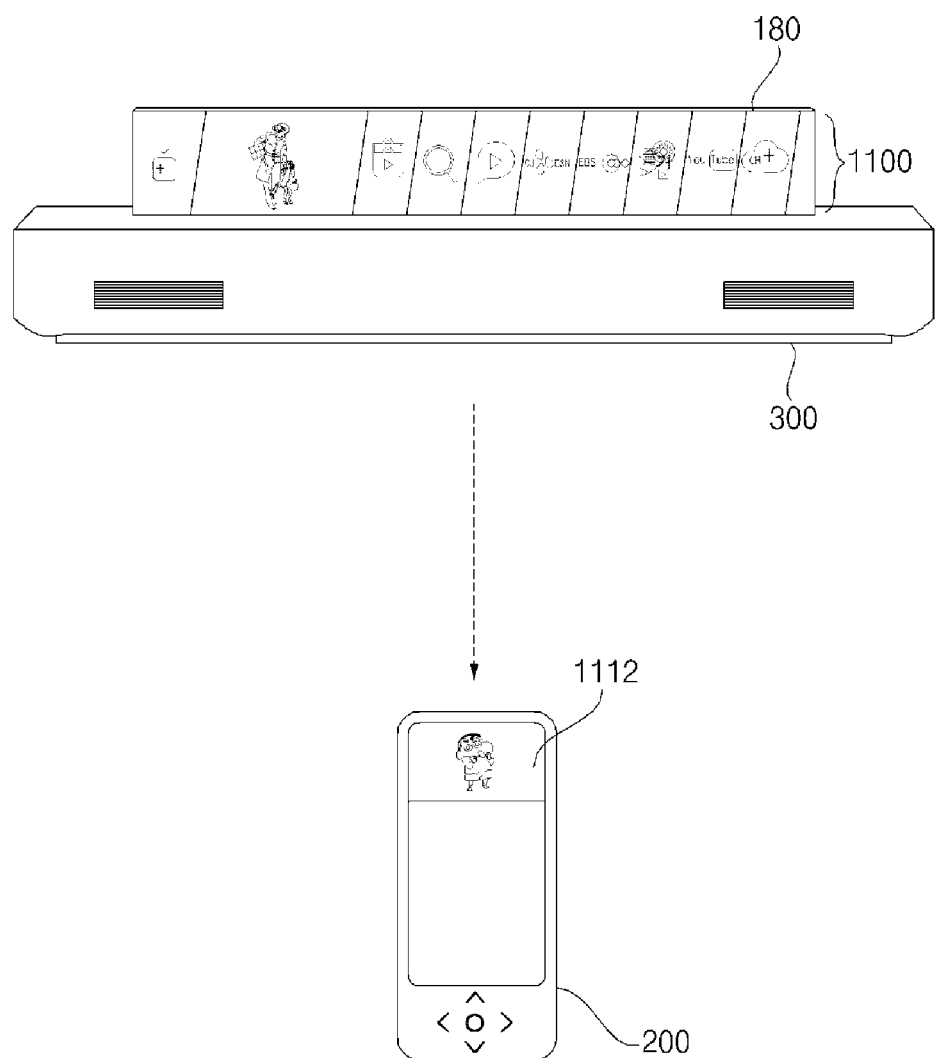

For example, the image display input may be a home screen display input. The home screen may include a broadcast video and an application list including a plurality of application items. Similarly to FIG. 7B, FIG. 11B illustrates an example where the rollable display 180 is unrolled upward according to the image display input.

While the rollable display 180 is unrolled upward, the controller 170 of the image display apparatus 100 can control an application list 1100 including a plurality of application items 1005 to be displayed thereon. The application list 1100 including the plurality of application items is a pre-stored content which can be displayed immediately while the rollable display 180 is unrolled upward.

The controller 170 of the image display apparatus 100 can control a first video 1112, which corresponds to a video to be displayed on the display 180, to be displayed on the display 280 of the remote controller 200. Thus, the controller 170 of the image display apparatus 100 can control information on the video to be displayed to be transmitted to the remote controller 200. Thus, the remote controller 200 can display the first video 1112, corresponding to the video to be displayed on the display 180, to be displayed on the display 280.

Figure 11C:
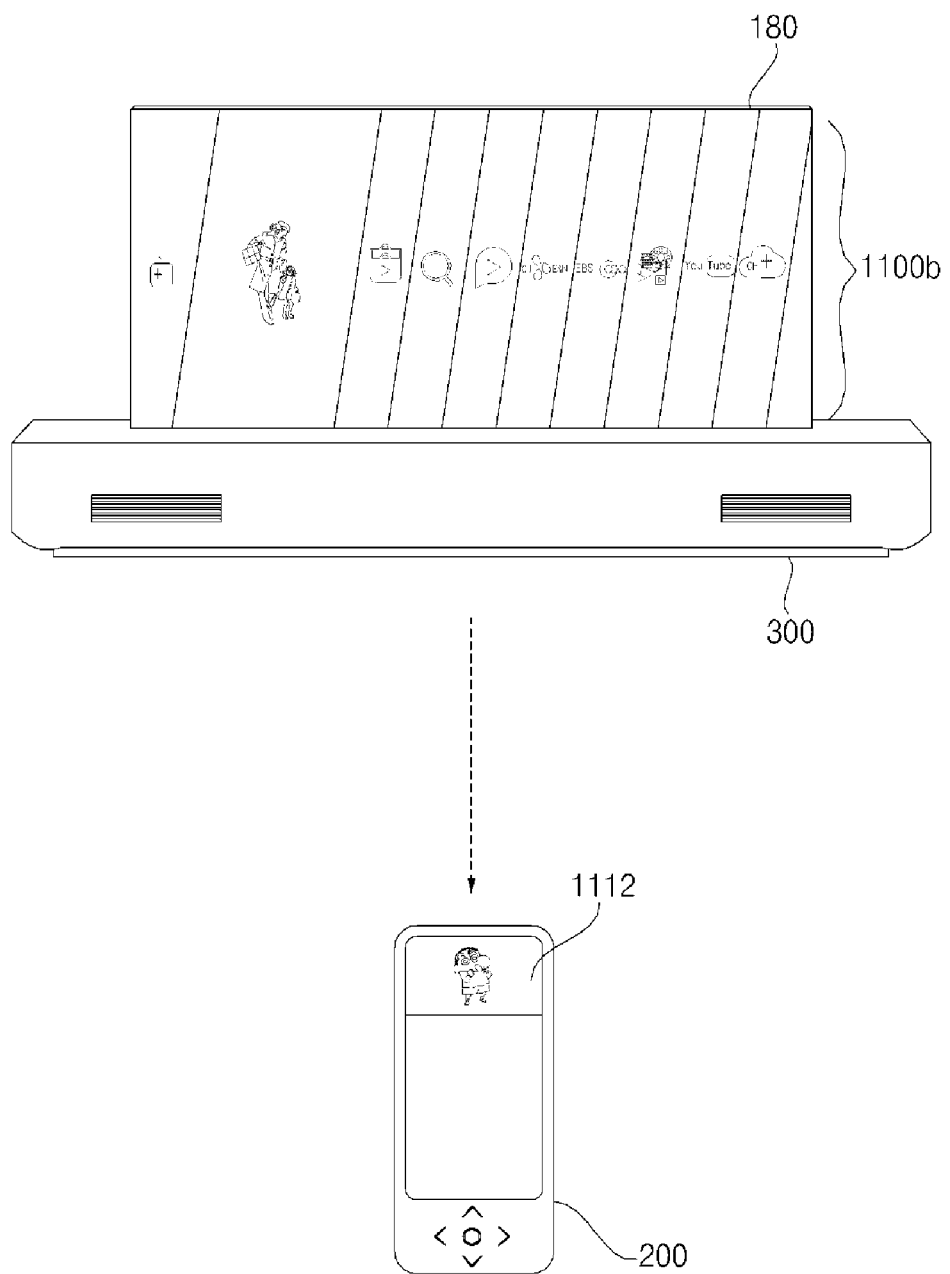

FIG. 11C illustrates an example where the rollable display 180 is at the height hb which is higher than the height ha. In this instance, the application list 1100 is scaled up, such that the scaled up application list 1100b is displayed on the display 180, and the first video 1112 is displayed on the display 280 of the remote controller 200.

Figure 11D:
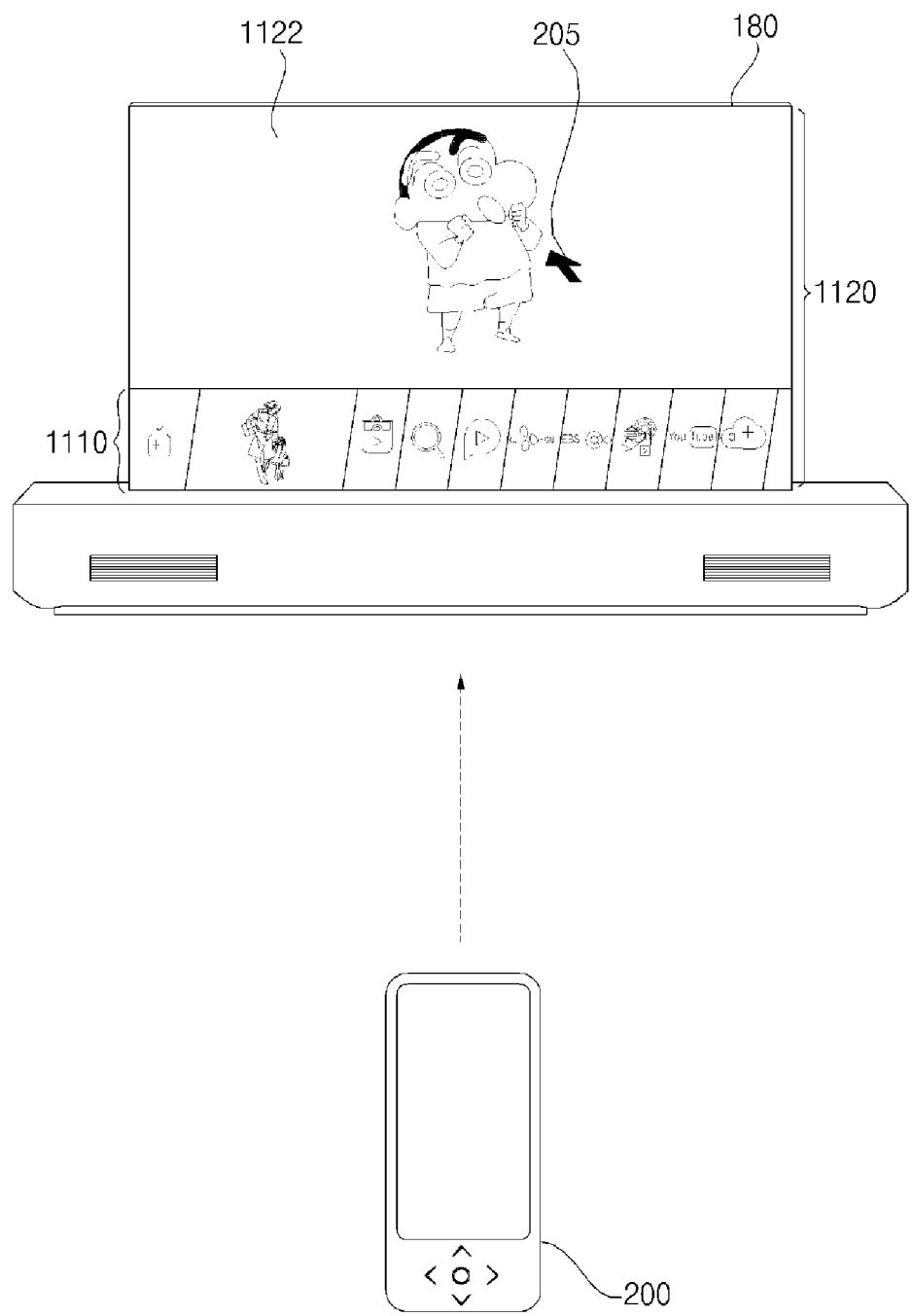

When the height of the display 180 is the first height hc, the home screen 1120 can be displayed on the display 180 as illustrated in FIG. 11D. The home screen 1120 may include a broadcast video 1122 which is a video to be displayed, and an application list 1100 which includes a plurality of application items.

When the display 180 is unrolled upward such that the height thereof is the first height hc, the controller 170 of the image display apparatus 100 can control the first video not to be displayed on the display 280. That is, the controller 170 of the image display apparatus 100 may not transmit video information to the remote controller 200.

When the display 180 is unrolled upward such that the height thereof is the first height hc, the controller 170 of the image display apparatus 100 can control a pointer 205 to be displayed on the broadcast video 1122 or the application list 1100 based on a pointing signal received by the remote controller 200 as illustrated in FIG. 11D, thereby enabling a user to simply select a desired item.

While the display 180 is unrolled upward, when the height of the display 180 is a second height ha which is lower than the first height hc, the controller 170 of the image display apparatus 100 can control the first video to be displayed on the display 280 of the remote controller 200, and when the height of the display 180 is a third height hb which is higher than the second height ha, the controller 170 of the image display apparatus 100 can control the first video and the thumbnail list including a plurality of thumbnail images to be displayed on the display 280 of the remote controller 200.

Further, when the display 180 is unrolled upward such that the height thereof is the first height hc, the controller 170 of the image display apparatus 100 can control the display 180 to display a video to be displayed, and can control only the thumbnail list to be displayed on the display 280 of the remote controller 200, which will be described with reference to FIGS. 12A to 12H.

Figure 12A:
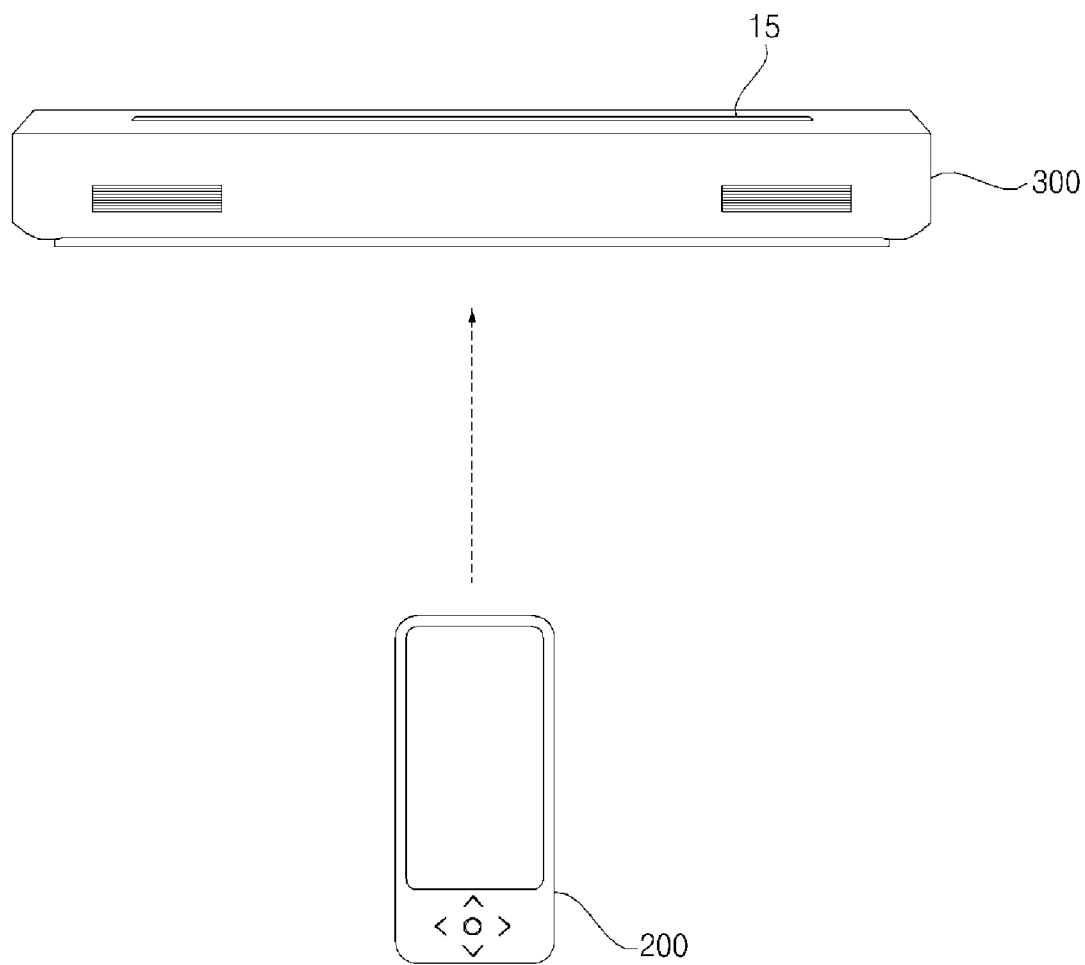

Among FIGS. 12A to 12H, FIGS. 12A to 12D are similar to FIGS. 7A to 7D, such that description below will be made based on differences therebetween. FIG. 12A illustrates an example where an image display input is transmitted from the remote controller 200 to the signal processor 300 of the image display apparatus 100, which is the same as FIG. 7A.

Figure 12B:
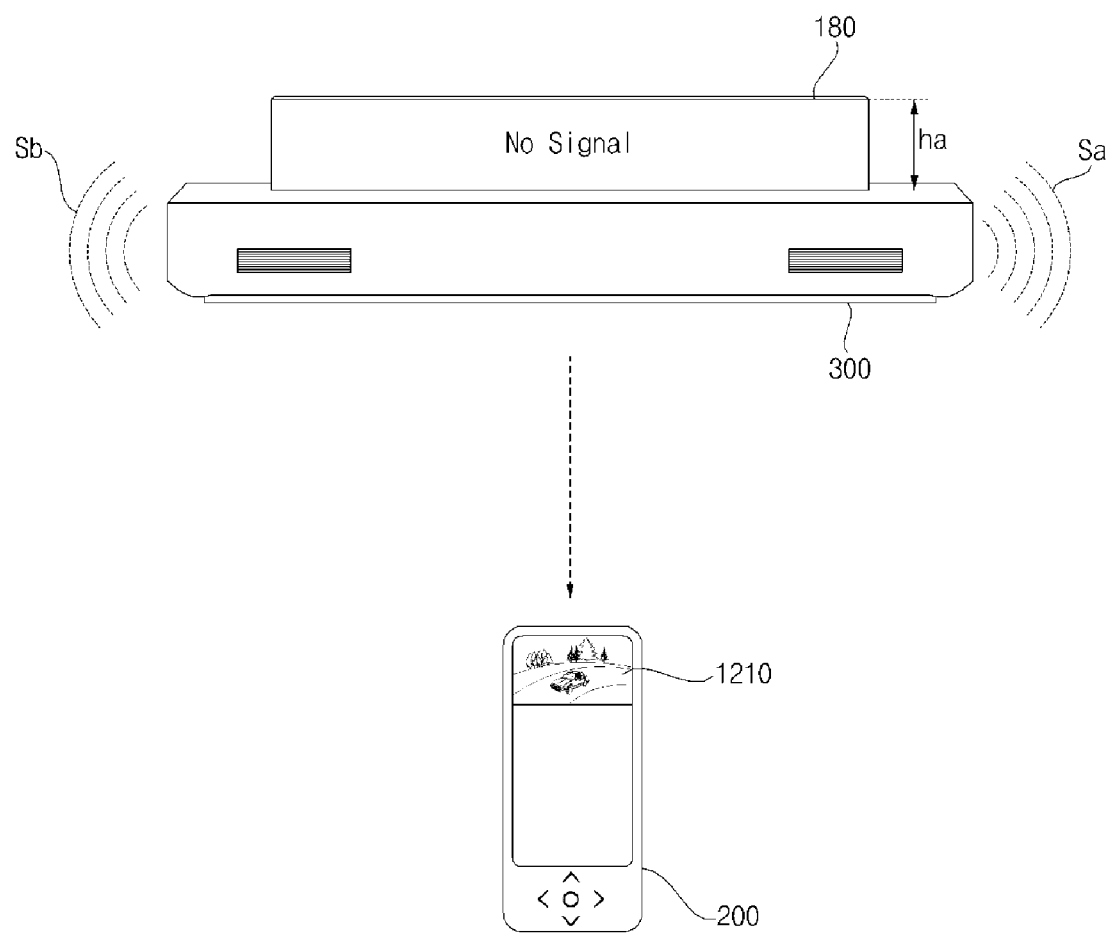

Similarly to FIG. 7B, FIG. 12B illustrates an example where the rollable display 180 is unrolled upward according to the image display input. While the rollable display 180 is unrolled upward, the controller 170 of the image display apparatus 100 can control any image not to be displayed on the rollable display 180. Further, while the rollable display 180 is unrolled upward, the controller 170 of the image display apparatus 100 can control a first video 1210, corresponding to a video to be displayed, to be displayed on the display 280 of the remote controller 200. Thus, the controller 170 of the image display apparatus 100 can control information on the video to be displayed to be transmitted to the remote controller 200.

In addition, the remote controller 200 can display the first video 1210 on the display 280. While the rollable display 180 is unrolled upward, the controller 170 of the image display apparatus 100 can control more amounts of information or videos to be displayed on the remote controller 200 in proportion to the size, particularly to the height, of the rollable display 180.

Figure 12C:
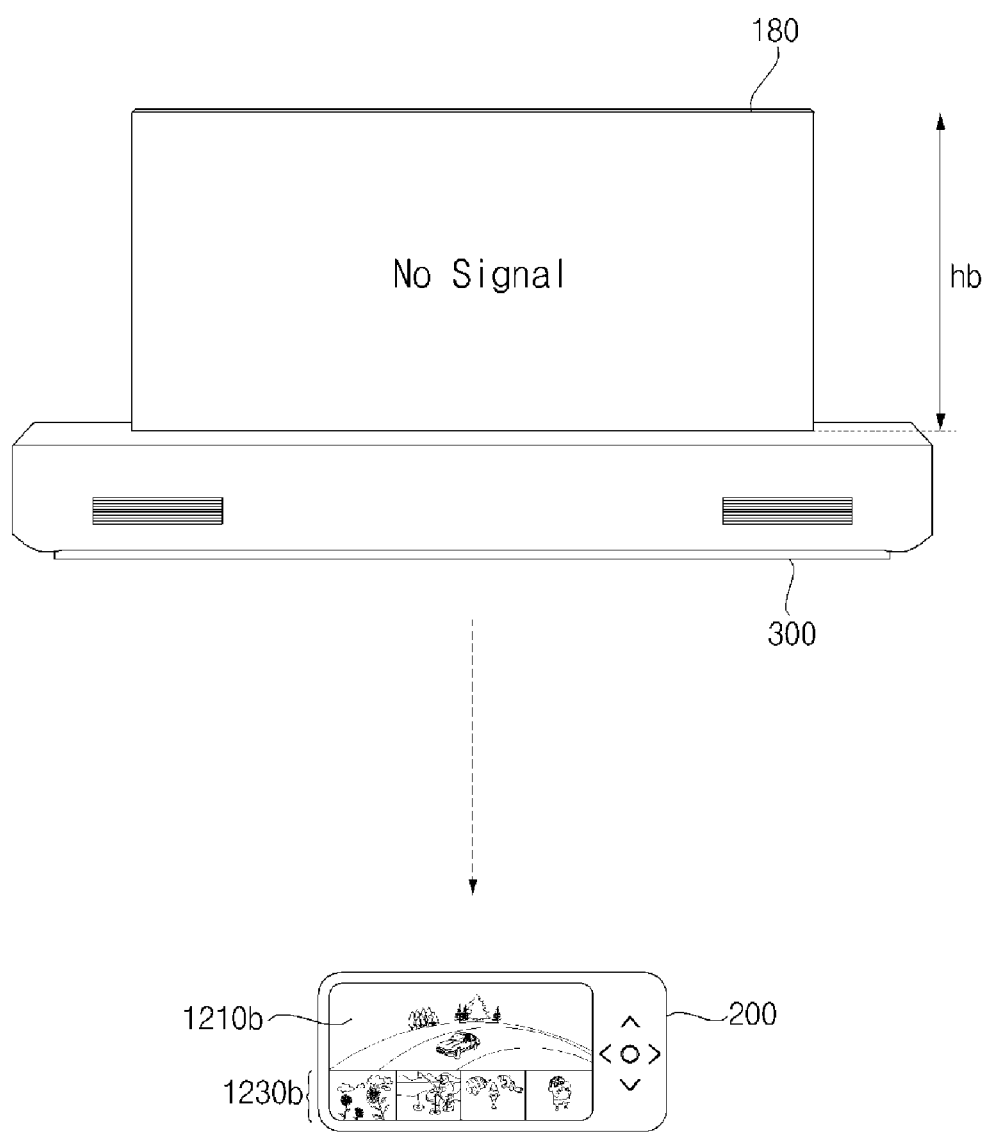

Next, FIG. 12C illustrates an example where the rollable display 180 is at the height hb which is higher than the height ha. In this instance, the controller 170 of the image display apparatus 100 can control a first video 1210b and a thumbnail list 1230b including a plurality of thumbnail images to be displayed on the display 280 of the remote controller 200.

FIG. 12C illustrates an example where the remote controller 200 is a horizontal mode, however, even in a vertical mode, the first video 1210b and the thumbnail list 1230b including a plurality of thumbnail images can be displayed on the display 280 of the remote controller 200. Then, when the rollable display 180 is fully unrolled such that the height of the rollable display 180 is the first height hc, the controller 170 of the image display apparatus 100 can control the display 180 to display a video 1122 to be displayed as illustrated in FIG. 12D.

In this instance, the controller 170 of the image display apparatus 100 can control the first video not to be displayed on the display 280, and can control only the thumbnail list 1230 including a plurality of thumbnail images to be displayed as it is. Thus, after the rollable display 180 is fully unrolled, a user can check or select a predetermined thumbnail item in the thumbnail list 1230 displayed on the remote controller 200 while viewing the video 1122, such that user convenience may be improved.

Figure 12D:
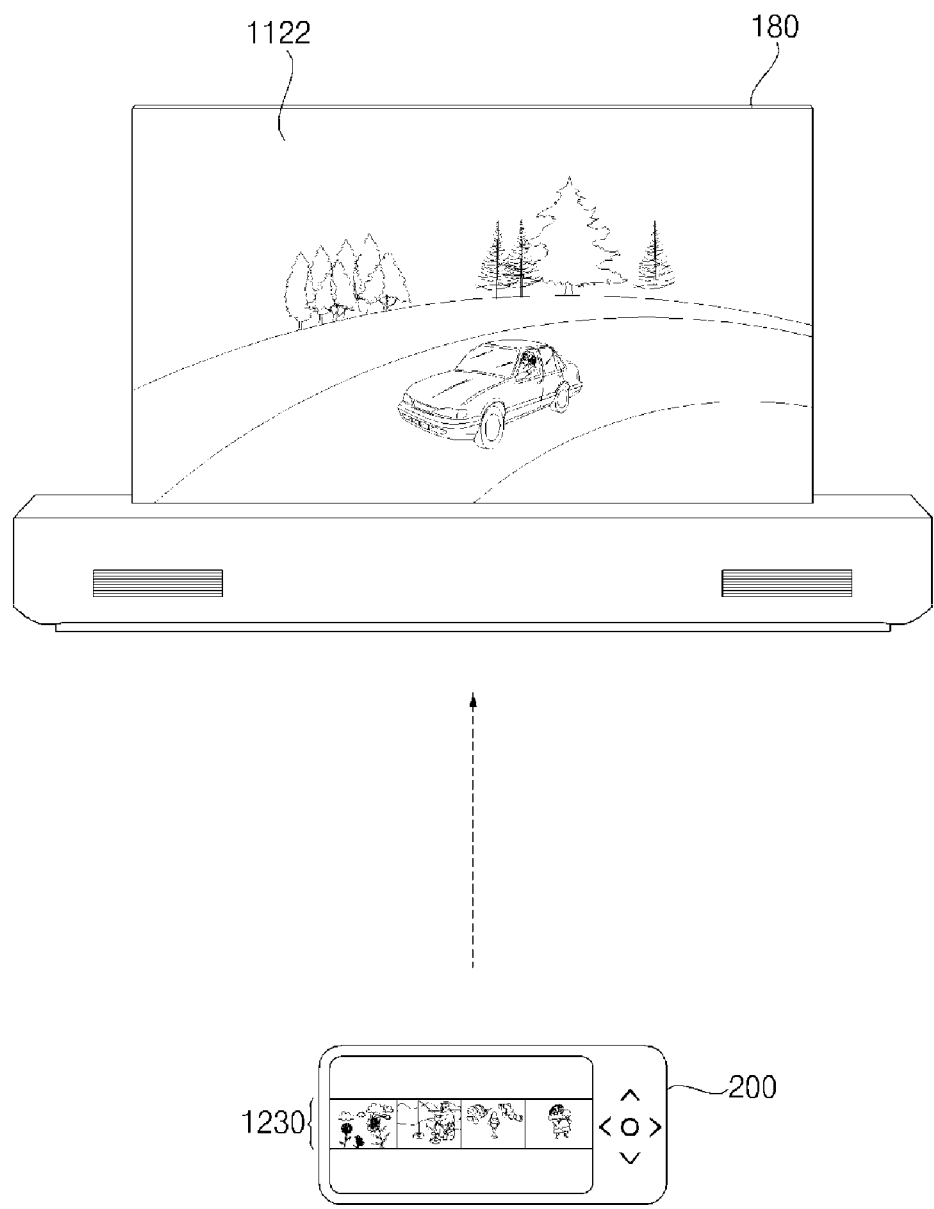

When the first video 1210b is a broadcast video, the thumbnail list 1230b illustrated in FIGS. 12C and 12D may be a thumbnail list including thumbnail images of a channel different from a channel of the first video 1210b. When the played first video 1210b is a Video on Demand (VOD), the thumbnail list 1230b illustrated in FIGS. 12C and 12D may be a thumbnail list including thumbnail images in each time interval of the first video 1210b.

When any one thumbnail image is selected from the thumbnail list including thumbnail images in each time interval of the first video 1210b, the controller 1480 of the remote controller 200 can control a video, corresponding to the selected thumbnail image, to be displayed on the display 280, which will be described with reference to FIGS. 12E to 12H.

Figure 12E:
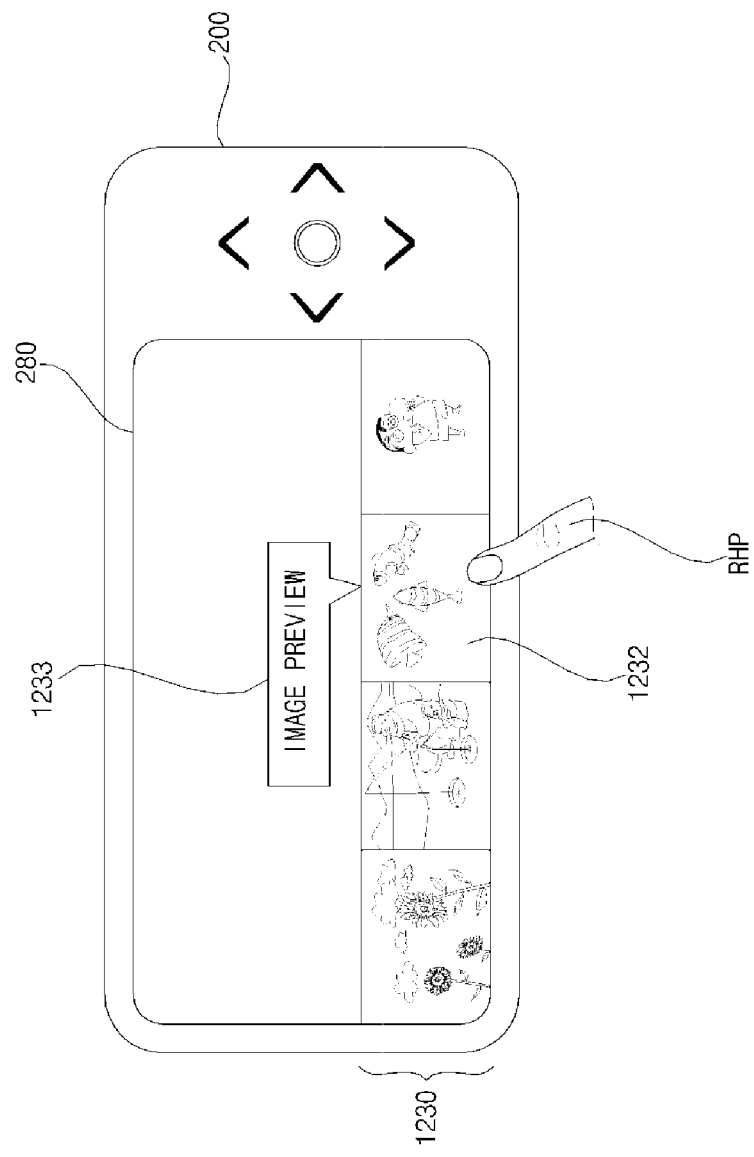

FIG. 12E illustrates an example where a first thumbnail image 1232 is selected from the thumbnail list 1230 including thumbnail images in each time interval. When the first thumbnail image 1232 is selected from the thumbnail list 1230, the controller 1480 of the remote controller 200 can control an image preview item 1233 to be displayed as illustrated in FIG. 12E.

Figure 12F:
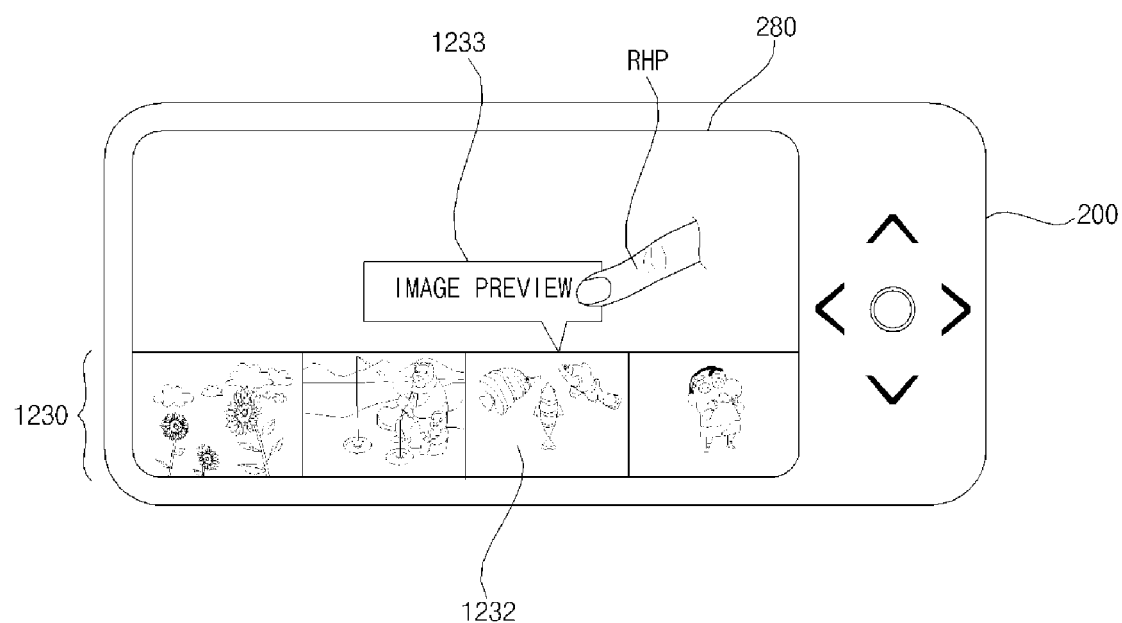
Figure 12G:
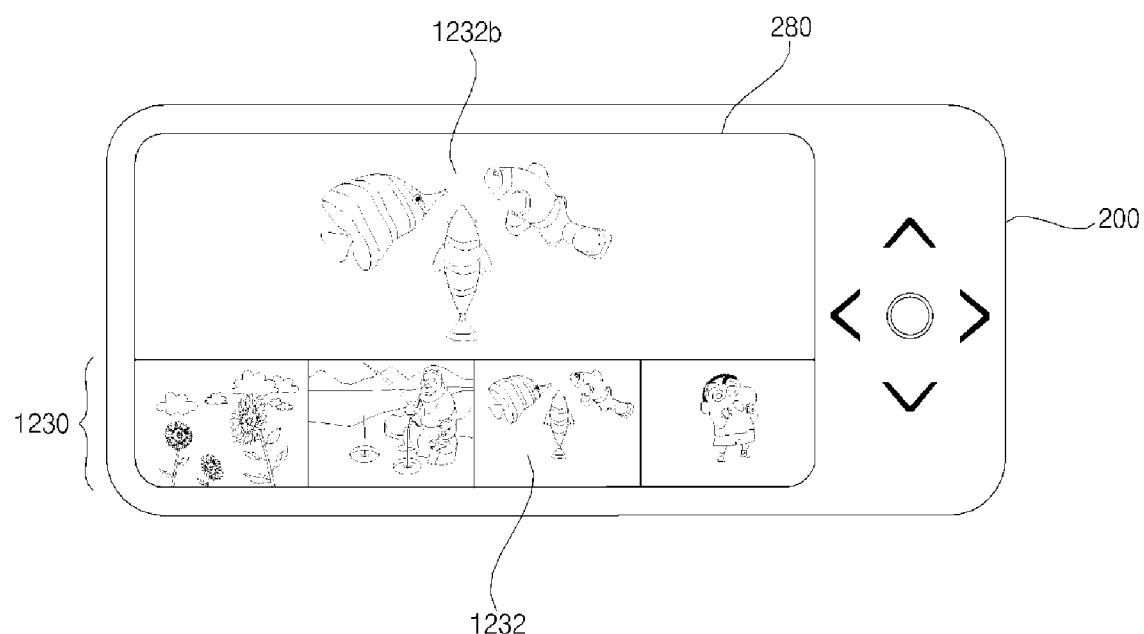

FIG. 12F illustrates an example where the image preview item 1233 is selected. In this instance, the controller 1480 of the remote controller 200 can control an enlarged image 1232b of the first thumbnail image 1232 to be displayed as illustrated in FIG. 12G.

Figure 12H:
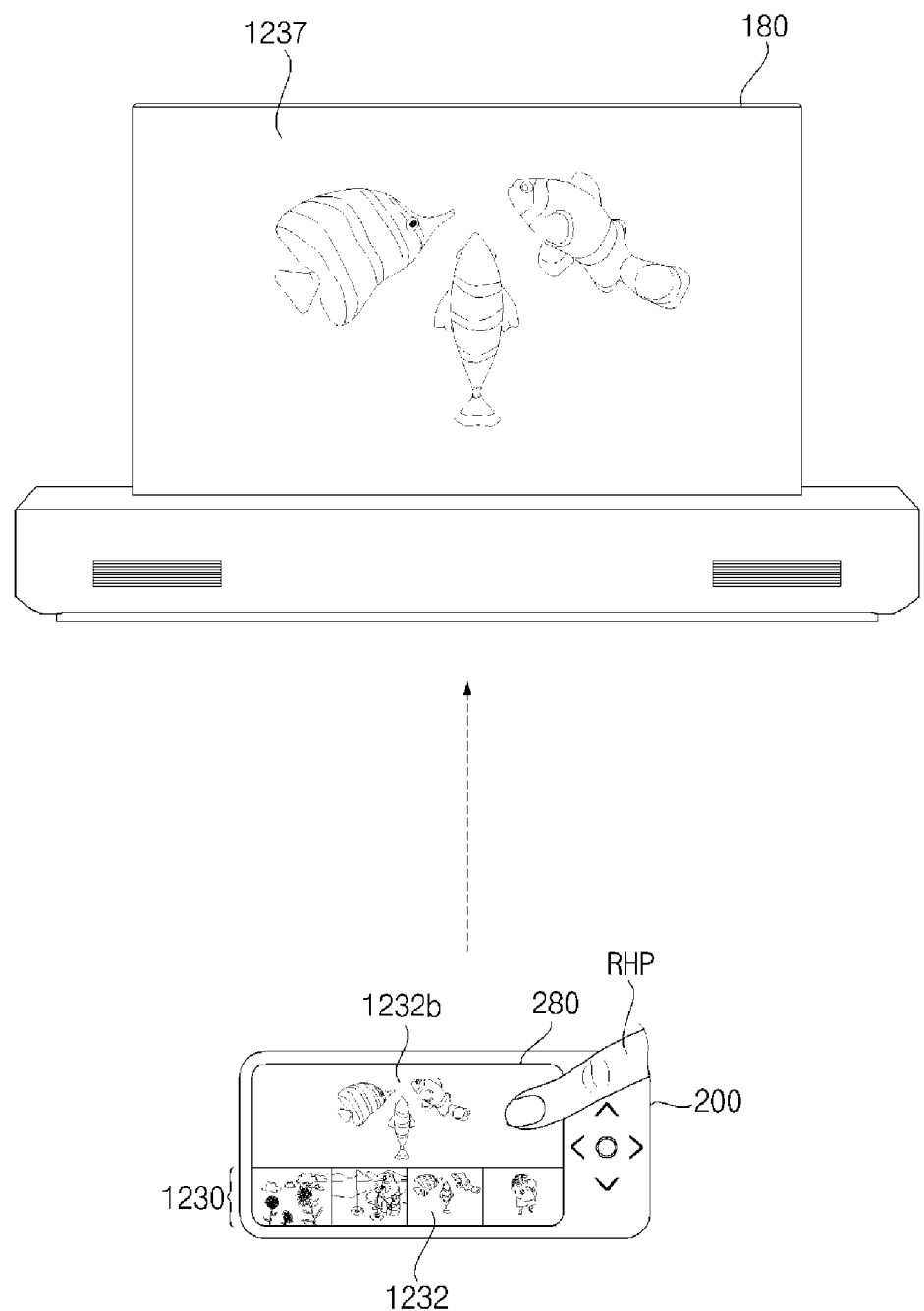

FIG. 12H illustrates an example where the enlarged image 1232b of the first thumbnail image 1232 is selected. In this instance, the controller 1480 of the remote controller 200 can transmit a playback input of the enlarged image 1232b to the image display apparatus 100.

Accordingly, the control unit 170 of the image display apparatus 100 can control a video 1237, corresponding to the enlarged image 1232b, to be played and displayed on the display 180. Thus, a user can conveniently select a video of a desired point in time, and may view the video of the desired point in time on the display 180 of the image display apparatus 100.

In FIGS. 12E to 12H, a video and the like displayed on the display 280 of the remote controller 200 may be a video transmitted from the image display apparatus 100 by mirroring. Further in FIGS. 12E to 12H, each control operation of the controller 1480 of the remote controller 200 may be performed by the controller 170 of the image display apparatus 100. For example, when the first thumbnail image 1232 is selected from the thumbnail list 1230, the remote controller 200 can transmit the selected information to the image display apparatus 100, and the controller 170 of the image display apparatus 100 can control the image preview item 1233 to be displayed on the display 280 of the remote controller 200 as illustrated in FIG. 12F.

In another example, when the image preview item 1233 is selected while the image preview item 1233 is displayed on the display 280 of the remote controller 200, the remote controller 200 can transmit the selected information to the image display apparatus 100, and the controller 170 of the image display apparatus 100 can control the enlarged image 1232b to be displayed on the display 280 of the remote controller 200 as illustrated in FIG. 12F.

When the enlarged image 1232b is selected while the enlarged image 1232b is displayed on the display 280 of the remote controller 200, the remote controller 200 can transmit the selected information to the image display apparatus 100, and the controller 170 of the image display apparatus 100 can control a video 1237, corresponding to the enlarged image 1232b, to be displayed on the display 180 as illustrated in FIG. 12H.

During the upward unrolling of the display 180, the controller 170 of the image display apparatus 100 can control recommended content information or preferred content information to be displayed on the display 280 of the remote controller 200, and after any one of the recommended content information or the preferred content information is selected, when the display 180 is unrolled upward such that the height thereof reaches the first height hc, the controller 170 of the image display apparatus 100 can control a video corresponding to the selected content to be displayed on the display 180, which will be described with reference to FIG. 13A to 15C.

Figure 13A:
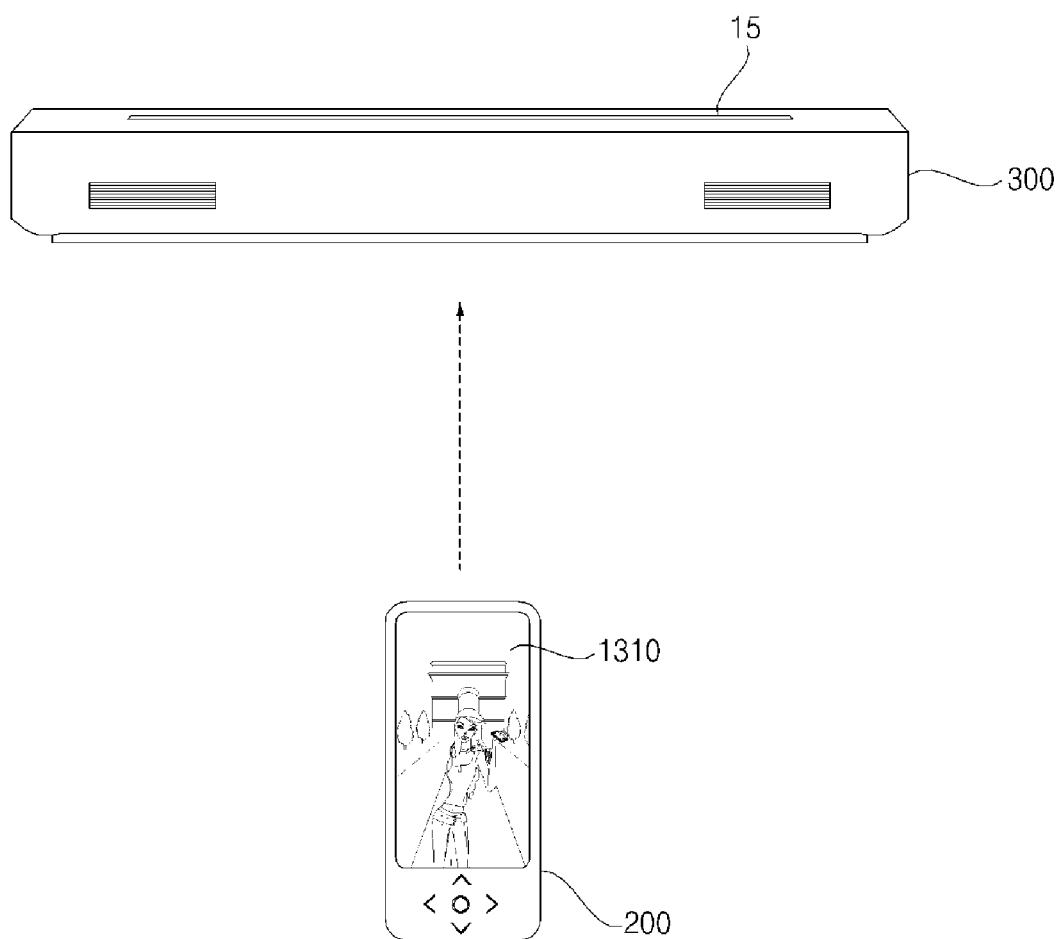

FIG. 13A illustrates an example where an image display input is transmitted from the remote controller 200 to the signal processor 300 of the image display apparatus 100, which is the same as FIG. 7A. In this instance, a predetermined video 1310 can be displayed on the display 280 of the remote controller 200.

Figure 13B:
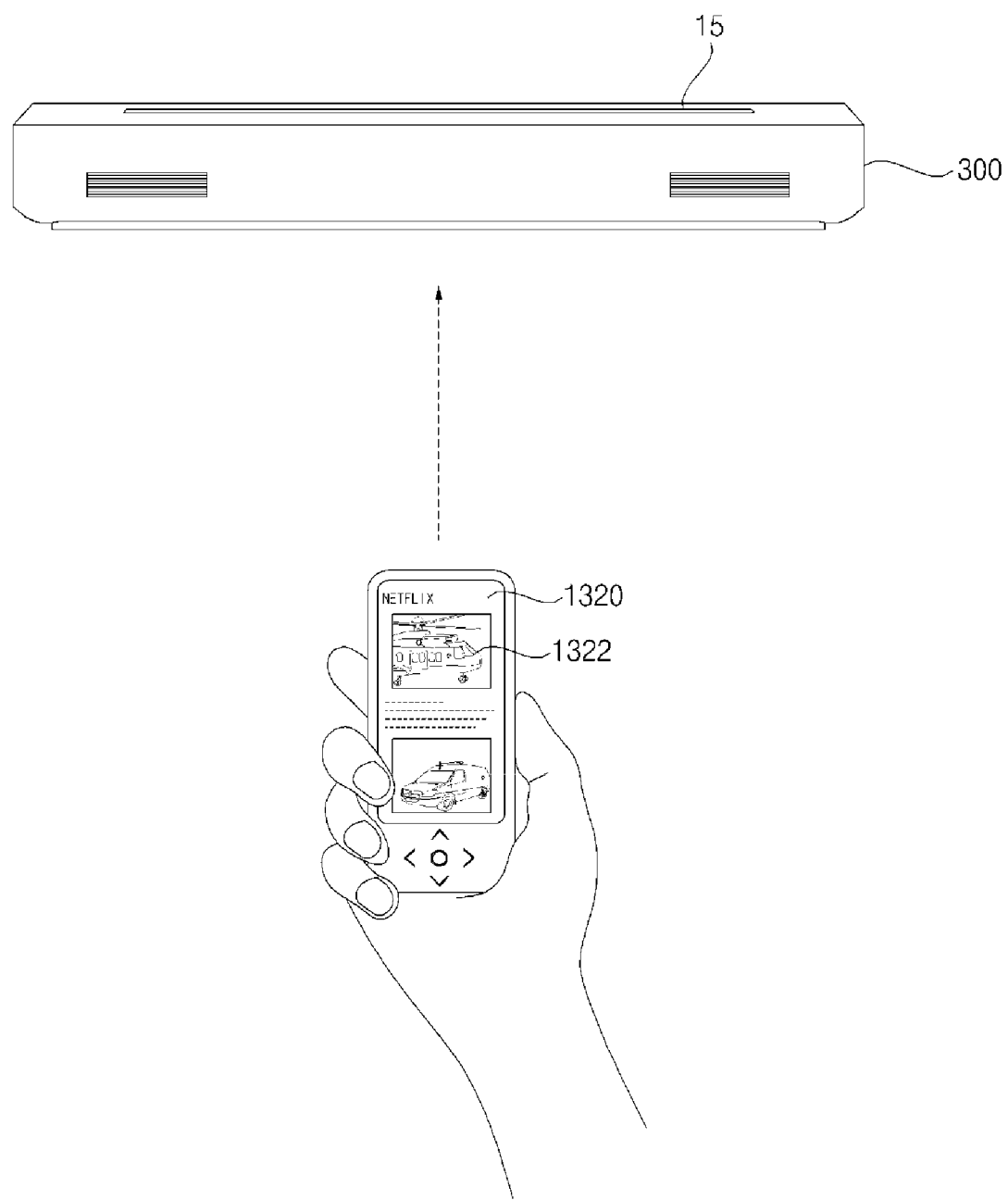

FIG. 13B illustrates an example where according to a user's input, a screen 1320 including recommended content information or the preferred content information is displayed on the display 280 of the remote controller 200. When the recommended content information 13220 is selected from the screen 1320 including the recommended content information or the preferred content information, the remote controller 200 can transmit the recommended content information to the image display apparatus 100.

Figure 13C:
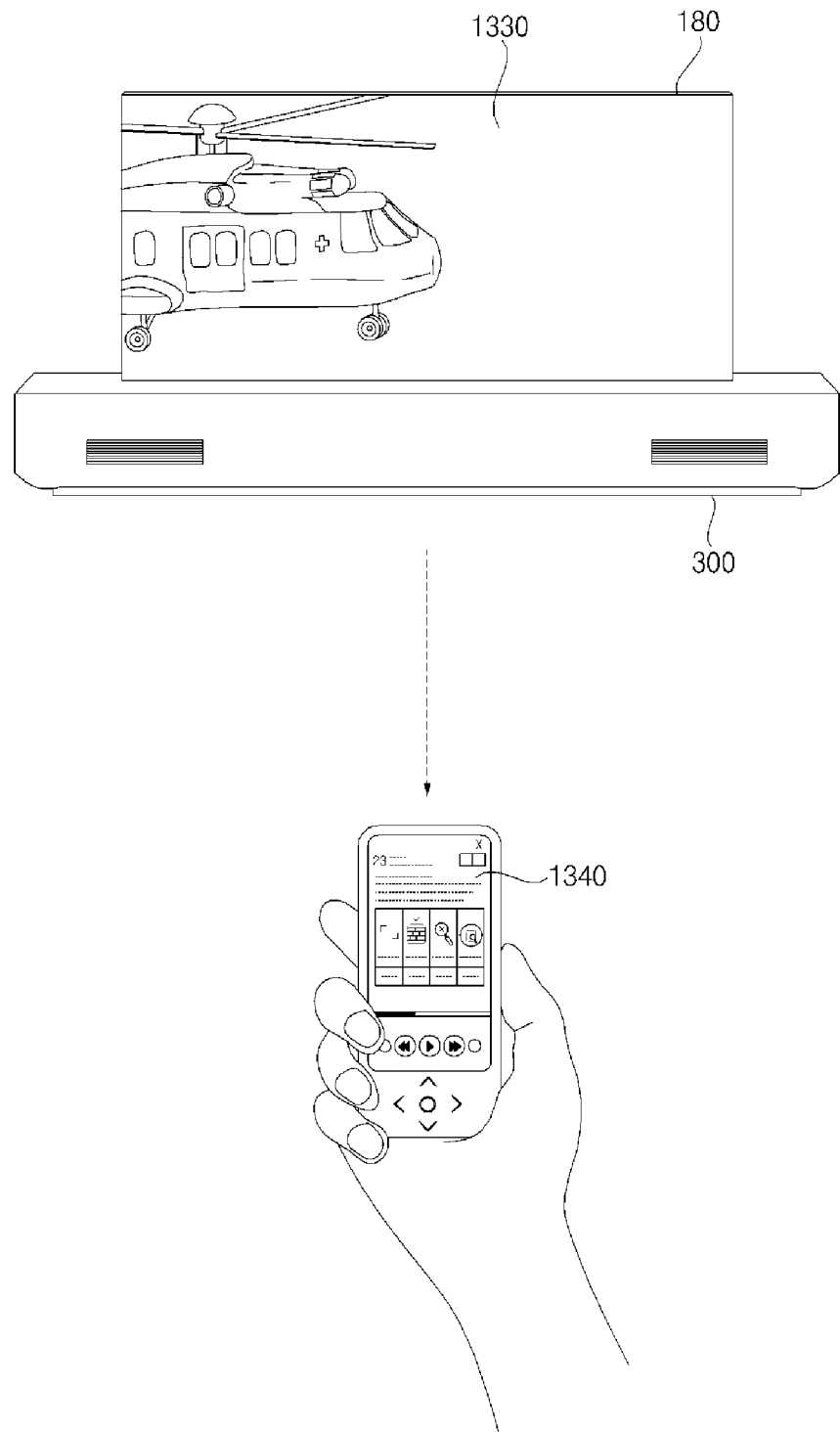

Then, after any one of the recommended content information or the preferred content information is selected, when the display 180 is unrolled upward such that the height thereof reaches the first height hc, the controller 170 of the image display apparatus 100 can control a video 1330, corresponding to the selected content, to be displayed on the display 180 as illustrated in FIG. 13C.

When displaying the video 1330 corresponding to the selected content, the controller 170 of the image display apparatus 100 can control video related information 1340 to be displayed on the display 280 of the remote controller 200. Accordingly, a user can check the related information through the remote controller 200 while viewing the video 1330.

Figure 14A:
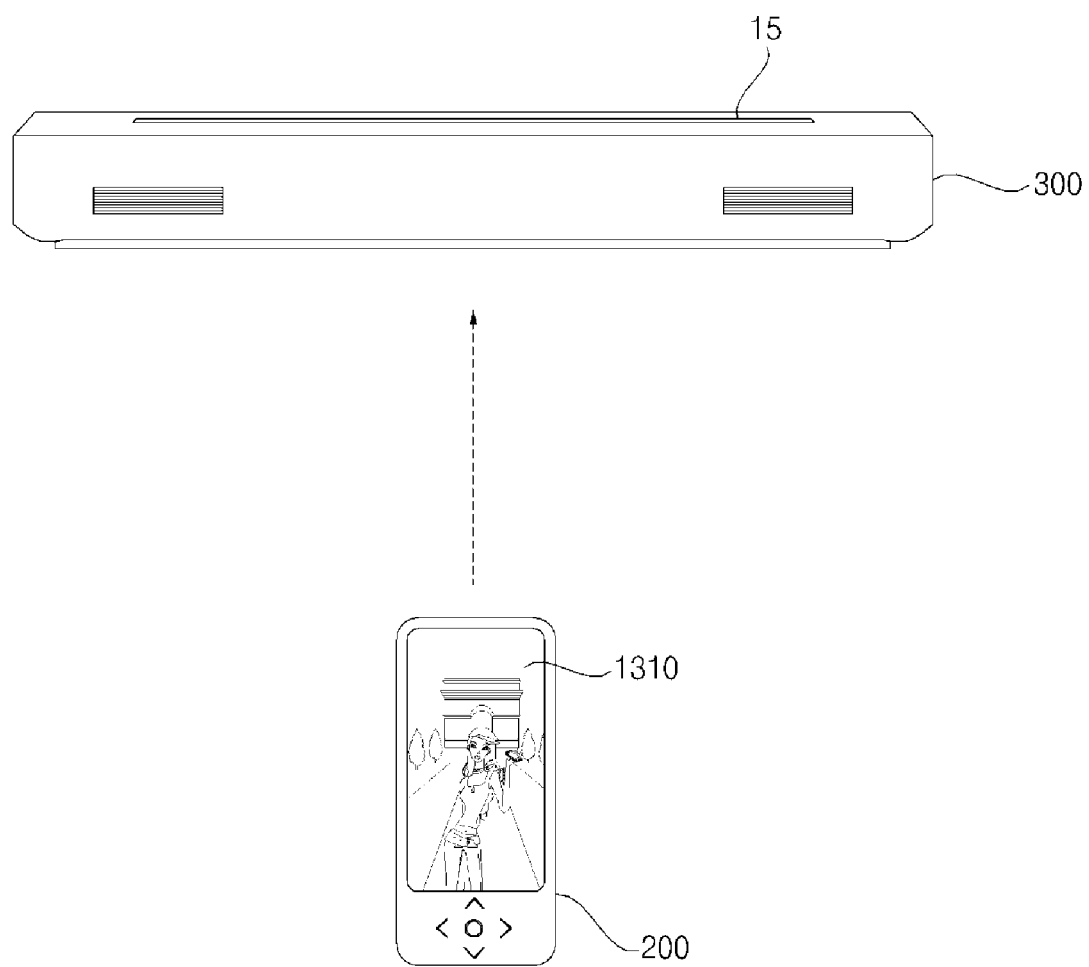

FIG. 14A illustrates an example where an image display input is transmitted from the remote controller 200 to the signal processor 300 of the image display apparatus 100, which is the same as FIG. 7A. In this instance, a predetermined video 1310 can be displayed on the display 280 of the remote controller 200.

Figure 14B:
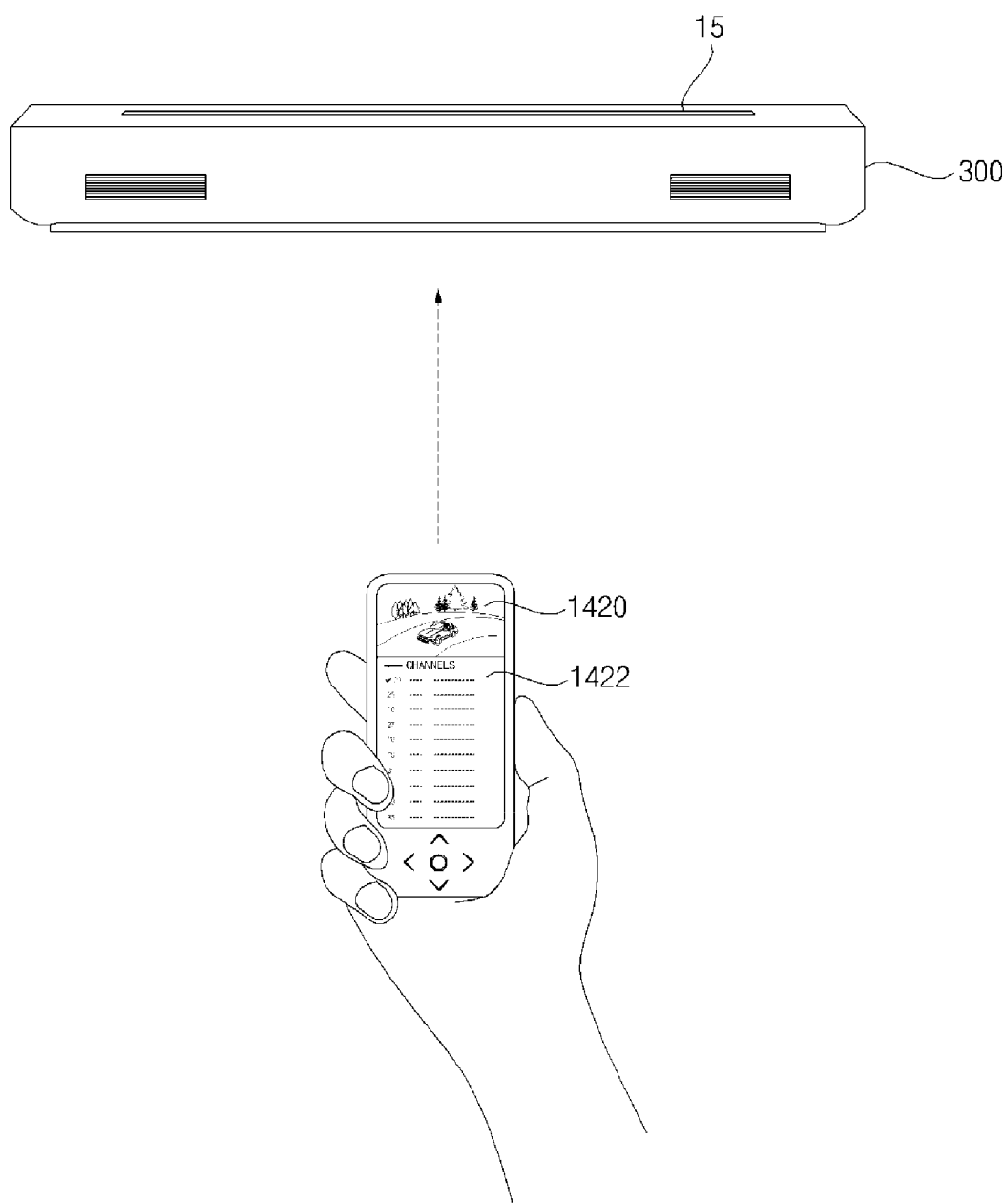

FIG. 14B illustrates an example where according to a user's input, a screen 1420 including a broadcast video or a broadcast video information 1422 is displayed on the display 280 of the remote controller 200. When the broadcast video is selected from the screen 1420 including the broadcast video or the broadcast video information 1422, the remote controller 200 can transmit broadcast video information to the image display apparatus 100.

Figure 14C:
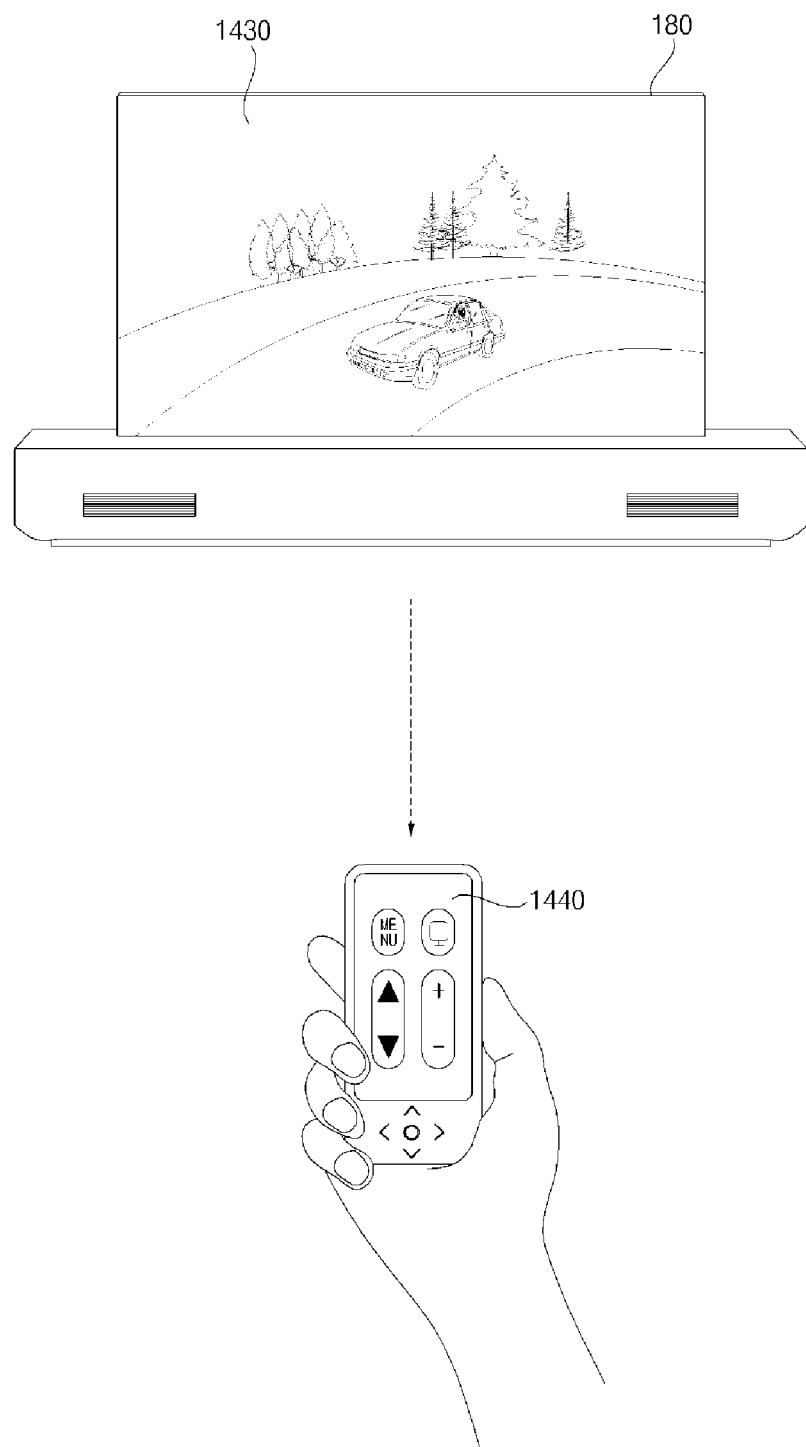

Then, after the broadcast video is selected, when the display 180 is unrolled upward such that the height thereof reaches the first height hc, the controller 170 of the image display apparatus 100 can control the selected broadcast video 1430 to be displayed on the display 180 as illustrated in FIG. 14C.

When displaying the selected broadcast video 1430, the controller 170 of the image display apparatus 100 can control a menu 1440, including a channel control item and a volume control item, to be displayed on the display 280 of the remote controller 200. Thus, a user can check an item required for remote control through the remote controller 200 while viewing the broadcast video 1430.

Figure 15A:
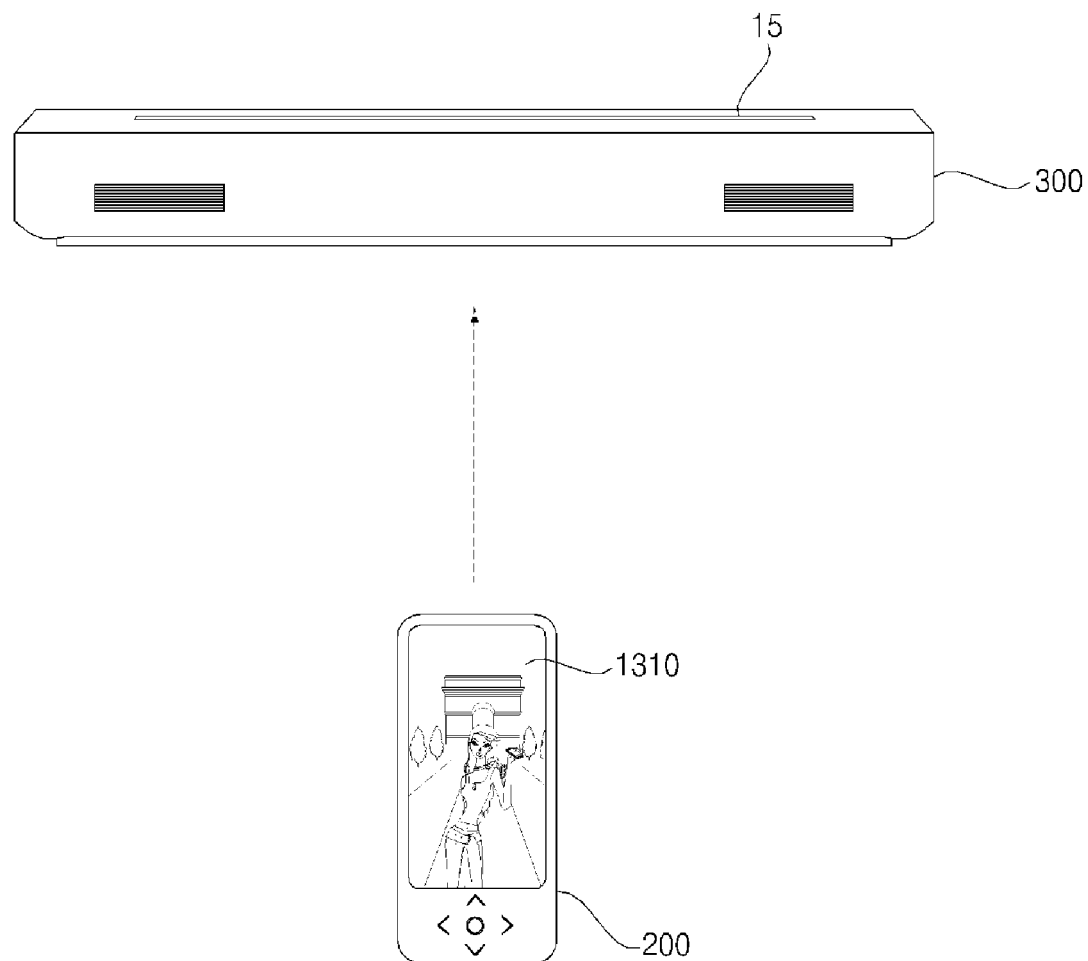

FIG. 15A illustrates an example where an image display input is transmitted from the remote controller 200 to the signal processor 300 of the image display apparatus 100, which is the same as FIG. 7A. In this instance, a predetermined video 1310 can be displayed on the display 280 of the remote controller 200.

Figure 15B:
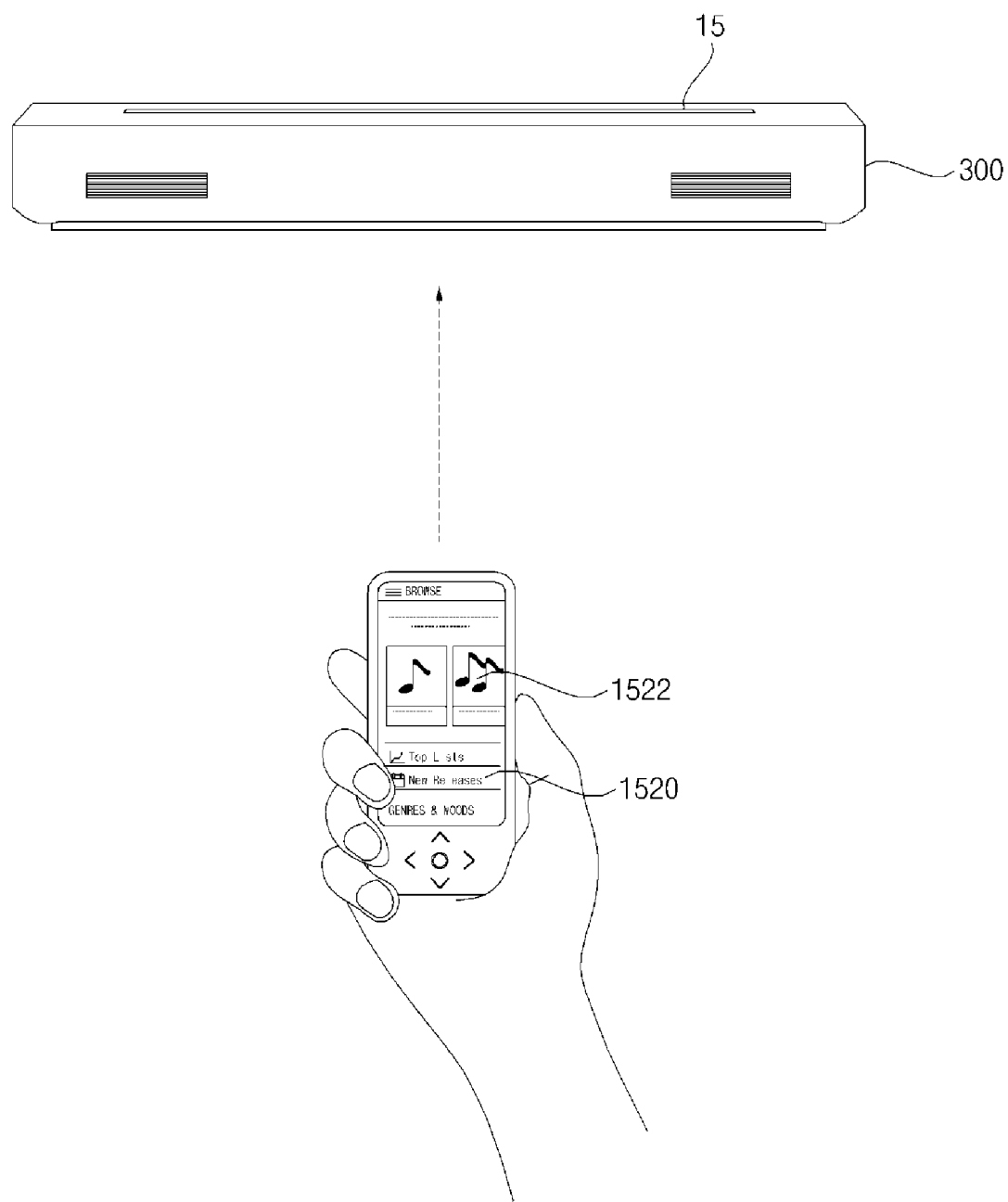

FIG. 15B illustrates an example where according to a user's input, a screen 1520 recommended music information or the preferred music information is displayed on the display 280 of the remote controller 200. When any one 1522 of the recommended music information or the preferred music information is selected, the remote controller 200 can transmit the selected music information to the image display apparatus 100.

Figure 15C:
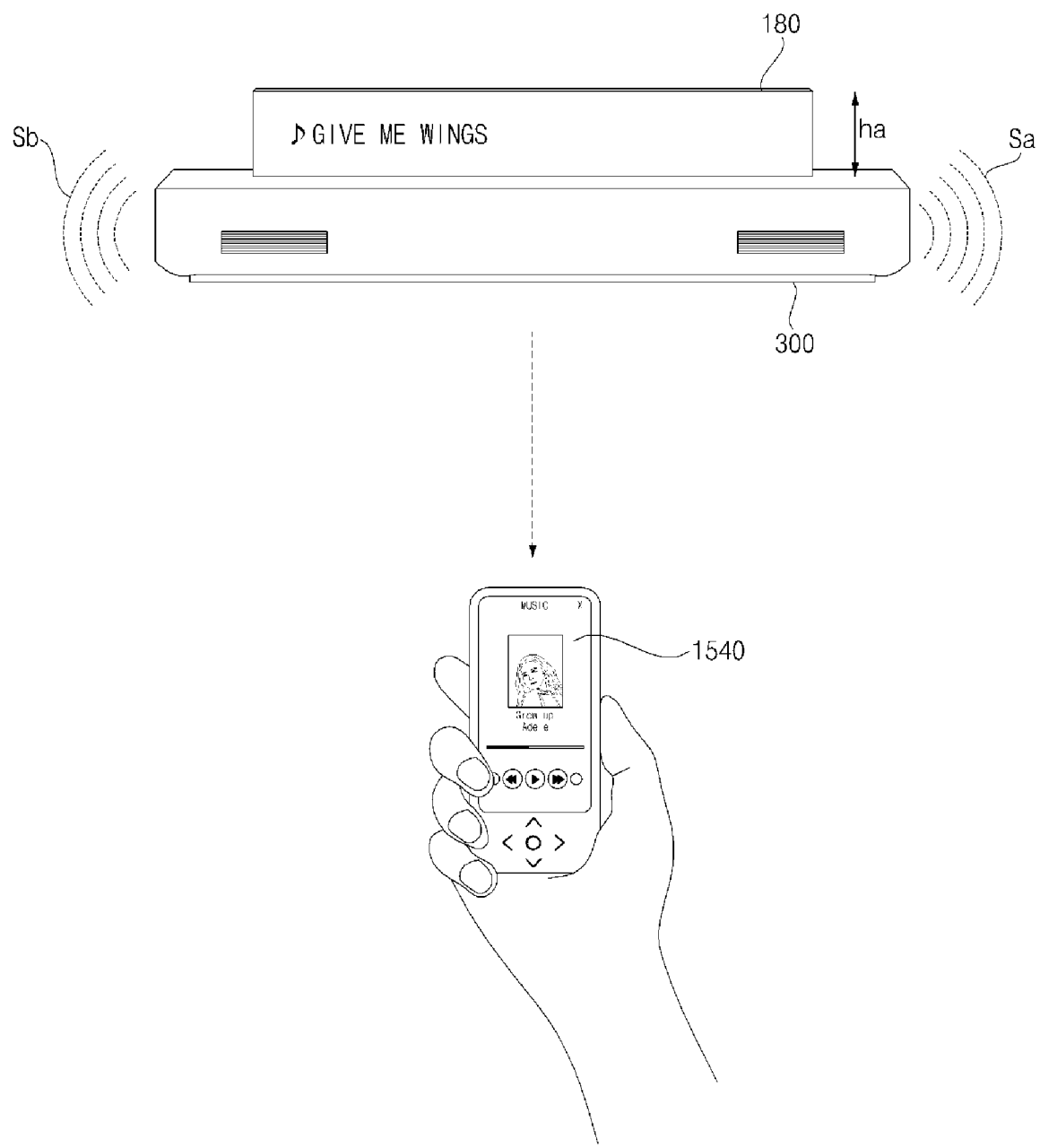

Then, after the broadcast video is selected, when the display 180 is unrolled upward such that the height thereof reaches the first height ha, the controller 170 of the image display apparatus 100 can control the selected preferred music information 1522 to be displayed on the display 180 as illustrated in FIG. 15C. When displaying the selected preferred music information 1522, the controller 170 of the image display apparatus 100 can output sounds Sa and Sb corresponding to the recommended music information.

Unlike FIG. 15C, the selected recommended music information 1522 can be displayed on the display 180, and the sounds corresponding to the recommended music information can be output on the remote controller 200. When displaying the selected recommended music information 1522 on the display 180 of the image display apparatus 100, the controller 170 of the image display apparatus 100 can control a menu 1540, including a music play/pause control item and a volume control item, to be displayed on the display 280 of the remote controller 200.

Thus, a user can check a playback related menu 1540 through the remote controller 200 while viewing the selected recommended music information 1522, for example information on lyrics and the like, on the display 180. Accordingly, user convenience may be improved. The first height described with reference to FIGS. 1 to 15C may change depending on the types of contents to be displayed, and thus the height of the display 180 when being fully unrolled may change accordingly. For example, the height of the display 180 may be the lowest when music is played.

The remote controller 200 described with reference to FIGS. 1 to 15C may be a remote controller for remote control of the image display apparatus 100, but is not limited thereto, and may include a mobile terminal such as a smartphone. That is, when an application for remote control of the image display apparatus 100 is executed in a mobile terminal, the mobile terminal may correspond to the remote controller 200 illustrated in FIGS. 1 to 15C.

As is apparent from the above description, according to an embodiment of the present invention, there is provided an image display apparatus including a rollable display, a driving unit to change a size of the rollable display, an interface to receive a signal from a remote controller, and a controller to control the rollable display, wherein based on an image display input, the controller controls the driving unit to unroll the rollable display, and during the unrolling, the controller controls a first video, corresponding to a video to be displayed on the rollable display, to be displayed on a display of the remote controller. Accordingly, a video can be displayed in advance on a remote controller while a rollable display is unrolled upward.

Once the rollable display is fully unrolled, such that the rollable display is at the first height, the video to be displayed is displayed on the rollable display, thereby enabling a user to view the image seamlessly through the rollable display. Further, the controller controls the first video and a channel list to be displayed on the display of the remote controller, and after any one channel is selected from the channel list displayed on the display of the remote controller, and the display is unrolled upward such that the height of the display reaches the first height, the controller controls a broadcast video, corresponding to the selected channel, to be displayed on the display instead of the video to be displayed, thereby enabling a user to view the desired broadcast video immediately after the display is fully unrolled, and improving user convenience.

In addition, the controller controls an application list including a plurality of application items to be displayed on the display of the remote controller during the upward unrolling, such that a user can select a desired item immediately during the upward unrolling, thus improving user convenience. Moreover, during the unrolling, the controller controls more videos to be display on the display of the remote controller in time-sequential order, thereby enabling a user to check more information, and improving user convenience.

Further, during the unrolling, the controller controls recommended content information or preferred content information to be display on the display of the remote controller, and after any one of recommended content information or preferred content information, when the rollable display is unrolled upward such that the height of the rollable display reaches the first height, the controller controls a video, corresponding to the selected content, to be displayed on the display, thereby enabling a user to view the desired content video immediately after the display is fully unrolled, and improving user convenience.

According to another embodiment of the present invention, there is provided an image display apparatus including a rollable display, a driving unit to change a size of the rollable display, an interface to receive a signal from a remote controller, and a controller to control the rollable display, wherein based on an image display input, the controller controls the driving unit to unroll the rollable display, and during the unrolling, the controller controls a video not to be displayed on the display, and controls a first video, corresponding to a video to be displayed on the display, to be displayed on the display of the remote controller. Accordingly, a video can be displayed in advance on a remote controller while a rollable display is unrolled upward.

The image display apparatus according to the embodiments of the present invention are not limited to the configurations and methods of the above described embodiments, and all or some of the embodiments may be selectively combined to achieve various modifications. Further, in the present specification, although the preferred embodiments of the present invention have been shown and described, the present invention is not limited to the above-described specific embodiments, those skilled in the art will appreciate that various modifications are possible in the art, without departing from the gist of the invention as disclosed in the accompanying claims, and such modifications should not be understood separately from the technical spirit or scope of the present invention.

What is claimed is:

1. An image display apparatus, comprising:
an audio output unit;
a rollable display;
a driving unit configured to change a size of the rollable display;
an interface configured to receive a signal from a mobile terminal; and
a controller configured to:
in response to connection with the mobile terminal, control the driving unit to unroll the rollable display,
wherein, when the rollable display is unrolled such that a height of the rollable display reaches a first height, the controller displays a broadcast video on the rollable display, and controls a menu, including a channel control item and a volume control item, to be displayed on the display of the mobile terminal.

2. The image display apparatus of claim 1, wherein the controller is configured to:
output sound, corresponding to the broadcast video displayed on the unrolled display through the audio output unit of the image display apparatus, or control sound, corresponding to the broadcast video displayed on the unrolled display, to be output through a sound output module of the mobile terminal.

3. The image display apparatus of claim 2, wherein the controller is configured to control the broadcast video to be displayed on a display of mobile terminal during the unrolling of the rollable display.

4. The image display apparatus of claim 3, wherein the interface transmits video information to the mobile terminal so that the broadcast video is displayed on the display of the mobile terminal during the unrolling of the rollable display.

5. The image display apparatus of claim 3, wherein when the rollable display is unrolled such that the height of the rollable display is the first height, the controller displays the broadcast video on the rollable display, and controls the sound, corresponding to the broadcast video, to be output through the audio output unit.

6. The image display apparatus of claim 5, wherein when the rollable display is unrolled such that the height of the rollable display is the first height, the controller controls the broadcast video not to be displayed on the display of the mobile terminal, and controls the sound, corresponding to the broadcast video, not to be output through the sound output module of the mobile terminal.

7. The image display apparatus of claim 3,
wherein after any one channel is selected from the channel list displayed on the display of the mobile terminal, and when the rollable display is unrolled such that the height of the rollable display reaches the first height, the controller displays a respective broadcast video, corresponding to the selected channel, on the rollable display.

8. The image display apparatus of claim 2, wherein after any one of recommended content information or preferred content information, which are displayed on the display of the mobile terminal, is selected, and when the rollable display is unrolled such that a height of the rollable display reaches a first height, the controller displays a video, corresponding to the selected content, on the rollable display.

9. The image display apparatus of claim 8, wherein in response to the selected content being a music content, and after any one of the recommended content information or the preferred content information is selected and the rollable display is fully unrolled, the controller displays information on the music content on the rollable display.

10. The image display apparatus of claim 1, wherein the controller controls the drive unit to unroll the rollable display from a rolled position in which the rollable display is rolled within a casing so as not to be exposed outside the casing.

11. The image display apparatus of claim 1, wherein:
during the unrolling of the rollable display, and when the height of the rollable display is a second height which is lower than the first height, the controller controls the broadcast video to be displayed on the display of the mobile terminal; and
during the unrolling of the rollable display, and when the height of the rollable display is a third height which is higher than the second height, the controller controls the broadcast video and a thumbnail list including a plurality of thumbnail images to be displayed on the display of the mobile terminal.

12. The image display apparatus of claim 11, wherein when the rollable display is unrolled such that the height of the rollable display reaches the first height, the controller displays the video on the rollable display, and controls only the thumbnail list to be displayed on the display of the mobile terminal.

13. The image display apparatus of claim 1, wherein the drive unit is included in a casing and comprises:
a roller on which the rollable display is wound; and
a motor to rotate the roller, and
wherein the controller controls the drive unit to roll the rollable display on the roller via the motor such that the rollable display is not exposed outside of the casing in a standby mode.

14. An image display apparatus, comprising:
an audio output unit;
a rollable display;
a driving unit configured to change a size of the rollable display;
an interface configured to receive a signal from a mobile terminal; and
a controller configured to:
in response to connection with the mobile terminal, control the driving unit to unroll the rollable display,
wherein the controller controls an application list including a plurality of application items to be displayed on a display of the mobile terminal during the unrolling of the rollable display.

15. The image display apparatus of claim 14, wherein after a first application item is selected from the application list displayed on the display of the mobile terminal, and when the rollable display is unrolled such that a height of the rollable display reaches a first height, the controller displays an application screen, corresponding to the selected first application item, on the rollable display instead of the video to be displayed.

16. An image display apparatus, comprising:
an audio output unit;
a rollable display;
a driving unit configured to change a size of the rollable display;
an interface configured to receive a signal from a mobile terminal; and
a controller configured to:
in response to connection with the mobile terminal, control the driving unit to unroll the rollable display,
wherein during the unrolling of the rollable display, the controller controls a broadcast video to be displayed on the display of the mobile terminal, and displays an application list including a plurality of application items on the rollable display.

17. The image display apparatus of claim 16, wherein when the rollable display is unrolled such that a height of the rollable display reaches a first height, the controller displays the broadcast video and the application list on the rollable display.

18. The image display apparatus of claim 17, wherein based on a pointing signal from the mobile terminal, the controller displays a pointer on the broadcast video or the application list.

* * * * *